(12) United States Patent
Mokuya et al.

(10) Patent No.: US 7,056,039 B2
(45) Date of Patent: Jun. 6, 2006

(54) DEVICE ASSOCIATIVE MANAGEMENT SYSTEM, NETWORK DEVICE, AND PROGRAM FOR DEVICE, AS WELL AS DEVICE ASSOCIATIVE MANAGEMENT METHOD

(75) Inventors: Senichi Mokuya, Suwa (JP); Shinya Taniguchi, Suwa (JP); Naruhide Kitada, Fujimi-machi (JP); Hozumi Mori, Beppu (JP)

(73) Assignee: Seiko Epson Corporation (JP)

( * ) Notice: Subject to any disclaimer, the term of this patent is extended or adjusted under 35 U.S.C. 154(b) by 222 days.

(21) Appl. No.: 10/739,950

(22) Filed: Dec. 18, 2003

(65) Prior Publication Data

US 2004/0170460 A1   Sep. 2, 2004

(30) Foreign Application Priority Data

Dec. 26, 2002 (JP) ............................. 2002-377294
Nov. 19, 2003 (JP) ............................. 2003-388844

(51) Int. Cl.
  *B41J 3/44* (2006.01)
(52) U.S. Cl. ............................. 400/76; 400/70; 400/61; 358/1.15
(58) Field of Classification Search .................. 400/61, 400/62, 70, 76; 358/1.15
  See application file for complete search history.

(56) References Cited

U.S. PATENT DOCUMENTS 6,417,934 B1 *   7/2002   Sadr-Salek .................. 358/442
2002/0041386 A1 *  4/2002   Suzuki et al. ............... 358/1.13

FOREIGN PATENT DOCUMENTS

JP       08-161134       6/1996
JP       2000-181653     6/2000

* cited by examiner

*Primary Examiner*—Minh Chau
(74) *Attorney, Agent, or Firm*—Harness, Dickey & Pierce, P.L.C.

(57) ABSTRACT

There is provided a device associative management system which is preferable for reducing cost and time and improving reliability. A network printer 200 can be set to a server printer 200 or a client printer 200. When the network printer 200 itself is the client printer 200, the network printer 200 sends status information in a status information registration table 560 to the server printer 200. In the case in which the network printer 200 itself is the server printer 200, when the status information is received, the network printer stores or registers the received status information in a status information registration table.

17 Claims, 28 Drawing Sheets

410 TIMING INFORMATION REGISTRATION TABLE

| IP ADDRESS | PRINTER NAME | NOTIFICATION DATE AND TIME |
|---|---|---|
| xxx.xxx.xxx.1 | LP-9600 | MONDAY 13:00:00 |
| xxx.xxx.yyy.5 | LP-8000C | MONDAY 13:00:05 |
| xxx.xxx.zzz.6 | LP-8500 | MONDAY 13:00:10 |

| | | 500 PRINTER BASIC INFORMATION | | |
|---|---|---|---|---|
| 502 | CLIENT/SERVER MODE | CLIENT | | |
| 504 | SERVER PRINTER ADDRESS | xxx.xxx.xxx.1 | | |
| 506 | PRINTER MANAGEMENT SERVER ADDRESS | yyy.yyy.yyy.yyy | | |
| 508 | NOTIFICATION DATE AND TIME | 2002/11/25  12:59:50 | | |
| 510 | SUB-NETWORK IDENTIFIER | xyzBranch | | |
| 512 | PRINTER OPERATION STATE LIST | 514 USE | 516 IP ADDRESS | 518 PRINTER NAME | 520 STATE |
| | | MONOCHROME | xxx.xxx.xxx.1 | LP-9600 | Sleep |
| | | COLOR | xxx.xxx.xxx.3 | LP-8300C | Ready |
| | | | xxx.xxx.xxx.24 | LP-8000C | Sleep |

FIG. 12

530 PRINTER INFORMATION REGISTRATION TABLE

| IP ADDRESS (532) | PRINTER NAME (534) |
|---|---|
| xxx.xxx.xxx.1 | LP-9600 |
| xxx.xxx.xxx.3 | LP-8300C |
| xxx.xxx.xxx.24 | LP-8000C |

FIG. 13

540 PERFORMANCE INFORMATION

| COMMUNICATION SPEED (542) | MEMORY HELD (544) | HDD CAPACITY (546) |
|---|---|---|
| 100BASE | 192MB | 3GB |

FIG. 14

550 TIMING INFORMATION REGISTRATION TABLE

| IP ADDRESS (552) | PRINTER NAME (554) | NOTIFICATION DATE AND TIME (556) |
|---|---|---|
| xxx.xxx.xxx.1 | LP-9600 | 2002/11/25 12:59:50 |
| xxx.xxx.xxx.3 | LP-8300C | 2002/11/25 12:59:53 |
| xxx.xxx.xxx.24 | LP-8000C | 2002/11/25 12:59:56 |

FIG. 15

560 STATUS INFORMATION REGISTRATION TABLE

| ObjectID (562) | CONTENTS (564) | VALUE (566) |
|---|---|---|
| 1.3.6.1.2.1.x.y.z.1 | RESIDUAL AMOUNT OF CYAN TONER | 100% |
| 1.3.6.1.2.1.x.y.z.2 | RESIDUAL AMOUNT OF MAGENTA TONER | 55% |
| 1.3.6.1.2.1.x.y.z.3 | RESIDUAL AMOUNT OF YELLOW TONER | 23% |
| : | : | : |

DEVICE ASSOCIATIVE MANAGEMENT SYSTEM, NETWORK DEVICE, AND PROGRAM FOR DEVICE, AS WELL AS DEVICE ASSOCIATIVE MANAGEMENT METHOD

BACKGROUND OF THE INVENTION

1. Field of the Invention

The present invention relates to a system, a device, and a program, as well as a method for collecting management information from a plurality of network printers. In particular, the present invention relates to a device associative management system, a network device, and a program for a device, as well as a device associative management method which are preferable for reducing cost and time and improving reliability.

2. Description of the Related Art

Conventionally, as a technique for collecting status information from a plurality of network printers using a printer management server, for example, there is a printer management system as shown in FIG. 47.

FIG. 47 is a block diagram showing a structure of the conventional printer management system.

As shown in FIG. 47, a printer management server 100, which manages network printers 200, and a plurality of routers 110 are connected to the Internet 199. A plurality of network printers 200 and a printer management server 120, which manages those network printers 200, are connected to each router 110. The network printers 200 and the printer management server 120 are connected to the Internet 199 via the router 110. In addition, the router 110, the network printers 200, and the printer management server 120 constitute one sub-network 198. The sub-network 198 is constituted, for example, for each company.

The network printers 200 are managed by the printer management server 120 of the sub-network 198 to which the network printer 200 itself belongs. The network printer 200 generates status information periodically and stores the generated status information in a storage. In addition, when the network printer 200 receives a request for acquiring status information, it sends the status information in the storage to the printer management server 120.

The printer management server 120 manages the respective network printers 200 of the sub-network 198 to which the printer management server 120 itself belongs. The printer management server 120 sends a request for acquiring status information to the respective network printers 200 at a predetermined period. When the printer management server 120 receives status information, it stores the received status information in a status information registration database (database is hereinafter abbreviated simply as DB) for each network printer 200. In addition, the printer management server 120 sends the status information in the status information registration DB to the printer management server 100 in a predetermined period.

The printer management server 100 manages the respective printer management servers 120. When the printer management server 100 receives status information, it stores the received status information in a storage for each network printer 200.

Note that, as another technique related to such a printer management system, for example, there is a maintenance method for a printing device disclosed in Japanese Patent Application Laid-Open No. 8-161134 (hereinafter referred to as the first conventional example).

In addition, as a technique for dynamically changing a server, for example, there is a network system disclosed in Japanese Patent Application Laid-Open No. 2000-181653 (hereinafter referred to as the second conventional example).

In the second conventional example, a first server determines that a substitute server is a second server on the basis of substitute server selecting conditions of a device information table. The first server sends management information (a device information table and a performance information table), a reference D2 (print request) and print data D1, which are stored in the first server, to the second server to thereby request that the second server change for the first server. The second server updates management information of the second server on the basis of the management information sent from the first server. In addition, the second server stores the reference D2 and the print data D1 sent from the first sever in a spool. Next, the second server notifies a work station that a transmission destination server of the print data D1 and the reference D2 has been changed to the second server and notifies a printer that an acquisition destination server of the print data D1 has been changed to the second server.

Consequently, even in the case in which a trouble has occurred in a server, print processing can be continued by dynamically selecting a substitute server.

However, in the above-described conventional printer management system, the printer management server 120 is provided for each sub-network 198. Thus, introduction and management of the printer management server 120 require cost and time. This is true for the first conventional example and the second conventional example because it is necessary to provide a server in the examples as well.

Moreover, in the second conventional example, a specific server selects a substitute server. Thus, in the case in which a trouble has occurred in the specific server before the substitute server changes for the specific server, or in the case in which a trouble has occurred in the specific server and the substitute server after the substitute server changes for the specific server, it is likely that print processing stops, and reliability for coping with the trouble is not sufficient.

Note that such problems are assumed for not only a network printer but also for other network devices other than the network printer.

SUMMARY OF THE INVENTION

Therefore, the present invention has been devised in view of the unsolved problems inherent in the related art, and it is an object of the present invention to provide a device associative management system, a network device, and a program for a device, as well as a device associative management method which are preferable for reducing cost and time and improving reliability.

In order to attain the above-described object, a device associative management system according to the first aspect of the present invention is a network system in which a plurality of network devices are connected so as to be capable of communicating with each other, and any one of the plurality of network devices becomes a representative network device, the device associative management system including management information storage section for storing management information, characterized in that each of the network devices includes: mode switching section which switches the network device to a mode in which the network device becomes the representative network device and a mode in which the network device becomes a dependent network device other than the representative network device among the plurality of network devices; management information transmission section which sends management information of the network device itself to the representative network device; management information reception section which receives the management information; and management information registration section which registers the management information received by the management information reception section in the management information storage section, when the network device itself is the representative network device, the network device validates operations of the management information reception section and the management information registration section, and when the network device itself is the dependent network device, the network device validates operations of the management information transmission section.

With such a constitution, any one of the plurality of network devices is switched to the mode in which the network device becomes the representative network device by the mode switching section. In addition, the network devices other than the network device are switched to the dependent network devices by the mode switching section.

In the dependent network device, since the operations of the management information transmission section become valid, management information of the network device itself is sent to the representative network device by the management information transmission section.

In the representative network device, since the operations of the management information reception section and the management information registration section become valid, when management information is received by the management information reception section, the received management information is registered in the management information storage section by the management information registration section.

Consequently, a device management terminal does not have to be provided for each sub-network. Thus, there is an effect that cost and time required for introduction and maintenance of a system can be reduced compared with the conventional system. In addition, an arbitrary one of the plurality of network devices can play a role of a server. Thus, even if a trouble has occurred in a specific network device, it is less likely that service offered by the network devices stops. Therefore, there is also an effect that reliability for coping with a trouble can be improved compared with the conventional system.

Here, the management information refers to information for managing a network device. The information includes, for example, device information on the network device and status information on a state of the network device. This is true for the device associative management system according to second, fourth, and fifth aspects of the present invention, the network device according to twenty-third and twenty-fifth aspects of the present invention, the program for a device according to forty-third and forth-fifth aspects of the present invention, and the device associative management method according to sixty-third and sixty-fourth aspects of the present invention.

In addition, the device information generally means information in general which is recorded in an MIB database (e.g., a device name, an supervisor name, an IP address, etc.) or information other than the information recorded in the MIB database (e.g., an MAC address, a serial number, etc. held by a network card). This is true for the device associative management system according to second, fourth, and fifth aspects of the present invention, the network device according to twenty-third and twenty-fifth aspects of the present invention, the program for a device according to forty-third and forth-fifth aspects of the present invention, and the device associative management method according to sixty-third and sixty-fourth aspects of the present invention.

Further, the status information generally means information in general which is recorded in the MIB database (e.g., in a printer, information on an error such as cover open or paper jamming, a residual amount of toner, information on whether or not the printer is in a warm-up state, etc.) or information other than the information recorded in the MIB database (e.g., information on a power supply input state, a life of an expendable part, a degree of wear of the expendable part, progress of image processing, etc.). This is true for the device associative management system according to second, fourth, and fifth aspects of the present invention, the network device according to twenty-third and twenty-fifth aspects of the present invention, the program for a device according to forty-third and forty-fifth aspects of the present invention, and the device associative management method according to sixty-third and sixty-fourth aspects of the present invention.

As a form with which the network devices are connected so as to be capable of communicating with each other, the system and the network devices are not only directly connected but also indirectly connected via other communication terminals, communication apparatuses, or other communication facilities. This is true for the device associative management system according to second, fourth, and fifth aspects of the present invention.

The management information storage section stores management information with any means and at any time. The management information storage section may store the management information in advance or may store the management information according to input or the like from the outside at the time of operation of the system rather than storing the management information in advance. This is true for the device associative management system according to the second aspect of the present invention, the network device according to the twenty-third aspect of the present invention, and the program for a device according to the forty-third aspect of the present invention.

In addition, the management information storage section may be provided in any one of or all of the plurality of network devices or may be provided in terminals other than the network devices. In the latter case, for example, the management information storage section may be provided in a device management terminal or may be constituted as a database server or a network storage. This is true for the device associative management system according to the second aspect of the present invention, the network device according to the twenty-third aspect of the present invention, the program for a device according to the forty-third aspect of the present invention, and the device associative management method according to the sixty-third aspect of the present invention.

Further, the system may be realized as a network system consisting only of network devices or may be realized as a network system in which apparatuses, terminals, and other devices other than the network devices are connected so as to be capable of communicating with each other. In the latter case, the respective components may belong to any one of the plurality of devices or the like as long as the components are connected so as to be capable of communicating with each other. This is true for the device associative management system according to the second aspect of the present invention.

A device associative management system according to the second aspect of the present invention is a network system in which a plurality of network devices are connected so as to be capable of communicating with each other and any one of the plurality of network devices becomes a representative device, the device associative management system comprising management information storage section for storing the management information, characterized in that each of the network devices includes: mode switching section which switches the network device to a mode in which the network device becomes the representative network device and a mode in which the network device becomes a dependent network device other than the representative network device among the plurality of network devices; management information transmission section which sends management information of the network device itself to the representative network device; management information reception section which receives the management information; and management information registration section which registers the management information received by the management information reception section in the management information storage section, the network device being in the mode of the representative network device validates operations of the management information reception section and the management information registration section, and the network device being in the mode of the dependent network device validates operations of the management information transmission section.

With such a constitution, any one of the plurality of network devices is switched to the mode in which the network device becomes the representative network device by the mode switching section. In addition, the network devices other than the network device are switched to the dependent network devices by the mode switching section.

In the dependent network device, since the operations of the management information transmission section become valid, management information in the network device itself is sent to the representative network device by the management information transmission section.

In the representative network device, since the operations of the management information reception section and the management information registration section become valid, when management information is received by the management information reception section, the received management information is registered in the management information storage section by the management information registration section.

Consequently, a device management terminal does not have to be provided for each sub-network. Thus, there is an effect that cost and time required for introduction and maintenance of a system can be reduced compared with the conventional system. In addition, an arbitrary one of the plurality of network devices can play a role of a server. Thus, even if a trouble has occurred in a specific network device, it is less likely that a service offered by the network devices stops. Therefore, there is also an effect that reliability for coping with a trouble can be improved compared with the conventional system.

A device associative management system according to the third aspect of the present invention is characterized in that, in the device associative management system according to the first or second aspect of the present invention, when the network device itself is the dependent network device, the network device invalidates operations of the management information registration section.

With such a constitution, in the dependent network device, since the operations of the management information registration section become invalid, the management information registration section does not perform registration.

A device associative management system according to the fourth aspect of the present invention is a network system in which a plurality of network devices are connected so as to be capable of communicating with each other and any one of the plurality of network devices becomes a representative device, characterized in that each of the network devices includes: mode switching section which switches the network device to a mode in which the network device becomes the representative network device and a mode in which the network device becomes a dependent network device other than the representative network device among the plurality of network devices; first management information storage section for storing management information of the network device itself; second management information storage section for storing management information of the representative network device and the dependent network device; management information transmission section which sends management information in the first management information storage section to the representative network device; management information reception section which receives the management information; and management information registration section which registers the management information received by the management information reception section in the second management information storage section, when the network device itself is the representative network device, the network device validates operations of the management information reception section and the management information registration section, and when the network device itself is the dependent network device, the network device validates operations of the management information transmission section.

With such a constitution, any one of the plurality of network devices is switched to the mode in which the network device becomes the representative network device by the mode switching section. In addition, the network devices other than the network device are switched to the dependent network devices by the mode switching section.

In the dependent network device, since the operations of the management information transmission section become valid, management information in the first management information storage section is sent to the representative network device by the management information transmission section.

In the representative network device, since the operations of the management information reception section and the management information registration section become valid, when management information is received by the management information reception section, the received management information is registered in the second management information storage section by the management information registration section.

Consequently, a device management terminal does not have to be provided for each sub-network. Thus, there is an effect that cost and time required for introduction and maintenance of a system can be reduced compared with the conventional system. In addition, an arbitrary one of the plurality of network devices can play a role of a server. Thus, even if a trouble has occurred in a specific network device, it is less likely that a service offered by the network devices stops. Therefore, there is also an effect that reliability for coping with a trouble can be improved compared with the conventional system.

Here, the first management information storage section stores management information with any means and at any time. The first management information storage section may store the management information in advance or may store the management information according to input or the like from the outside at the time of operation of the system rather than storing the management information in advance. This is true for the case in which the management information is stored in the second management information storage section. This is true for the device associative management system according to the fifth aspect of the present invention, the network device according to the twenty-fifth aspect of the present invention, and the program for a device according to the forty-fifth aspect of the present invention.

A device associative management system according to a fifth aspect of the present invention is a network system in which a plurality of network devices are connected so as to be capable of communicating with each other and any one of the plurality of network devices becomes a representative device, characterized in that each of the network devices includes: mode switching section which switches the network device to a mode in which the network device becomes the representative network device and a mode in which the network device becomes a dependent network device other than the representative network device among the plurality of network devices; first management information storage section for storing management information of the network device itself; second management information storage section for storing management information of the representative network device and the dependent network device; management information transmission section which sends management information in the first management information storage section to the representative network device; management information reception section which receives the management information; and management information registration section which registers the management information received by the management information reception section in the second management information storage section, the network device being in the mode of the representative network device validates operations of the management information reception section and the management information registration section, and the network device being in the mode of the dependent network device validates operations of the management information transmission section.

With such a constitution, any one of the plurality of network devices is switched to the mode in which the network device becomes the representative network device by the mode switching section. In addition, the network devices other than the network device are switched to the dependent network devices by the mode switching section.

In the dependent network device, since the operations of the management information transmission section become valid, management information in the first management information storage section is sent to the representative network device by the management information transmission section.

In the representative network device, since the operations of the management information reception section and the management information registration section become valid, when management information is received by the management information reception section, the received management information is registered in the second management information storage section by the management information registration section.

Consequently, a device management terminal does not have to be provided for each sub-network. Thus, there is an effect that cost and time required for introduction and maintenance of a system can be reduced compared with the conventional system. In addition, an arbitrary one of the plurality of network devices can play a role of a server. Thus, even if a trouble has occurred in a specific network device, it is less likely that a service offered by the network devices stops. Therefore, there is also an effect that reliability for coping with a trouble can be improved compared with the conventional system.

A device associative management system according to a sixth aspect of the present invention is characterized in that, in the device associative management system according to the fourth or fifth aspect of the present invention, when the network device itself is the dependent network device, the network device invalidates operations of the management information registration section.

With such a constitution, in the dependent network device, since the operations of the management information registration section become invalid, the management information registration section does not perform registration.

A device associative management system according to the seventh aspect of the present invention is characterized in that, in the device associative management system according to the fourth aspect of the present invention, a device management terminal managing the network devices are connected so as to be capable of communicating with each other, the network device includes second management information transmission section which sends the management information in the second management information storage section to the device management terminal, when the network device itself is the representative network device, the network device validates operations of the second management information transmission section.

With such a constitution, in the representative network device, since the operations of the second management information transmission section become valid, management information in the second management information storage section is sent to the device management terminal by the second management information transmission section.

Consequently, since the representative network device sends management information of the respective network devices collectively to the device management terminal, there is also an effect that processing load of the device management terminal can be reduced compared with the constitution in which the respective network devices send management information individually.

Here, the device management terminal may be any device management terminal as long as it is connected to one end of a communication path with a network device and has at lease a server function. It is also possible to constitute the device management terminal as a device management terminal having both a client function and a server function. This is true for the network device according to the twenty-seventh aspect of the present invention, the program for a device according to the forty-seventh aspect of the present invention, and the device associative management method according to the sixty-fifth aspect of the present invention.

In addition, as a form with which the network devices are connected so as to be capable of communicating with each other, the device management terminal and the network devices are not only directly connected but also indirectly connected via other communication terminals or communication apparatuses, or other communication facilities. This is true for the network device according to the twenty-seventh aspect of the present invention, the program for a device according to the forty-seventh aspect of the present invention, and the device associative management method according to the sixty-fifth aspect of the present invention.

A device associative management system according to the eighth aspect of the present invention is characterized in that, in the device associative management system according to the seventh aspect of the present invention, when the network device itself is the dependent network device, the network device invalidates operations of the second management information transmission section.

With such a constitution, in the dependent network device, since the operations of the second management information transmission section become invalid, the second management information transmission section does not perform transmission.

A device associative management system according to the ninth aspect of the present invention is characterized in that, in the device associative management system according to fourth or seventh aspect of the present invention, the management information transmission section voluntarily sends the management information in the first management information storage section to the representative network device.

With such a constitution, in the dependent network device, the management information in the first management information storage section is voluntarily sent to the representative network device by the management information transmission section.

Consequently, there is also an effect that processing load of the representative network device and communication traffic on a network can be reduced compared with a constitution in which the representative network device polls the dependent network device at a predetermined period to acquire management information.

A device associative management system according to the tenth aspect of the present invention is characterized in that, in the device associative management system according to any one of fourth, seventh, and ninth aspects of the present invention, when it is judged that there is no operative network device other than the network device itself among the plurality of network devices, the mode switching section switches the network device itself to the mode in which the network device itself becomes the representative network device.

With such a constitution, in the network device, when it is judged that there is no operative network device other than the network device itself among the plurality of network devices, the network device is switched to the mode in which the network device becomes the representative network device by the mode switching section.

Consequently, since it is unnecessary to set a network device to be the representative network device in advance, there is also an effect that time required for setting the system can be reduced.

A device associative management system according to the eleventh aspect of the present invention is characterized in that, in the device associative management system according to any one of fourth and seventh to tenth aspects of the present invention, in the case in which the network device itself is the representative network device, when a performance of the network device itself and a performance of the dependent network device are compared and it is judged that the performance of the dependent network device is higher, the mode switching section of the network device itself sends a substitution request for substitution of the representative network device to the dependent network device and switches the network device itself to the mode in which the network device itself becomes the dependent network device, and the dependent network device that received the substitution request switches the dependent network device to the mode in which the dependent network device becomes the representative network device.

With such a constitution, in the representative network device, when the performance of the network device itself and the performance of the dependent network device are compared and it is judged that the performance of the dependent network device is higher, a substitution request is sent to the dependent network device and the network device is switched to the mode in which the network device becomes the dependent network device.

In the dependent network device, when the substitution request is received, the network device is switched to the mode in which the network device becomes the representative network device by the mode switching section.

Consequently, since a network device with a relatively high performance among the plurality of network devices becomes the representative network device, there is also an effect that collection of management information can be performed efficiently.

Here, the performance of the network device includes, other than a processing performance of the network device, a communication speed or a storage capacity of the network device or an amount of communication traffic concentrating on the network device. In addition, the processing performance includes, other than physical processing ability, a performance obtained by deducting a performance equivalent to present processing load from a physical processing performance (actual processing performance). This is true for the network device according to the thirty-first aspect of the present invention, the program for a device according to the fifty-first aspect of the present invention, and the device associative management method according to the sixty-eighth aspect of the present invention.

A device associative management system according to the twelfth aspect of the present invention is characterized in that, in the device associative management system according to any one of fourth and seventh to eleventh aspects of the present invention, when the representative network device has become inoperative, the mode switching section selects a dependent network device having the highest performance out of the dependent network devices and switches the selected dependent network device to the representative network device.

With such a constitution, when the representative network device has become inoperative, a dependent network device having the highest performance is selected out of the dependent network devices, and the selected dependent network device is switched to the representative network device.

Consequently, even if a trouble or the like has occurred in the representative network device and the representative network device has become inoperative, since another operative network device becomes the representative network device, the likelihood that the service offered by the network device stops can be further reduced. Therefore, there is also an effect that reliability for coping with a trouble can be further improved.

In addition, since a network device having the highest performance among the plurality of network devices becomes the representative network device, there is also an effect that, even if a trouble or the like has occurred in the representative network device and the representative network device has become inoperative, collection of management information can be continued efficiently.

A device associative management system according to a thirteenth aspect of the present invention is characterized in that, in the device associative management system according to any one of seventh to twelfth aspects of the present invention, the device management terminal includes storage section for storing a file and, when a file creation request for creation of a file is received, creates a file relating to the received file creation request, records the created file in the storage section together with a creation time thereof, and when detailed information acquisition request for acquisition of file detail information including the creation time is received, creates the file detail information for a file relating to the received detailed information acquisition request among files in the storage section, and sends the created file detail information to a request source, the network device includes: file detail information acquisition section which acquires the file detail information from the device management terminal; file detail information transmission section which sends the file detail information acquired by the file detail information acquisition section to the dependent network devices; file detail information reception section which receives the file detail information; and time setting section which sets a time on the basis of the file detail information received by the file detail information reception section, when the network device itself is the representative network device, the network device validates operations of the file detail information acquisition section, the file detail information transmission section, and the time setting section, when the network device itself is the dependent network device, the network device validates operations of the file detail information reception section and the time setting section, and the file detail information acquisition section sends the file creation request to the device management terminal, sends the detailed information acquisition request to the device management terminal, and receives the file detail information.

With such a constitution, in the representative network device, since operations of the file detail information acquisition section and the file detail information transmission section become valid, the file creation request is sent to the device management terminal by the file detail information acquisition section.

In the device management terminal, when the file creation request is received, a file relating to the received file creation request is created, and the created file is recorded in the storage section together with a creation time thereof.

In addition, in the representative network device, the detailed information acquisition request is sent to the device management terminal by the file detail information acquisition section.

In the device management terminal, when the detail information acquisition request is received, file detail information is created for a file relating to the received detail information acquisition request among the files in the storage section, and the created file detail information is sent to the representative network device.

In the representative network device, when the file detail information is received by the file detail information acquisition section, the received file detail information is sent to the dependent network devices by the file detail information transmission section.

In the dependent network devices, since operations of the file detail information reception section and the time setting section become valid, when the file detail information is received by the file detail information reception section, a time is set by the time setting section on the basis of the received file detail information.

Consequently, a time of the network device can be set utilizing a function for performing recording of a file together with recording of a creation time thereof and a function for providing the network device with the creation time of the file as a file management function held by the device management terminal. In other words, time setting can be performed utilizing a function which a WWW (World Wide Web) server or the like normally has. Thus, there is also an effect that time setting of the network device can be performed relatively easily without changing the server for the time setting.

Here, the storage section stores a file with any means and at any time. This storage section may store the file in advance or may store the file according to input or the like from the outside at the time of operation of the device rather than storing the file in advance. This is true for the network device according to the thirty-third aspect of the present invention and the program for a device according to the fifty-third aspect of the present invention.

A device associative management system according to a fourteenth aspect of the present invention is characterized in that, in the device associative management system according to the thirteenth aspect of the present invention, when the network device itself is the dependent network device, the network device invalidates operations of the file detail information acquisition section and the file detail information transmission section.

With such a constitution, in the dependent network device, since operations of the file detail information acquisition section and the file detail information transmission section become invalid, the file detail information acquisition section does not perform acquisition and the file detail information transmission section does not perform transmission.

A device associative management system according to a fifteenth aspect of the present invention is characterized in that, in the device associative management system according to any one of seventh to thirteenth aspects of the present invention, the network device includes: power supply input section which inputs a power supply of the network device itself when a power supply input instruction for input of the power supply is received; and power supply input instruction transmission section which sends the power supply input instruction to the dependent network devices, when the network device itself is the representative network device, the network device validates operations of the power supply input instruction transmission section, when the network device itself has become the representative network device, the power supply input instruction transmission section sends the power supply input instruction to the dependent network devices.

With such a constitution, in the representative network device, since operations of the power supply input instruction transmission section become valid, when the network device has become the representative network device, the power supply input instruction is sent to the dependent network devices.

In the dependent network devices, when the power supply input instruction is received, a power supply of the network device itself is inputted by the power supply input section.

Consequently, whereas power supplies for respective network devices have been conventionally inputted one by one, a power supply is inputted to all the dependent network devices simply by changing one network device to the representative network device. Thus, there is also an effect that power supply input work becomes relatively easy.

Here, the power supply input instruction transmission section may take any constitution as long as it sends the power supply input instruction at least to dependent network devices to which a power supply has not been inputted among the dependent network devices. For example, the power supply input instruction transmission section may be adapted to send the power supply input instruction to all the dependent network devices. This is true for the network device according to the thirty-fifth aspect of the present invention and the program for a device according to the fifty-fifth aspect of the present invention.

A device associative management system according to the sixteenth aspect of the present invention is characterized in that, in the device associative management system according to the fifteenth aspect of the present invention, when the network device itself is the dependent network device, the network device invalidates operations of the power supply input instruction transmission section.

With such a constitution, in the dependent network device, since operations of the power supply input instruction transmission section become invalid, the power supply input instruction transmission section does not perform transmission.

A device associative management system according to the seventeenth aspect of the present invention is characterized in that, in the device associative management system according to seventh to fifteenth aspects of the present invention, the network device includes power supply isolation section which isolates a power supply of the network device itself when the network device receives a power supply isolation instruction for isolation of the power supply; power supply isolation instruction transmission section which sends the power supply isolation instruction to the dependent network devices; power supply isolation request input section which inputs a power supply isolation request; and power supply isolation request notification section which, when the power supply isolation request is inputted by the power supply isolation request input section, notifies the representative network device to that effect, when the network device itself is the representative network device, the network device validates operations of the power supply isolation instruction transmission section, and when the power supply isolation request is notified, the power supply isolation instruction transmission section sends the power supply isolation instruction to the dependent network device.

With such a constitution, in any network device, when the power supply isolation request is inputted by the power supply isolation request input section, the power supply isolation request is notified to the representative network device by the power supply isolation request notification section.

In the representative network device, since operations of the power supply isolation instruction transmission section become valid, when the power supply isolation request is notified to the representative network device, the power supply isolation instruction is sent to the dependent network devices by the power supply isolation instruction transmission section.

In the dependent network device, when the power supply isolation instruction is received, a power supply of the network device itself is isolated by the power supply isolation section.

Consequently, whereas power supplies of the respective network devices have been conventionally isolated one by one, power supplies of all the dependent network devices are isolated simply by inputting the power supply isolation request in any network device. Thus, there is also an effect that isolation work for the power supplies becomes relatively easy.

Here, the power supply isolation instruction transmission section may take any constitution as long as it sends the power supply isolation instruction at least to dependent network devices for which a power supply has not been isolated among the dependent network devices. For example, the power supply isolation instruction transmission section may be adapted to send the power supply isolation instruction to all the dependent network devices. This is true for the network device according to the thirty-seventh aspect of the present invention and the program for a device according to the fifty-seventh aspect of the present invention.

A device associative management system according to the eighteenth aspect of the present invention is characterized in that, in the device associative management system according to the seventeenth aspect of the present invention, when the network device itself is the dependent network device, the network device invalidates operations of the power supply isolation instruction transmission section.

With such a constitution, in the dependent network device, since operations of the power supply isolation instruction transmission section become invalid, the power supply isolation instruction transmission section does not perform transmission.

A device associative management system according to the nineteenth aspect of the present invention is characterized in that, in the device associative management system according to any one of seventh to seventeenth aspects of the present invention, the network device includes: application reception section which receives an application from the device management terminal; application installing section which installs the received application; and application delivery section which delivers the application to the dependent network devices, when the network device itself is the representative network device, the network device validates operations of the application delivery section; and when the network device itself has become the representative network device, the application delivery section delivers the received application to the dependent network devices.

With such a constitution, in the representative network device, since operations of the application delivery section become valid, when the application is received by the application reception section, the received application is installed by the application installing section and the received application is delivered to the dependent network devices by the application delivery section.

in addition, in the dependent network devices, when the application is received by the application reception section, the application is installed by the application installing section.

Consequently, whereas an application for the respective network devices has been conventionally sent to and installed in the network devices one by one, the application is delivered to all the dependent network devices simply by changing one network device to the representative network device. Thus, there is also an effect that installing work of the application becomes relatively easy.

Here, the application includes not only an application for realizing a function related to a system associatively managing a plurality of network devices such as an application for collectively performing input or isolation of power supplies, an application for warming up one network device, or an application for distributing communication timing but also an application for realizing functions other than the functions related to the system associatively managing the plurality of network devices such as an application for performing distributed printing or an application for performing image processing. This is true for the device associative management system according to the twenty-first aspect of the present invention, the network device according to thirty-ninth and forty-first aspects of the present invention, the program for a device according to fifty-ninth and sixty-first aspects of the present invention, and the device associative management method according the seventy-third and the seventy-fourth aspects of the present invention.

A device associative management system according to the twentieth aspect of the present invention is characterized in that, in the device associative management system according to the nineteenth aspect of the present invention, when the network device itself is the dependent network device, the network device invalidates operations of the application delivery section.

With such a constitution, in the independent network device, since operations of the application delivery section become invalid, the application delivery section does not perform delivery.

A device associative management system according to the twenty-first aspect of the present invention is characterized in that, in the device associative management system according to any one of seventh to nineteenth aspects of the present invention, the network device includes: application uninstalling instruction reception section which receives an instruction to uninstall an application; application uninstalling section which uninstalls the application; and application uninstalling instruction transmission section which sends an uninstalling instruction to the dependent network devices, when the network device itself is the representative network device, the network device validates operations of the application uninstalling instruction transmission section, and when the network device itself has become the representative network device, the application uninstalling instruction transmission section sends the received application uninstalling instruction to the dependent network devices.

With such a constitution, in the representative network device, since operations of the application uninstalling instruction transmission section becomes valid, when the application uninstalling instruction is received by the application uninstalling instruction reception section, the application of the network device itself is uninstalled by the application uninstalling section, and the application uninstalling instruction is delivered to the dependent network devices by the application uninstalling instruction transmission section.

In addition, in the dependent network devices, when the application uninstalling instruction is received by the application uninstalling instruction reception section, the application is uninstalled by the application uninstalling section.

Consequently, whereas an uninstalling operation for an application of the respective network devices has been conventionally performed one by one to uninstall the application, the application uninstalling instruction is delivered to all the dependent network devices simply by changing one network device to the representative network device. Thus, there is also an effect that uninstalling work of the application becomes relatively easy.

A device associative management system according to the twenty-second aspect of the present invention is characterized in that, in the device associative management system according to the twenty-first aspect of the present invention, when the network device itself is the dependent network device, the network device invalidates operations of the application uninstalling instruction transmission section.

With such a constitution, in the dependent network device, since operations of the application uninstalling instruction transmission section become invalid, the application uninstalling instruction transmission section does not perform transmission.

On the other hand, in order to attain the above-described object, a network device according to the twenty-third aspect of the present invention is a device which is connected to other network devices so as to be capable of communicating with each other, characterized in that the network device includes:

mode switching section which switches the network device to a mode in which the network device becomes the representative network device and a mode in which the network device becomes a dependent network device other than the representative network device among the plurality of network devices; management information transmission section which sends management information of the network device itself to the representative network device; management information reception section which receives the management information; and management information registration section which registers the management information received by the management information reception section in the management information storage section, when the network device itself is the representative network device, the network device validates operations of the management information reception section and the management information registration section, and when the network device itself is the dependent network device, the network device validates operations of the management information transmission section.

With such a constitution, an action equivalent to that of the network device in the device associative management system according to the first aspect of the invention can be obtained. Therefore, an effect equivalent to that of the device associative management system according to the first aspect of the present invention can be obtained.

Further, a network device according to the twenty-fourth aspect of the present invention is characterized in that, in the network device according to the twenty-third aspect of the present invention, when the network device itself is the dependent network device, the network device invalidates operations of the management information registration section.

With such a constitution, an action equivalent to that of the network device in the device associative management system according to the third aspect of the invention can be obtained. Therefore, an effect equivalent to that of the device associative management system according to the third aspect of the present invention can be obtained.

A network device according to the twenty-fifth aspect of the present invention is a device which is connected to other network devices so as to be capable of communicating with each other, characterized in that the network device includes: mode switching section which switches the network device to a mode in which the network device becomes the representative network device and a mode in which the network device becomes a dependent network device other than the representative network device among the plurality of network devices; first management information storage section for storing management information of the network device itself; second management information storage section for storing management information of the representative network device and the dependent network device; management information transmission section which sends management information in the first management information storage section to the representative network device; management information reception section which receives the management information; and management information registration section which registers the management information received by the management information reception section in the second management information storage section, when the network device itself is the representative network device, the network device validates operations of the management information reception section and the management information registration section, and when the network device itself is the dependent network device, the network device validates operations of the management information transmission section.

With such a constitution, an action equivalent to that of the network device in the device associative management system according to the fourth aspect of the invention can be obtained. Therefore, an effect equivalent to that of the device associative management system according to the fourth aspect of the present invention can be obtained.

A network device according to the twenty-sixth aspect of the present invention is characterized in that, in the network device according to the twenty-fifth aspect of the present invention, when the network device itself is the dependent network device, the network device invalidates operations of the management information registration section.

With such a constitution, an action equivalent to that of the network device in the device associative management system according to the sixth aspect of the invention can be obtained. Therefore, an effect equivalent to that of the device associative management system according to the sixth aspect of the present invention can be obtained.

A network device according to the twenty-seventh aspect of the present invention is characterized in that, in the network device according to the twenty-fifth aspect of the present invention, the network device is connected to a device management terminal managing the network device so as to be capable of communicating with each other, the network device further includes second management information transmission section which sends the management information in the second management information storage section to the device management terminal, when the network device itself is the representative network device, the network device validates operations of the second management information transmission section.

With such a constitution, an action equivalent to that of the network device in the device associative management system according to the seventh aspect of the invention can be obtained. Therefore, an effect equivalent to that of the device associative management system according to the seventh aspect of the present invention can be obtained.

A network device according to the twenty-eighth of the present invention is characterized in that, in the network device according to the twenty-seventh aspect of the present invention, when the network device itself is the dependent network device, the network device invalidates operations of the second management information transmission section.

With such a constitution, an action equivalent to that of the network device in the device associative management system according to the eighth aspect of the invention can be obtained. Therefore, an effect equivalent to that of the device associative management system according to the eighth aspect of the present invention can be obtained.

A network device according to the twenty-ninth aspect of the present invention is characterized in that, in the network device according to the twenty-fifth or twenty-seventh aspect of the present invention, the management information transmission section voluntarily sends the management information in the first management information storage section to the representative network device.

With such a constitution, an action equivalent to that of the network device in the device associative management system according to the ninth aspect of the invention can be obtained. Therefore, an effect equivalent to that of the device associative management system according to the ninth aspect of the present invention can be obtained.

A network device according to the thirtieth aspect of the present invention is characterized in that, in the network device according to any one of twenty-fifth, twenty-seventh, and twenty-ninth aspects of the present invention, when it is judged that there is no operative network device other than the network device itself among the plurality of network devices, the mode switching section switches the network device itself to the mode in which the network device becomes the representative network device.

With such a constitution, an action equivalent to that of the network device in the device associative management system according to the tenth aspect of the invention can be obtained. Therefore, an effect equivalent to that of the device associative management system according to the tenth aspect of the present invention can be obtained.

A network device according to the thirty-first aspect of the present invention is characterized in that, in the network device according to any one of twenty-fifth and twenty-seventh to thirtieth aspects of the present invention, in the case in which the network device itself is the representative network device, when a performance of the network device itself and a performance of the dependent network device are compared and it is judged that the performance of the dependent network device is higher, the mode switching section sends a substitution request for substitution of the representative network device to the dependent network device and switches the network device itself to the mode in which the network device becomes the dependent network device, and when the substitution request is received, the mode switching section switches the network device to the mode in which the network device becomes the representative network device.

With such a constitution, an action equivalent to that of the network device in the device associative management system according to the eleventh aspect of the invention can be obtained. Therefore, an effect equivalent to that of the device associative management system according to the eleventh aspect of the present invention can be obtained.

A network device according to the thirty-second aspect of the present invention is characterized in that, in the network device according to any one of the twenty-fifth and twenty-seventh to thirty-first aspects of the present invention, when the representative network device has become inoperative, the mode switching section selects a dependent network device having the highest performance out of the dependent network devices and switches the selected dependent network device to the representative network device.

With such a constitution, an action equivalent to that of the network device in the device associative management system according to the twelfth aspect of the invention can be obtained. Therefore, an effect equivalent to that of the device associative management system according to the twelfth aspect of the present invention can be obtained.

A network device according to the thirty-third aspect of the present invention is characterized in that, in the network device according to any one of the twenty-seventh to thirty-second aspects of the present invention, the network device includes: file detail information acquisition section which acquires the file detail information including a creation time from the device management terminal; file detail information transmission section which sends the file detail information acquired by the file detail information acquisition section to the dependent network devices; file detail information reception section which receives the file detail information; and time setting section which sets a time on the basis of the file detail information received by the file detail information reception section, when the network device itself is the representative network device, the network device validates operations of the file detail information acquisition section, the file detail information transmission section, and the time setting section, when the network device itself is the dependent network device, the network device validates operations of the file detail information reception section and the time setting section, and the file detail information acquisition section sends the file creation request to the device management terminal, sends the detail information acquisition request to the device management terminal, and receives the file detail information.

With such a constitution, an action equivalent to that of the network device in the device associative management system according to the thirteenth aspect of the invention can be obtained. Therefore, an effect equivalent to that of the device associative management system according to the thirteenth aspect of the present invention can be obtained.

A network device according to the thirty-fourth aspect of the present invention is characterized in that, in the network device according to the thirty-third aspects of the present invention, when the network device itself is the dependent network device, the network device invalidates operations of the file detail information acquisition section and the file detail information transmission section.

With such a constitution, an action equivalent to that of the network device in the device associative management system according to the fourteenth aspect of the invention can be obtained. Therefore, an effect equivalent to that of the device associative management system according to the fourteenth aspect of the present invention can be obtained.

A network device according to the thirty-fifth aspect of the present invention is characterized in that, in the network device according to any one of the twenty-seventh to thirty-third aspects of the present invention, the network device includes: power supply input section which inputs a power supply of the network device itself when a power supply input instruction for input of the power supply is received; and power supply input instruction transmission section which sends the power supply input instruction to the dependent network devices, when the network device itself is the representative network device, the network device validates operations of the power supply input instruction transmission section, and when the network device itself has become the representative network device, the power supply input instruction transmission section sends the power supply input instruction to the dependent network devices.

With such a constitution, an action equivalent to that of the network device in the device associative management system according to the fifteenth aspect of the invention can be obtained. Therefore, an effect equivalent to that of the device associative management system according to the fifteenth aspect of the present invention can be obtained.

A network device according to the thirty-sixth aspect of the present invention is characterized in that, in the network device according to the thirty-fifth aspect of the present invention, when the network device itself is the dependent network device, the network device invalidates operations of the power supply input instruction transmission section.

With such a constitution, an action equivalent to that of the network device in the device associative management system according to the sixteenth aspect of the invention can be obtained. Therefore, an effect equivalent to that of the device associative management system according to the sixteenth aspect of the present invention can be obtained.

A network device according to the thirty-seventh aspect of the present invention is characterized in that, in the network device according to any one of twenty-seventh to thirty-fifth aspects of the present invention, the network device includes: power supply isolation section which isolates a power supply of the network device itself when a power supply isolation instruction for isolation of the power supply is received; power supply isolation instruction transmission section which sends the power supply isolation instruction to the dependent network devices; power supply isolation request input section which inputs a power supply isolation request; and power supply isolation request notification section which, when the power supply isolation request is inputted by the power supply isolation request input section, notifies the representative network device to that effect, when the network device itself is the representative network device, the network device validates operations of the power supply isolation instruction transmission section, and when the power supply isolation request is notified, the power supply isolation instruction transmission section sends the power supply isolation instruction to the dependent network device.

With such a constitution, an action equivalent to that of the network device in the device associative management system according to the seventeenth aspect of the invention can be obtained. Therefore, an effect equivalent to that of the device associative management system according to the seventeenth aspect of the present invention can be obtained.

A network device according to the thirty-eighth aspect of the present invention is characterized in that, in the network device according to the thirty-seventh aspect of the present invention, when the network device itself is the dependent network device, the network device invalidates operations of the power supply isolation instruction transmission section.

With such a constitution, an action equivalent to that of the network device in the device associative management system according to the eighteenth aspect of the invention can be obtained. Therefore, an effect equivalent to that of the device associative management system according to the eighteenth aspect of the present invention can be obtained.

A network device according to the thirty-ninth aspect of the present invention is characterized in that, in the network device according to any one of the twenty-seventh to thirty-seventh aspects of the present invention, the network device includes: application reception section which receives an application from the device management terminal; application installing section which installs the received application; and application delivery section which delivers the application to the dependent network devices, when the network device itself is the representative network device, the network device validates operations of the application delivery section; and when the network device itself has become the representative network device, the application delivery section delivers the received application to the dependent network devices.

With such a constitution, an action equivalent to that of the network device in the device associative management system according to the nineteenth aspect of the invention can be obtained. Therefore, an effect equivalent to that of the device associative management system according to the nineteenth aspect of the present invention can be obtained.

A network device according to fortieth aspect of the present invention is characterized in that, in the network device according to the thirty-ninth aspect of the present invention, when the network device itself is the dependent network device, the network device invalidates operations of the application delivery section, and With such a constitution, an action equivalent to that of the network device in the device associative management system according to the twentieth aspect of the invention can be obtained. Therefore, an effect equivalent to that of the device associative management system according to the twentieth aspect of the present invention can be obtained.

A network device according to the forth-first aspect of the present invention is characterized in that, in the network device according to twenty-seventh to thirty-ninth aspects of the present invention, the network device includes: application uninstalling instruction reception section which receives an instruction to uninstall an application; application uninstalling section which uninstalls the application; and application uninstalling instruction transmission section which sends an uninstalling instruction to the dependent network devices, when the network device itself is the representative network device, the network device validates operations of the application uninstalling instruction transmission section, and when the network device itself has become the representative network device, the application uninstalling instruction transmission section sends the received application uninstalling instruction to the dependent network devices.

With such a constitution, an action equivalent to that of the network device in the device associative management system according to the twenty-first aspect of the invention can be obtained. Therefore, an effect equivalent to that of the device associative management system according to the twenty-first aspect of the present invention can be obtained.

A network device according to the forty-second aspect of the present invention is characterized in that, in the network device according to the forty-first aspect of the present invention, when the network device itself is the dependent network device, the network device invalidates operations of the application uninstalling instruction transmission section.

With such a constitution, an action equivalent to that of the network device in the device associative management system according to the twenty-second aspect of the invention can be obtained. Therefore, an effect equivalent to that of the device associative management system according to the twenty-second aspect of the present invention can be obtained.

On the other hand, in order to attain the above-described object, a program for a device according to a the forty-third aspect of the present invention is a program for causing a network device consisting of a computer to execute processing, characterized in that the program causes the computer to execute processing which is realized as: mode switching section which switches the network device to a mode in which the network device becomes the representative network device and a mode in which the network device becomes a dependent network device other than the representative network device among the plurality of network devices; management information transmission section which sends management information of the network device itself to the representative network device; management information reception section which receives the management information; and management information registration section which registers the management information received by the management information reception section in the management information storage section, and processing for, when the network device itself is the representative network device, validating operations of the management information reception section and the management information registration section, and when the network device itself is the dependent network device, validating operations of the management information transmission section.

With such a constitution, when the program is read by the computer and the computer executes the processing in accordance with the read program, an action and an effect equivalent to those in the network device according to the twenty-third aspect of the present invention can be obtained.

Further, a program for a device according to the forty-fourth aspect of the present invention is characterized in that, in the program for a device according to the forty-third aspect of the present invention, when the network device itself is the dependent network device, the network device invalidates operations of the management information registration section.

With such a constitution, when the program is read by the computer and the computer executes the processing in accordance with the read program, an action and an effect equivalent to those in the network device according to the twenty-fourth aspect of the present invention can be obtained.

A program for a device according to the forty-fifth aspect of the present invention is a program for causing a network device consisting of a computer to execute processing, characterized in that the program causes the computer to execute processing which is realized as: mode switching section which switches the network device to a mode in which the network device becomes the representative network device and a mode in which the network device becomes a dependent network device other than the representative network device among the plurality of network devices; management information transmission section which sends management information of the network device itself in the first management information storage section to the representative network device; management information reception section which receives the management information; and management information registration section which registers the management information received by the management information reception section in the second management information storage section, and processing for, when the network device itself is the representative network device, validating operations of the management information reception section and the management information registration section, and when the network device itself is the dependent network device, validating operations of the management information transmission section.

With such a constitution, when the program is read by the computer and the computer executes the processing in accordance with the read program, an action and an effect equivalent to those in the network device according to the twenty-fifth aspect of the present invention can be obtained.

A program for a device according to the forty-sixth aspect of the present invention is characterized in that, in the program for a device according to the forty-fifth aspect of the present invention, when the network device itself is the dependent network device, the network device invalidates operations of the management information registration section.

With such a constitution, when the program is read by the computer and the computer executes the processing in accordance with the read program, an action and an effect equivalent to those in the network device according to the twenty-sixth aspect of the present invention can be obtained.

A program for a device according to the forty-seventh aspect of the present invention is characterized in that, in the program for a device according to the forty-fifth aspect of the present invention, the program causes the computer to execute processing, which is realized as second management information transmission section which sends the management information in the second management information storage section to the device management terminal managing the network device, and processing for, when the network device itself is the representative network device, validating operations of the second management information transmission section.

With such a constitution, when the program is read by the computer and the computer executes the processing in accordance with the read program, an action and an effect equivalent to those in the network device according to the twenty-seventh aspect of the present invention can be obtained.

A program for a device according to the forty-eighth aspect of the present invention is characterized in that, in the program for a device according to the forty-seventh aspect of the present invention, when the network device itself is the dependent network device, the network device invalidates operations of the second management information transmission section.

With such a constitution, when the program is read by the computer and the computer executes the processing in accordance with the read program, an action and an effect equivalent to those in the network device according to the twenty-eighth aspect of the present invention can be obtained.

A program for a device according to the forty-ninth aspect of the present invention is characterized in that, in the program for a device according to forty-fifth or forty-seventh aspect of the present invention, the management information transmission section voluntarily sends the management information in the first management information storage section to the representative network device.

With such a constitution, when the program is read by the computer and the computer executes the processing in accordance with the read program, an action and an effect equivalent to those in the network device according to the twenty-ninth aspect of the present invention can be obtained.

A program for a device according to the fiftieth aspect of the present invention is characterized in that, in the program for a device according to any one of forty-fifth, forty-seventh, and forty-ninth aspects of the present invention, when it is judged that there is no operative network device other than the network device itself among the plurality of network devices, the mode switching section switches the network device itself to the mode in which the network device becomes the representative network device.

With such a constitution, when the program is read by the computer and the computer executes the processing in accordance with the read program, an action and an effect equivalent to those in the network device according to the thirtieth aspect of the present invention can be obtained.

A program for a device according to the fifty-first aspect of the present invention is characterized in that, in the program for a device according to any one of forty-fifth and forty-seventh to fiftieth aspects of the present invention, in the case in which the network device itself is the representative network device, when a performance of the network device itself and a performance of the dependent network device are compared and it is judged that the performance of the dependent network device is higher, the mode switching section sends a substitution request for substitution of the representative network device to the dependent network device and switches the network device itself to the mode in which the network device becomes the dependent network device, and when the substitution request is received, the mode switching section switches the network device to the mode in which the network device becomes the representative network device.

With such a constitution, when the program is read by the computer and the computer executes the processing in accordance with the read program, an action and an effect equivalent to those in the network device according to the thirty-first aspect of the present invention can be obtained.

A program for a device according to the fifty-second aspect of the present invention is characterized in that, in the program for a device according to any one of forty-fifth and forty-seventh to fifty-first aspects of the present invention, when the representative network device has become inoperative, the mode switching section selects a dependent network device having the highest performance out of the dependent network devices and switches the selected dependent network device to the representative network device.

With such a constitution, when the program is read by the computer and the computer executes the processing in accordance with the read program, an action and an effect equivalent to those in the network device according to the thirty-second aspect of the present invention can be obtained.

A program for a device according to the fifty-third aspect of the present invention is characterized in that, in the program for a device according to the forty-seventh to fifty-second aspects of the present invention, the program is a program for causing the computer to execute processing which is realized as: file detail information acquisition section which acquires the file detail information including a creation time from the device management terminal; file detail information transmission section which sends the file detail information acquired by the file detail information acquisition section to the dependent network devices; file detail information reception section which receives the file detail information; and time setting section which sets a time on the basis of the file detail information received by the file detail information reception section, and processing for, when the network device itself is the representative network device, validating operations of the file detail information acquisition section, the file detail information transmission section, and the time setting section, and when the network device itself is the dependent network device, the network device validates operations of the file detail information reception section and the time setting section, and the file detail information acquisition section sends the file creation request to the device management terminal, sends the detailed information acquisition request to the device management terminal, and receives the file detail information.

With such a constitution, when the program is read by the computer and the computer executes the processing in accordance with the read program, an action and an effect equivalent to those in the network device according to the thirty-third aspect of the present invention can be obtained.

A program for a device according to the fifty-fourth aspect of the present invention is characterized in that, in the program for a device according to the fifty-third aspect of the present invention, when the network device itself is the dependent network device, the network device invalidates operations of the file detail information acquisition section and the file detail information transmission section.

With such a constitution, when the program is read by the computer and the computer executes the processing in accordance with the read program, an action and an effect equivalent to those in the network device according to the thirty-fourth aspect of the present invention can be obtained.

A program for a device according to the fifty-fifth aspect of the present invention is characterized in that, in the program for a device according to any one of forty-seventh to fifty-third aspects of the present invention, the program is a program for causing the computer to execute processing which is realized as: power supply input section which inputs a power supply of the network device itself when a power supply input instruction for input of the power supply is received; and power supply input instruction transmission section which sends the power supply input instruction to the dependent network devices, and processing for, when the network device itself is the representative network device, validating operations of the power supply input instruction transmission section, and when the network device itself has become the representative network device, the power supply input instruction transmission section sends the power supply input instruction to the dependent network devices.

With such a constitution, when the program is read by the computer and the computer executes the processing in accordance with the read program, an action and an effect equivalent to those in the network device according to the thirty-fifth aspect of the present invention can be obtained.

A program for a device according to the fifty-sixth aspect of the present invention is characterized in that, in the program for a device according to the fifty-fifth aspect of the present invention, when the network device itself is the dependent network device, the network device invalidates operations of the power supply input instruction transmission section.

With such a constitution, when the program is read by the computer and the computer executes the processing in accordance with the read program, an action and an effect equivalent to those in the network device according to the thirty-sixth aspect of the present invention can be obtained.

A program for a device according to the fifty-seventh aspect of the present invention is characterized in that, in the program for a device according to any one of forty-seventh to fifty-fifth aspects of the present invention, the program is a program for causing the computer to execute processing which is realized as: power supply isolation section which isolates a power supply of the network device itself when the network device receives a power supply isolation instruction for isolation of the power supply; power supply isolation instruction transmission section which sends the power supply isolation instruction to the dependent network devices; power supply isolation request input section which inputs a power supply isolation request; and power supply isolation request notification section which, when the power supply isolation request is inputted by the power supply isolation request input section, notifies the representative network device to that effect, and processing for, when the network device itself is the representative network device, validating operations of the power supply isolation instruction transmission section, and when the power supply isolation request is notified, the power supply isolation instruction transmission section sends the power supply isolation instruction to the dependent network device.

With such a constitution, when the program is read by the computer and the computer executes the processing in accordance with the read program, an action and an effect equivalent to those in the network device according to the thirty-seventh aspect of the present invention can be obtained.

A program for a device according to the fifty-eighth aspect of the present invention is characterized in that, in the program for a device according to the fifty-seventh aspect of the present invention, when the network device itself is the dependent network device, the network device invalidates operations of the power supply isolation instruction transmission section.

With such a constitution, when the program is read by the computer and the computer executes the processing in accordance with the read program, an action and an effect equivalent to those in the network device according to the thirty-eighth aspect of the present invention can be obtained.

A program for a device according to the fifty-ninth aspect of the present invention is characterized in that, in the program for a device according to any one of forty-seventh to fifty-seventh aspects of the present invention, the program is a program for causing the computer to execute processing which is realized as: application reception section which receives an application from the device management terminal; application installing section which installs the received application; and application delivery section which delivers the application to the dependent network devices, and processing for, when the network device itself is the representative network device, validating operations of the application delivery section; and when the network device itself has become the representative network device, the application delivery section delivers the received application to the dependent network devices.

With such a constitution, when the program is read by the computer and the computer executes the processing in accordance with the read program, an action and an effect equivalent to those in the network device according to the thirty-ninth aspect of the present invention can be obtained.

A program for a device according to the sixtieth aspect of the present invention is characterized in that, in the program for a device according to the fifty-ninth aspect of the present invention, when the network device itself is the dependent network device, the network device invalidates operations of the application delivery section.

With such a constitution, when the program is read by the computer and the computer executes the processing in accordance with the read program, an action and an effect equivalent to those in the network device according to the fortieth aspect of the present invention can be obtained.

A program for a device according to the sixty-first aspect of the present invention is characterized in that, in the program for a device according to any one of forty-seventh to fifty-ninth aspects of the present invention, the program is a program for causing the computer to execute processing which is realized as: application uninstalling instruction reception section which receives an instruction to uninstall an application; application uninstalling section which uninstalls the application; and application uninstalling instruction transmission section which sends an uninstalling instruction to the dependent network devices, and processing for, when the network device itself is the representative network device, validating operations of the application uninstalling instruction transmission section, and when the network device itself has become the representative network device, the application uninstalling instruction transmission section sends the received application uninstalling instruction to the dependent network devices.

With such a constitution, when the program is read by the computer and the computer executes the processing in accordance with the read program, an action and an effect equivalent to those in the network device according to the forty-first aspect of the present invention can be obtained.

A program for a device according to the sixty-second aspect of the present invention is characterized in that, in the program for a device according to the sixty-first aspect of the present invention, when the network device itself is the dependent network device, the network device invalidates operations of the application uninstalling instruction transmission section.

With such a constitution, when the program is read by the computer and the computer executes the processing in accordance with the read program, an action and an effect equivalent to those in the network device according to the forty-second aspect of the present invention can be obtained.

On the other hand, in order to attain the above-described object, a device associative management method according to the sixty-third aspect of the present invention is a method with which a plurality of network devices are connected so as to be capable of communicating with each other and any one of the plurality of network devices becomes a representative network device to collect management information of the plurality of network devices including the representative network device itself, characterized in that the method includes: a step of switching modes of the respective network devices such that any one of the plurality of network devices becomes the representative network device and the network devices other than the representative network device become dependent network devices, with respect to the dependent network device, a management information transmission step of sending management information of the network device itself to the representative network device, and with respect to the representative network device, a management information reception step of receiving the management information, and a management information registration step of registering the management information received in the management information reception step and management information of the network device itself in management information storage section.

Consequently, an effect equivalent to that of the device associative management system according to the first aspect of the present invention can be obtained.

A device associative management method according to a the sixty-fourth aspect of the present invention is a method with which a plurality of network devices are connected so as to be capable of communicating with each other and any one of the plurality of network devices becomes a representative network device to collect management information of the plurality of network devices including the representative network device itself, characterized in that the method includes: with respect to the network device, a mode switching step of switching the network device to a mode in which the network device becomes the representative network device or a mode in which the network device becomes a dependent network device other than the representative network device among the plurality of network devices;

with respect to the dependent network device, a management information transmission step of sending management information of the network device itself stored in first management information storage section to the representative network device, and with respect to the representative network device, a management information reception step of receiving the management information and a management information registration step of registering the management information received in the management information reception step and management information of the network device itself in the second management information storage section.

Consequently, an effect equivalent to that of the device associative management system according to the fourth aspect of the present invention can be obtained.

A device associative management method according to the sixty-fifth aspect of the present invention is characterized in that, in the device associative management method according to the sixty-fourth aspect of the present invention, the device associative management method includes:

with respect to the representative network device, a second management information transmission step of sending management information in the second management information storage section to a device management terminal managing the network device.

Consequently, an effect equivalent to that of the device associative management system of the seventh aspect of the present invention can be obtained.

A device associative management method according to the sixty-sixth aspect of the present invention is characterized in that, in the device associative management method according to sixty-fourth or sixty-fifth aspect of the present invention, characterized in that the management information transmission step voluntarily sends management information in the first management information storage section to the representative network device.

Consequently, an effect equivalent to that of the device associative management system according to the ninth aspect of the present invention can be obtained.

A device associative management method according to the sixty-seventh aspect of the present invention is characterized in that, in the device associative management method according to any one of sixty-fourth to sixty-sixth aspects of the present invention, when the mode switching step judges that there is no operative network device other than the network device itself among the plurality of network devices, the mode switching step switches the network device itself to the mode in which the network device becomes the representative network device.

Consequently, an effect equivalent to that of the device associative management system according to the tenth aspect of the present invention can be obtained.

A device associative management method according to the sixty-eighth aspect of the present invention is characterized in that, in the device associative management method according to any one of sixty-fourth to sixty-seventh aspects of the present invention, in the case in which the network device itself is the representative network device, when a performance of the network device itself and a performance of the dependent network device are compared and it is judged that the performance of the dependent network device is higher, the mode switching step sends a substitution request for substitution of the representative network device to the dependent network device and switches the network device itself to the mode in which the network device becomes the dependent network device, and the dependent network device that received the substitution request is switched to the mode in which the dependent network device becomes the representative network device.

Consequently, an effect equivalent to that of the device associative management system according to the eleventh aspect of the present invention can be obtained.

A device associative management method according to the sixty-ninth aspect of the present invention is characterized in that, in the device associative management method according to any one of sixty-fourth to sixty-eighth aspects of the present invention, when the representative network device has become inoperative, the mode switching step selects a dependent network device having the highest performance out of the dependent network devices and switches the selected dependent network device to the representative network device.

Consequently, an effect equivalent to that of the device associative management system according to the twelfth aspect of the present invention can be obtained.

A device associative management method according to the seventieth aspect of the present invention is characterized in that, in the device associative management method according to any one of sixty-fifth to sixty-ninth aspects of the present invention, the device associative management method includes:

with respect to the device management terminal, a step of, when a file creation request for creation of a file is received, creating a file relating to the received file creation request and recording the created file in storage section together with a creation time thereof, and a step of, when detailed information acquisition request for acquisition of file detail information including the creation time is received, creating the file detail information for a file relating to the received detail information acquisition request among the files in the storage section and sending the created file detail information to a request source;

with respect to the representative network device, a file detail information acquisition step of acquiring file detail information including the creation time from the device management terminal, a file detail information transmission step of sending the file detail information acquired in the file detail information acquisition step to the dependent network devices, and a time setting step of setting a time on the basis of the file detail information acquired in the file detail information acquisition step; and with respect to the dependent network device, a file detail information reception step of receiving the file detail information, and a time setting step of setting a time on the basis of the file detail information received in the file detail information reception step, and the file detail information acquisition step sends the file creation request to the device management terminal, sends the detail information acquisition request to the device management terminal, and receives the file detail information.

Consequently, an effect equivalent to that of the device associative management system according to the thirteenth aspect of the present invention can be obtained.

A device associative management method according to the seventy-first aspect of the present invention is characterized in that, in the device associative management method according to any one of sixty-fifth to seventieth aspects of the present invention, the device associative management method further includes:

with respect to the network device, a power supply input step of, when a power supply input instruction for input of a power supply is received, inputting a power supply of the network device itself; and with respect to the representative network device, a power supply input instruction transmission step of sending the power supply input instruction to the dependent network devices.

Consequently, an effect equivalent to the device associative management system according to the fifteenth aspect of the present invention can be obtained.

Here, the power supply input instruction transmission step may be any method as long as the method transmits a power supply input instruction to a dependent network device to which power supply is not inputted. For example, a power supply input instruction may be transmitted to any dependent network device.

A device associative management method according to the seventy-second aspect of the present invention is characterized in that, in the device associative management method according to any one of sixty-fifth to seventy-first aspects of the present invention, the device associative management method includes:

with respect to the network device, a power supply isolation step of, when a power supply isolation instruction for isolation of a power supply is received, isolating a power supply of the network device itself, a power supply isolation request input step of inputting a power supply isolation request, and a power supply isolation request notification step of, when the power supply isolation request is inputted in the power supply isolation request input step, notifying the representative network device to that effect; and with respect to the representative network device, a power supply isolation instruction transmission step of, when the power supply isolation request is notified, sending the power supply isolation instruction to the dependent network devices.

Consequently, an effect equivalent to that of the device associative management system according to the seventeenth aspect of the present invention can be obtained.

Here, the power supply input instruction transmission step may be any method as long as the method transmits a power supply input instruction to a dependent network device to which power supply is not isolated. For example, a power supply isolation instruction may be transmitted any dependent network device.

A device associative management method according to the seventy-third aspect of the present invention is characterized in that, in the device associative management method according to any one of sixty-fifth to seventy-second aspects of the present invention, the device associative management method includes:

with respect to the network device, an application reception step of receiving an application from the device management terminal, and an application installing step of installing the received application; and with respect to the representative network device, an application delivery step of delivering the received application to the dependent network devices.

Consequently, an effect equivalent to that of the device associative management system according to the nineteenth aspect of the present invention can be obtained.

A device associative management method according to the seventy-fourth aspect of the present invention is characterized in that, in the device associative management method according to any one of the sixty-fifth to the seventy-third aspects of the present invention, the device associative management method includes:

with respect to the network device, an application uninstalling instruction reception step of receiving an instruction for uninstalling an application, and an application uninstalling step of uninstalling the application; and with respect to the representative network device, an application uninstalling instruction transmission step of sending the received application uninstalling instruction to the dependent network devices.

Consequently, an effect equivalent to that of the device associative management system according to the twenty-first aspect of the present invention can be obtained.

BRIEF DESCRIPTION OF THE DRAWINGS

FIG. 12 is a diagram showing a data structure of a printer information registration table 530;

FIG. 13 is a diagram showing a data structure of performance information 540;

FIG. 14 is a diagram showing a data structure of a timing information registration table 550;

FIG. 15 is a diagram showing a data structure of a status information registration table 560;

DETAILED DESCRIPTION OF THE PREFERRED EMBODIMENTS

An embodiment of the present invention will be hereinafter described with reference to the accompanying drawings. FIGS. 1 to 39 are figures showing an embodiment of a device associative management system, a network device, and a program for a device, as well as a device associative management method in accordance with the present invention.

Figure 1:
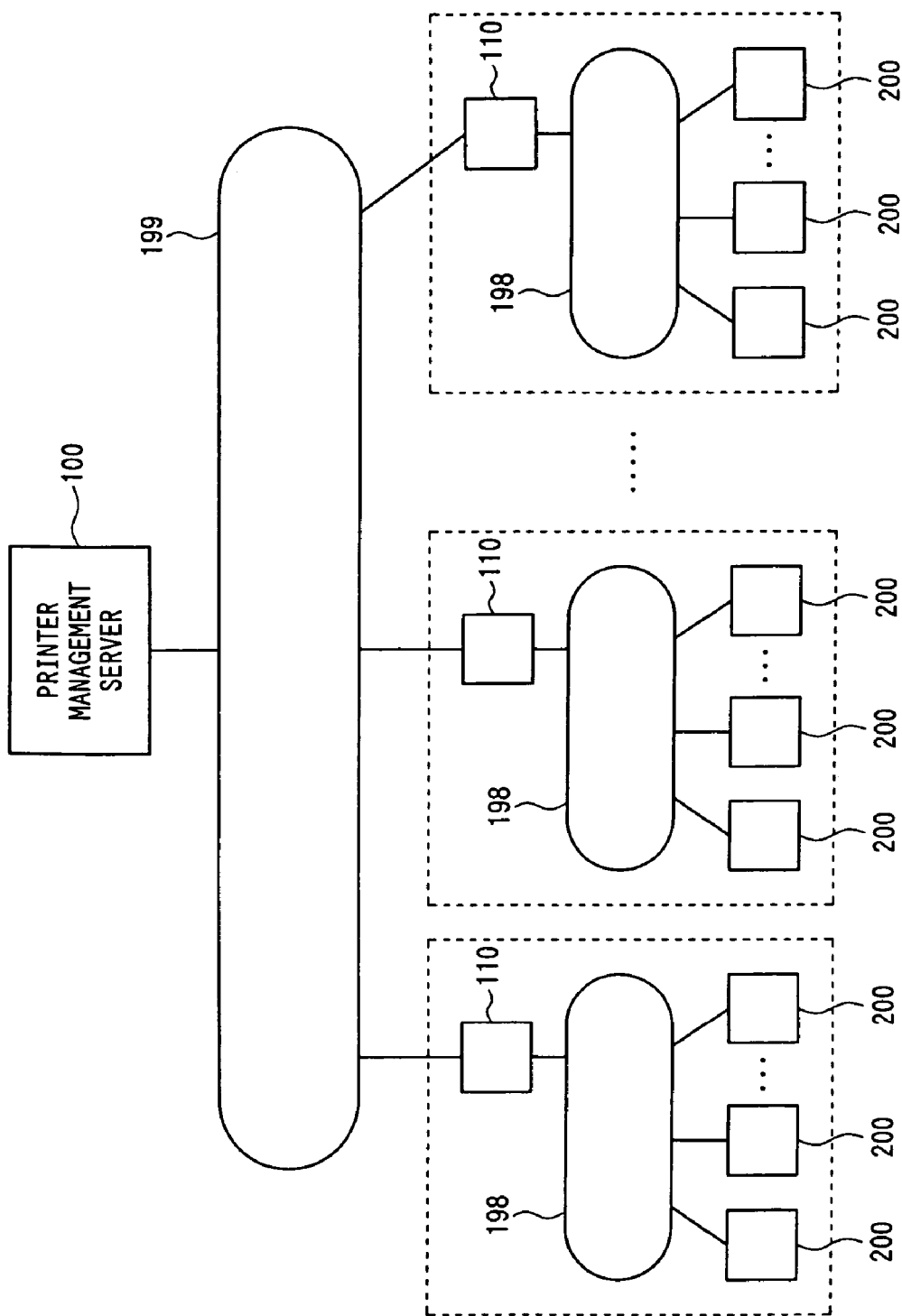
FIG. 1 is a block diagram showing a structure of a network system to which the present invention is applied.

In this embodiment, the device associative management system, the network device, and the program for a device, as well as the device associative management method in accordance with the present invention are applied to a case in which status information is collected to a plurality of network printers 200 as shown in FIG. 1.

First, a structure of a network system to which the present invention is applied will be described with reference to FIG. 1.

FIG. 1 is a block diagram showing the structure of the network system to which the present invention is applied.

As shown in FIG. 1, a printer management server 100, which manages the network printers 200, and a plurality of routers 110 are connected to the Internet 199. The plurality of network printers 200 are connected to the respective routers 110, and the network printers 200 are connected to the Internet 199 via the router 110. In addition, one sub-network 198 is constituted by the router 110 and the network printers 200. The sub-network 198 is constructed, for example, for each company. In addition, although not specifically illustrated, a large number of user terminals are connected to the respective sub-networks 198.

Any one of the network printers 200 belonging to the identical sub-network 198 dynamically becomes a server printer 200 (hereinafter abbreviated as S printer in the drawings), and the other network printers 200 become client printers 200 (hereinafter abbreviated as C printers in the drawings). The server printer 200 collects status information of the client printers 200 as a representative printer. The status information includes, for example, residual amount information on a residual amount of toner or ink, number of printed sheets information on the number of sheets used for printing, and trouble information concerning a trouble such as a failure.

The client printer 200 periodically generates status information of the network printer 200 itself and stores the generated status information in a storage. Then, when a predetermined date and time for notification has come, the client printer 200 sends the status information in the storage to the server printer 200.

The server printer 200 periodically generates status information of the server printer 200 itself and stores the generated status information in a storage. Then, when status information is received, the server printer 200 stores the received status information for each client printer 200 in the storage. When a predetermined date and time has come, the server printer 200 sends the status information in the storage to the printer management server 100.

Note that, concerning timing at which the client printer 200 sends information to the server printer 200 or other timing, the client printer 200 periodically monitors specific MIB information of its own and, when there is a change in the MIB information, sends message information indicating the MIB information or the change to the server printer 200.

For example, the client printer 200 monitors an MIB value of its own cover state once in a predetermined period (e.g., thirty seconds). When it is detected that the cover is open, that is, an MIB value indicating a cover state is 1, the client printer 200 sends information of "MIB value=1" or message information of "cover is open" to the server printer 200. In addition, for example, the client printer 200 monitors an MIB value of its own residual amount of toner once in a predetermined period (e.g., one minute). When it is detected that the residual amount of toner is below a predetermined value (e.g., 20%), the client printer 200 sends information on a residual amount of toner or message information "residual amount of toner is little" to the server printer 200.

The printer management server 100 manages the respective server printers 200. When status information is received, the printer management server 100 stores the received status information for each server printer 200 in a storage.

The user terminal has identical functions as a general computer in which a CPU, a ROM, a RAM, an I/F, and the like are connected by a bus. By giving a print instruction and print data to any one of the network printers 200, the user terminal can perform printing in the network printer 200.

Next, a structure of the printer management server 100 will be described in detail with reference to FIG. 2.

Figures 2, 3:
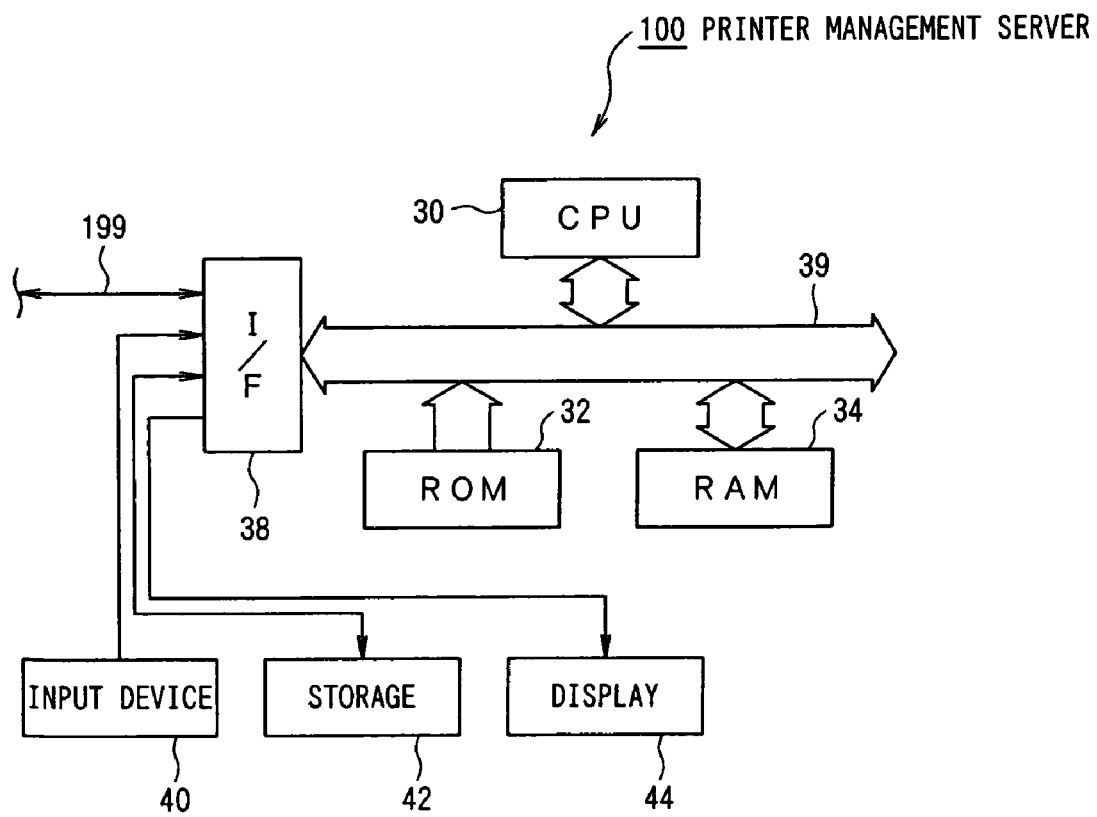
FIG. 2 is a block diagram showing a structure of a printer management server 100.
FIG. 3 is a diagram showing a data structure of a printer information registration table 400.

FIG. 2 is a block diagram showing the structure of the printer management server 100.

As shown in FIG. 2, the printer management server 100 includes a CPU 30 which controls arithmetic operations and an entire system on the basis of a control program, a ROM 32 which has the control program or the like of the CPU 30 stored in a predetermined area thereof in advance, a RAM 34 for storing data read out from the ROM 32 or the like and an arithmetic operation result required in a course of the arithmetic operation of the CPU 30, and an I/F 38 which mediates input/output of data to an external device. These are connected to each other and so as to be capable of exchanging data by a bus 39 which serves as a signal line for transferring data.

An input device 40 consisting of a keyboard, a mouse, or the like which is capable of inputting data as a human interface, a storage 42 which stores data, a table, or the like as a file, a display 44 which displays a screen on the basis of an image signal, and a signal line for making connection to the Internet 199 are connected to the I/F 38 as external devices.

Printer information registration table 400, in which printer information on the server printers 200 is registered, and a timing information registration table 410, in which timing information indicating access timing of the server printers 200 is registered, are stored in the storage 42. Note that, although not illustrated, a status information registration table for collection, in which status information from the respective server printers 200 is registered, is stored in the storage 42.

FIG. 3 is a diagram showing a data structure of the printer information registration table 400.

The printer information registration table 400 is used by the printer management server 100 in order to communicate with the respective server printers 200. As shown in FIG. 3, one record is registered for each server printer 200 in the printer information registration table 400. Each record includes a field 402, in which IP addresses of the server printers 200 are registered, and a field 404, in which names of the server printers 200 are registered.

Figures 4, 5:
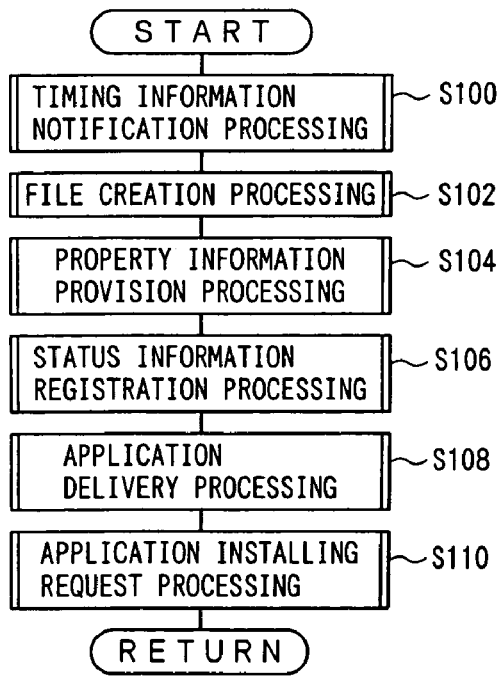
FIG. 4 is a diagram showing a data structure of a timing information registration table 410.
FIG. 5 is a flowchart showing main processing of the printer management server 100.

FIG. 4 is a diagram showing a data structure of the timing information registration table 410.

The timing information registration table 410 specifies a notification date and time for starting an access to the printer management sever 100 for each server printer 200 as access timing such that access periods of the respective server printers 200 do not overlap each other. As shown in FIG. 4, one record is registered for each server printer 200. Each record includes a field 412, in which IP addresses of the server printers 200 are registered, a field 414, in which names of the server printers 200 are registered, and a field 416, in which notification dates and times when the server printers 200 start an access are registered.

On the other hand, referring to FIG. 2 again, the CPU 30 consists of a micro-processing unit (MPU) or the like and is adapted to start a predetermined program stored in a predetermined area of the ROM 32 and execute main processing shown in a flowchart of FIG. 5 in accordance with the program.

First, main processing of the printer management server 100 will be described in detail with reference to FIG. 5.

FIG. 5 is a flowchart showing the main processing of the printer management server 100.

When the main processing is executed in the CPU 30, first, the printer management server 100 shifts to step S100 as shown in FIG. 5.

In step S100, the printer management server 100 executes timing information notification processing for notifying timing information to the server printer 200. The printer management server 100 shifts to step S102 to execute file creation processing for creating a file in the storage 42 in response to a file creation request from the server printer 200. Then, the printer management server 100 shifts to step S104.

In step S104, the printer management server 100 executes property information provision processing for generating property information including a creation time of the file and providing the server printer 200 with the property information in response to a property information acquisition request from the server printer 200. The printer management server 100 shifts to step S106 to execute status information registration processing for registering the status information from the server printer 200 in the storage 42. Then, the printer management server 100 shifts to step S108.

In step S108, the printer management server 100 executes application delivery processing for delivering an application to the server printer 200. The printer management server 100 shifts to step S110 to execute application uninstalling request processing for requesting the server printer 200 to uninstall the installed application. Then, the printer management server 100 ends the series of processing to return the main processing to the original processing.

Next, the timing information notification processing of step S100 will be described in detail with reference to FIG. 6.

Figure 6:
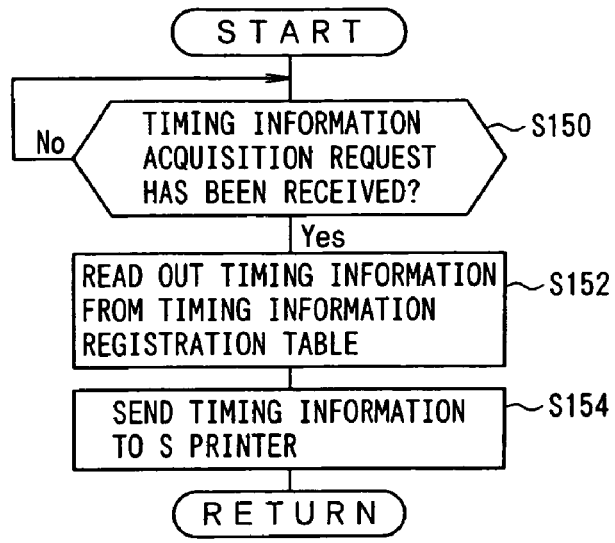
FIG. 6 is a flowchart showing timing information notification processing of step S100.

FIG. 6 is a flowchart showing the timing information notification processing of step S100.

The timing information notification processing is processing for notifying the server printer 200 of timing information. When the timing information notification processing is executed in step S100, as shown in FIG. 6, first, the printer management server 100 shifts to step S150.

In step S150, the printer management server 100 judges whether or not a timing information acquisition request for requesting acquisition of timing information has been received. When it is judged that the timing information acquisition request has been received (Yes), the printer management server 100 shifts to step S152. When it is judged that the timing information acquisition request has not been received (No), the printer management server 100 stands by in step S150 until the timing information acquisition request is received.

In step S152, the printer management server. 100 reads out a notification date and time corresponding to the server printer 200 of a request source from the timing information registration table 410. The printer management server 100 shifts to step S154 to send timing information including the read-out notification date and time to the server printer 200 of a request source. Then, the printer management server 100 ends the series of processing to return the timing information notification processing to the original processing.

Next, the file creation processing of step S102 will be described in detail with reference to FIG. 7.

Figure 7:
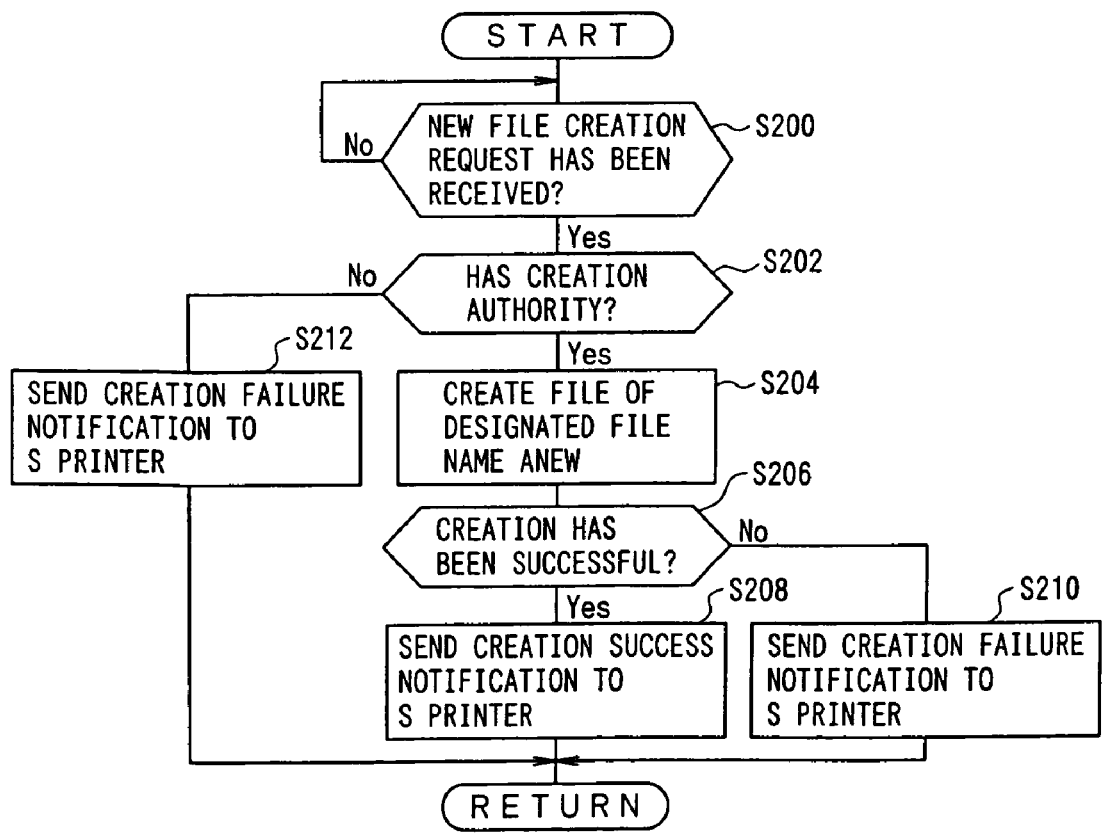
FIG. 7 is a flowchart showing file creation processing of step S102.

FIG. 7 is a flowchart showing the file creation processing of step S102.

The file creation processing is processing for creating a file in the storage 42 in response to a file creation request from the server printer 200. When the file creation processing is executed in step S102, as shown in FIG. 7, first, the printer management server 100 shifts to step S200.

In step S200, the printer management server 100 judges whether or not a file creation request for requesting creation of a file has been received. When it is judged that the file creation request has been received (Yes), the printer management server 100 shifts to step S202. When it is judge that the file creation request has not been received (No), the printer management server 100 stands by in step S200 until the file creation request is received.

In step S202, the printer management server 100 judges whether or not the server printer 200 of a request source or a user thereof has an authority to create a file. When it is judged that the server printer 200 of a request source or the user thereof has the authority to create a file (Yes), the printer management server 100 shifts to step S204 to create a file of a file name designated by the file creation request in the storage 42 anew. Then, the printer management server 100 shifts to step S206.

In step S206, the printer management server 100 judges whether or not the creation of a file has been successful. If it is judged that the creation of a file has been successful (Yes), the printer management server 100 shifts to step S208 to send a creation success notification indicating that the creation of a file has been successful to the server printer 200 of a request source. Then, the printer management server 100 ends the series of processing and returns the file creation processing to the original processing.

On the other hand, when it is judged in step S206 that the creation of a file has been unsuccessful (No), the printer management server 100 shifts to step S210 to send a creation failure notification indicating that the creation of a file has been unsuccessful to the server printer 200 of a request source. Then, the printer management server 100 ends the series of processing and returns the file creation processing to the original processing.

On the other hand, when it is judged in step S202 that the server printer 200 of a request source or the user thereof does not have an authority to create a file (No), the printer management server 100 shifts to step S212 to send a creation failure notification to the server printer 200 of a request source. Then, the printer management server 100 returns the series of processing and returns the file creation processing to the original processing.

Next, the property information provision processing of step S104 will be described in detail with reference to FIG. 8.

Figure 8:
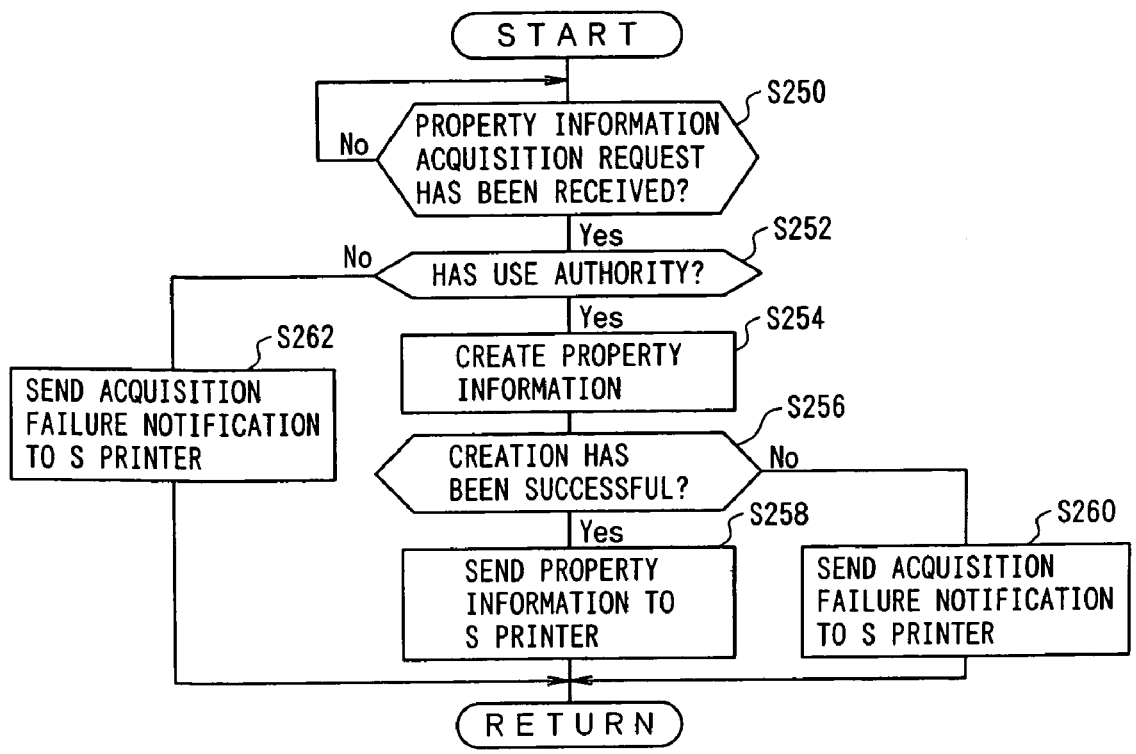
FIG. 8 is a flowchart showing property information provision processing of step S104.

FIG. 8 is a flowchart showing the property information provision processing of step S104.

The property information provision processing is processing for generating property information including a creation time of a file and providing the server printer 200 with the property information in response to a property information acquisition request from the server printer 200. When the property information provision processing is executed in step S104, as shown in FIG. 8, first, the printer management server 100 shifts to step S250.

In step S250, the printer management server 100 judges whether or not the property information acquisition request requesting acquisition of property information has been received. When it is judged that the property information acquisition request has been received (Yes), the printer management server 100 shifts to step S252. When it is judged that the property information acquisition request has not been received (No), the printer management server 100 stands by in step S250 until the property information acquisition request is received.

In step S252, the printer management server 100 judges whether or not the server printer 200 of a request source or a user thereof has an authority to acquire property information. When it is judged that the server printer 200 of a request source or the user thereof has an authority to acquire property information (Yes), the printer management server 100 shifts to step S254 to create property information for a file of a file name designated by the property information acquisition request among the files stored in storage device 42. Then, the printer management server 100 shifts to step S256.

In step S256, the printer management server 100 judges whether or not the creation of property information has been successful. When it is judged that the creation of property information has been successful (Yes), the printer management server 100 shifts to step S258 to send the created property information to the server printer 200 of a request source. Then, the printer management server 100 ends the series of processing and returns the property information provision processing to the original processing.

On the other hand, when it is judged in step S256 that the creation of property information has been unsuccessful (No), the printer management server 100 shifts to step S260 to send an acquisition failure notification indicating that the creation of property information has been unsuccessful to the server printer 200 of a request source. Then, the printer management server 100 ends the series of processing and returns the property information provision processing to the original processing.

On the other hand, when it is judged in step S252 that the server printer 200 of a request source or the user thereof does not have an authority to acquire property information (No), the printer management server 100 shifts to step S262 to send an acquisition failure notification to the server printer 200 of a request source. Then, the printer management server 100 ends the series of processing and returns the property information provision processing to the original processing.

Next, the status information registration processing of step S106 will be described in detail with reference to FIG. 9.

Figure 9:
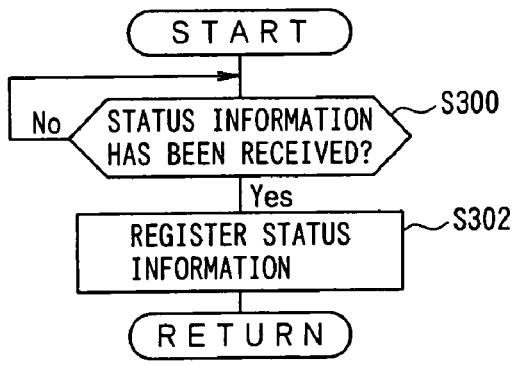
FIG. 9 is a flowchart showing status information registration processing of step S106.

FIG. 9 is a flowchart showing the status information registration processing of step S106.

The status information registration processing is processing for registering status information from the server printer 200 in the storage 42. When the status information registration processing is executed in step S106, as shown in FIG. 9, first, the printer management server 100 shifts to step S300.

In step S300, the printer management server 100 judges whether or not the status information has been received. When it is judged that the status information has been received (Yes), the printer management server 100 shifts to step S302. When it is judged that the status information has not been received (No), the printer management server 100 stands by in step S300 until the status information is received.

In step S302, the printer management server 100 registers the received status information for each network printer 200 in a status information registration table for collection. Then, the printer management server 100 ends the series of processing and returns the status information registration processing to the original processing.

Next, the application delivery processing of step S108 will be described in detail with reference to FIG. 40.

Figure 40:
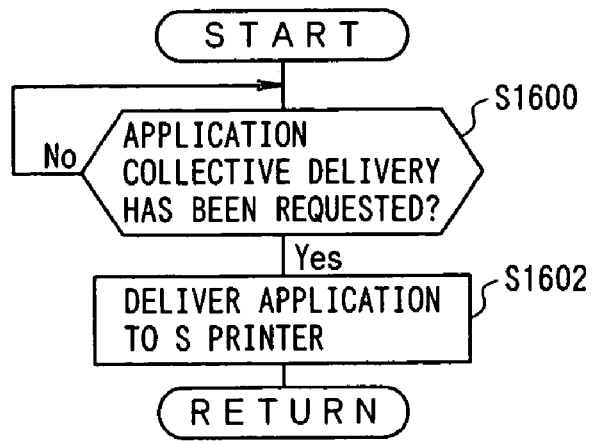
FIG. 40 is a flowchart showing application delivery processing of step S108.

FIG. 40 is a flowchart showing the application delivery processing of step S108.

The application delivery processing is processing for delivering applications to the server printers 200. When the application delivery processing is executed in step S108, as shown in FIG. 40, first, the printer management server 100 shifts to step S1600.

In step S1600, the printer management server 100 judges whether or not collective delivery of an application has been requested. When it is judged that the collective delivery of an application has been requested (Yes), the printer management server 100 shifts to step S1602. When it is judged that the collective delivery of an application has not been requested (No), the printer management server 100 stands by in step S1600 until the collective delivery of an application is requested.

In step S1602, the printer management server 100 delivers the applications to the server printers 200. Then, the printer management server 100 ends the series of processing and returns the application delivery processing to the original processing.

Next, the application uninstalling request processing of step S110 will be described in detail with reference to FIG. 41.

Figure 41:
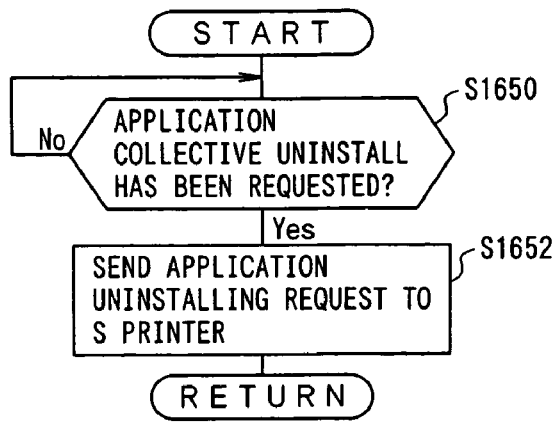
FIG. 41 is a flowchart showing application uninstalling request processing of step S110.

FIG. 41 is a flowchart showing the application uninstalling request processing of step S110.

The application uninstalling request processing is processing for requesting the server printer 200 to uninstall installed applications. When the application uninstalling request processing is executed in step S10, as shown in FIG. 41, first, the printer management server 100 shifts to step S1650.

In step S1650, the printer management server 100 judges whether or not collective uninstall of an application has been requested. When the collective uninstall of an application has been requested (Yes), the printer management server 100 shifts to step S1652. When it is judged that the collective uninstall of an application has not been requested (No), the printer management server 100 stands by in step S1650 until the collective uninstall of an application is requested.

In step S1652, the printer management server 100 sends a collective uninstalling instruction for an application to the server printers 200. Then, the printer management server ends the series of processing and returns the application uninstalling request processing to the original processing.

Next, a structure of the network printer 200 will be described in detail with reference to FIG. 10. Note that all the respective network printers 200 include identical functions.

Figures 10, 11:
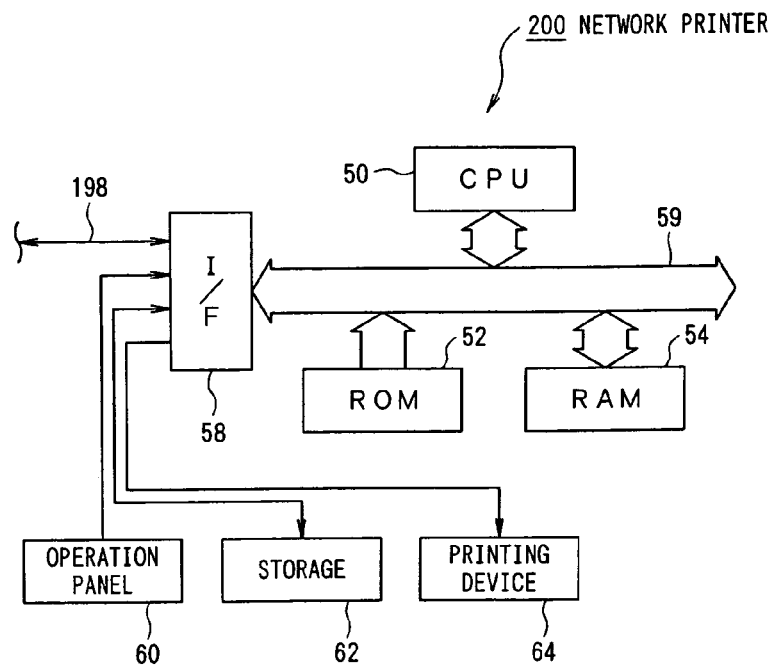
FIG. 10 is a block diagram showing a structure of a network printer 200.
FIG. 11 is a diagram showing a data structure of printer basic information 500.

FIG. 10 is a block diagram showing the structure of the network printer 200.

As shown in FIG. 10, the network printer 200 includes a CPU 50 which controls arithmetic operations and an entire system on the basis of a control program, a ROM 52 which has the control program or the like of the CPU 50 stored in a predetermined area thereof in advance, a RAM 54 for storing data read out from the ROM 52 or the like and an arithmetic operation result required in a course of the arithmetic operation of the CPU 50, and an I/F 58 which mediates input/output of data to an external device. These are connected to each other and so as to be capable of exchanging data by a bus 59 which serves as a signal line for transferring data. Note that an internal clock, which is provided in an ordinary PC, is not provided in the network printer 200.

In addition, an operation state of the network printer 200 can be switched to a warm-up completion state in which the network printer 200 immediately becomes capable of performing printing after a print instruction is received or a sleep state in which power consumption is lower than the warm-up completion state but a predetermined time is required until the network printer 200 becomes capable of performing printing after a print instruction is received.

An operation panel 60 which is capable of inputting and displaying data as a human interface, a storage 62 which stores data, a table, or the like as a file, a printing device 64 which performs printing on the basis of print data, and a signal line for making connection to the sub-network 198 are connected to the I/F 58 as external devices.

The storage 62 stores printer basic information 500 which is basic information of the network printer 200 itself, a printer information registration table 530 in which printer information on the other network printers 200 is registered, performance information 540 indicating a performance of the network printer 200 itself, a timing information registration table 550 in which timing information indicating access timing of the client printers 200 is stored, a status information registration table 560 in which status information of the network printer 200 itself is registered. Note that, although not illustrated, a status information registration table for collection, which registers status information from the respective client printers 200, is stored in the storage 62 separately from the status information registration tale 560.

FIG. 11 is a diagram showing a data structure of the printer basic information 500.

As shown in FIG. 11, the printer basic information 500 includes a data area 502 which stores a mode in which a printer becomes the server printer 200 or a mode in which a printer becomes the client printer 200, a data area 504 which stores an IP address of the server printer 200, a data area 506 which stores an IP address of the printer management server 100, a data area 508 which stores a notification date and time, a data area 510 which stores an identifier of the sub-network 198, and a data area 512 which stores a printer operation state list. Note that the printer basic information 500 includes, other than the information shown in FIG. 11, a protocol number indicating a protocol necessary for communication with the printer management server 100, a port number of an IP used in performing communication with the printer management server 100, and authentication information necessary for authentication such as a user ID and a password.

As shown in FIG. 11, one record is registered for each client printer 200 in the printer operation state list 512. Each record includes a field 514 in which uses at the time when the network printers 200 are classified for each use are registered, a field 516 in which IP addresses of the client printers 200 are registered, a field 518 in which names of the client printers 200 are registered, and a field 520 in which operation states of the client printers 200 are registered. In the example of FIG. 11, in a record of a first stage, "monochrome", "xxx.xxx.xxx.1", "LP-9600", and "Sleep" are registered as the uses, an IP address, a printer name, and an operation state, respectively. This indicates that, concerning the client printer 200 which is specified by the printer name "LP-9600" and the IP address "xxx.xxx.xxx.1", its use is monochrome printing and its operation state is a sleep state.

FIG. 12 is a diagram showing a data structure of the printer information registration table 530.

The printer information registration table 530 is used by the server printer 200 in order to perform communication with the respective client printers 200. As shown in FIG. 12, one record for each client printer 200 is registered in the printer information registration table 530. Each record includes a field 532 in which an IP address of the client printer 200 is registered and a field 534 in which a name of the client printer 200 is registered.

FIG. 13 is a diagram showing a data structure of the performance information 540.

As shown in FIG. 13, the performance information 540 includes a data area 542 which stores a communication speed of the network printer 200, a data area 544 which stores a storage capacity of the RAM 54, and a data area 546 which stores a storage capacity of the storage 62.

FIG. 14 is a diagram showing a data structure of the timing information registration table 550.

The timing information registration table 550 specifies a notification date and time for starting an access to the server printer 200 for each client printer 200 as access timing such that access periods of the respective client printers 200 do not overlap each other. As shown in FIG. 14, one record is registered for each client printer 200. Each record includes a field 552 in which IP addresses of the client printers 200 are registered, a field 554 in which names of the client printers 200 are registered, and a field 556 in which notification dates and times when the client printers 200 start an access are registered.

FIG. 15 is a diagram showing a data structure of the status information registration table 560.

As shown in FIG. 15, one record for each status item is registered in the status information registration table 560. Each record includes a field 562 in which object IDs are registered, a field 564 in which contents of status items are registered, and a field 566 in which values of the status items are registered.

Figure 16:
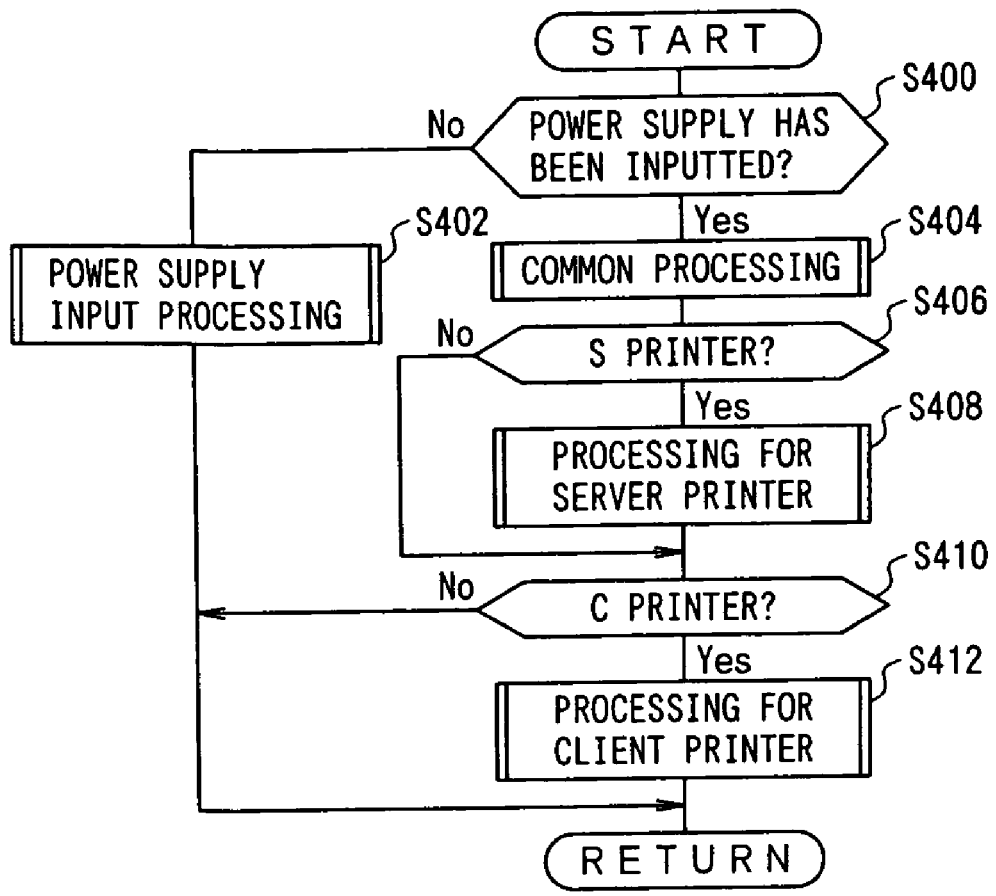
FIG. 16 is a flowchart showing main processing of the network printer 200.

On the other hand, referring to FIG. 10 again, the CPU 50 consists of a micro-processing unit MPU or the like and is adapted to start a predetermined program stored in a predetermined area of the ROM 52 and execute main processing shown in a flowchart of FIG. 16 in accordance with the program.

First, the main processing of the network printer 200 will be described in detail with reference to FIG. 16.

FIG. 16 is a flowchart showing the main processing of the network printer 200.

When the main processing is executed in the CPU 50, as shown in FIG. 16, first, the network printer 200 shifts to step S400.

In step S400, the network printer 200 judges whether or not a power supply of the network printer 200 itself is inputted. When it is judged that the power supply is not inputted (No), the network printer 200 shifts to step S402 to execute power supply input processing for inputting the power supply of the network printer 200 itself in response to a power supply input instruction. Then, the network printer 200 ends the series of processing and returns the main processing to the original processing.

On the other hand, when it is judged in step S400 that the power supply of the network printer 200 itself is inputted (Yes), the network printer 200 shifts to step S404 to execute common processing which is performed commonly in the server printer 200 and the client printer 200. Then, the network printer 200 shifts to step S406.

In step S406, the network printer 200 judges whether or not the network printer 200 itself is the server printer 200. When it is judged that the network printer 200 itself is the server printer 200 (Yes), the network printer 200 shifts to step S408 to execute processing for a server printer which is solely performed by the server printer 200. Then, the network printer 200 shifts to step S410.

In step S410, the network printer 200 judges whether or not the network printer 200 itself is the client printer 200. When it is judged that the network printer 200 itself is the client printer 200 (Yes), the network printer 200 shifts to step S412 to execute processing for a client printer which is solely performed by the client printer 200. Then, the network printer 200 ends the series of processing and returns the main processing to the original processing.

On the other hand, when it is judged in step S410 that the network printer 200 itself is not the client printer 200 (No), the network printer 200 ends the series of processing and returns the main processing to the original processing.

On the other hand, when it is judged in step S406 that the network printer 200 itself is not the server printer 200 (No), the network printer 200 shifts to step S410.

Next, the power supply input processing of step S402 will be described in detail with reference to FIG. 17.

Figure 17:
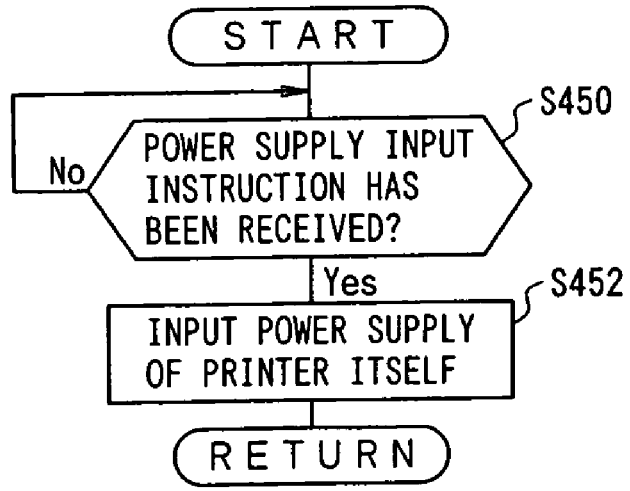
FIG. 17 is a flowchart showing power supply input processing of step S402.

FIG. 17 is a flowchart showing the power supply input processing of step S402.

The power supply input processing is processing for inputting the power supply of the network printer 200 itself in response to a power supply input instruction. When the power supply input processing is executed in step S402, as shown in FIG. 17, first, the network printer 200 shifts to step S450.

In step S450, the network printer 200 judges whether or not the power supply input instruction for input of a power supply has been received. When it is judged that the power supply input instruction has been received (Yes), the network printer 200 shifts to step S452. When it is judged that the power supply input instruction has not been received (No), the network printer 200 stands by in step S450 until the power supply input instruction is received.

In step S452, the network printer 200 inputs the power supply of the network printer 200 itself. Then, the network printer 200 ends the series of processing and returns the power supply input processing to the original processing.

Next, the common processing of step S404 will be described in detail with reference to FIG. 18.

Figure 18:
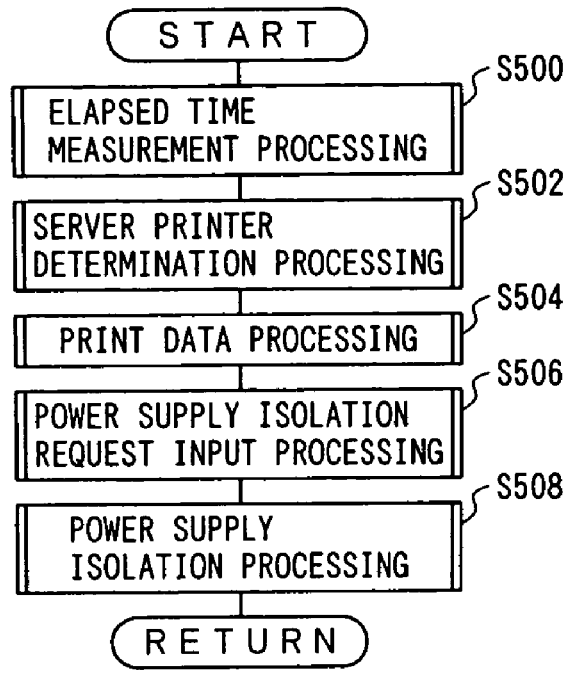
FIG. 18 is a flowchart showing common processing of step S404.

FIG. 18 is a flowchart showing the common processing of step S404.

The common processing is processing which is commonly performed in the sever printer 200 and the client printer 200. When the common processing is executed in step S404, as sown in FIG. 18, first, the network printer 200 shifts to step S500.

In step S500, the network printer 200 executes elapsed time measurement processing for measuring an elapsed time from a starting time. The network printer 200 shifts to step S502 to execute server printer determination processing for determining the server printer 200, and shifts to step S504 to execute print data processing for processing print data received from a user terminal or another network printer 200. Then, the network printer 200 shifts to step S506.

In step S506, the network printer 200 executes power supply isolation request input processing for inputting a power supply isolation request from a user. The network printer 200 shifts to step S508 to execute power supply isolation processing for inputting the power supply of the network printer 200 itself in response to a power supply isolation instruction. Then, the network printer 200 ends the series of processing and returns the common processing to the original processing.

Next, the elapsed time measurement processing of step S500 will be described in detail with reference to FIG. 19.

Figure 19:
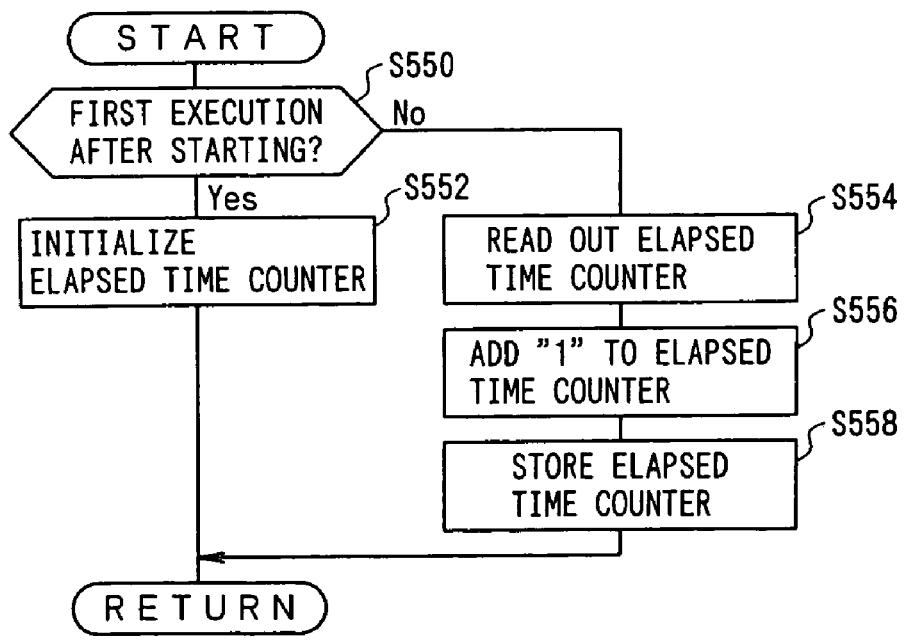
FIG. 19 is a flowchart showing elapsed time measurement processing of step S500.

FIG. 19 is a flowchart showing the elapsed time measurement processing of step S500.

The elapsed time measurement processing is processing for measuring an elapsed time from a starting time. When the elapsed time measurement processing is executed in step S500, as shown in FIG. 19, first, the network printer 200 shifts to step S550.

In step S550, the network printer 200 judges whether or not the elapsed time measurement processing is executed for the first time after the starting. If it is judged that the elapsed time measurement processing is executed for the first time after the starting (Yes), the network printer 200 shifts to step S552 to initialize an elapsed time counter of the RAM 54. Then, the network printer 200 ends the series of processing and returns the elapsed time measurement processing to the original processing.

On the other hand, when it is judged in step S550 that the elapsed time measurement processing is executed for the second time or more (No), the network printer 200 shifts to step S554 to read out the elapsed time counter from the RAM 54. The network printer 200 shifts to step S556 to add "1" to the read-out elapsed time counter, and shifts to step S558 to store the elapsed time counter in the RAM 54. Then, the network printer 200 ends the series of processing and returns the elapsed time measurement processing to the original processing.

Next, the server printer determination processing of step S502 will be described in detail with reference to FIG. 20.

Figure 20:
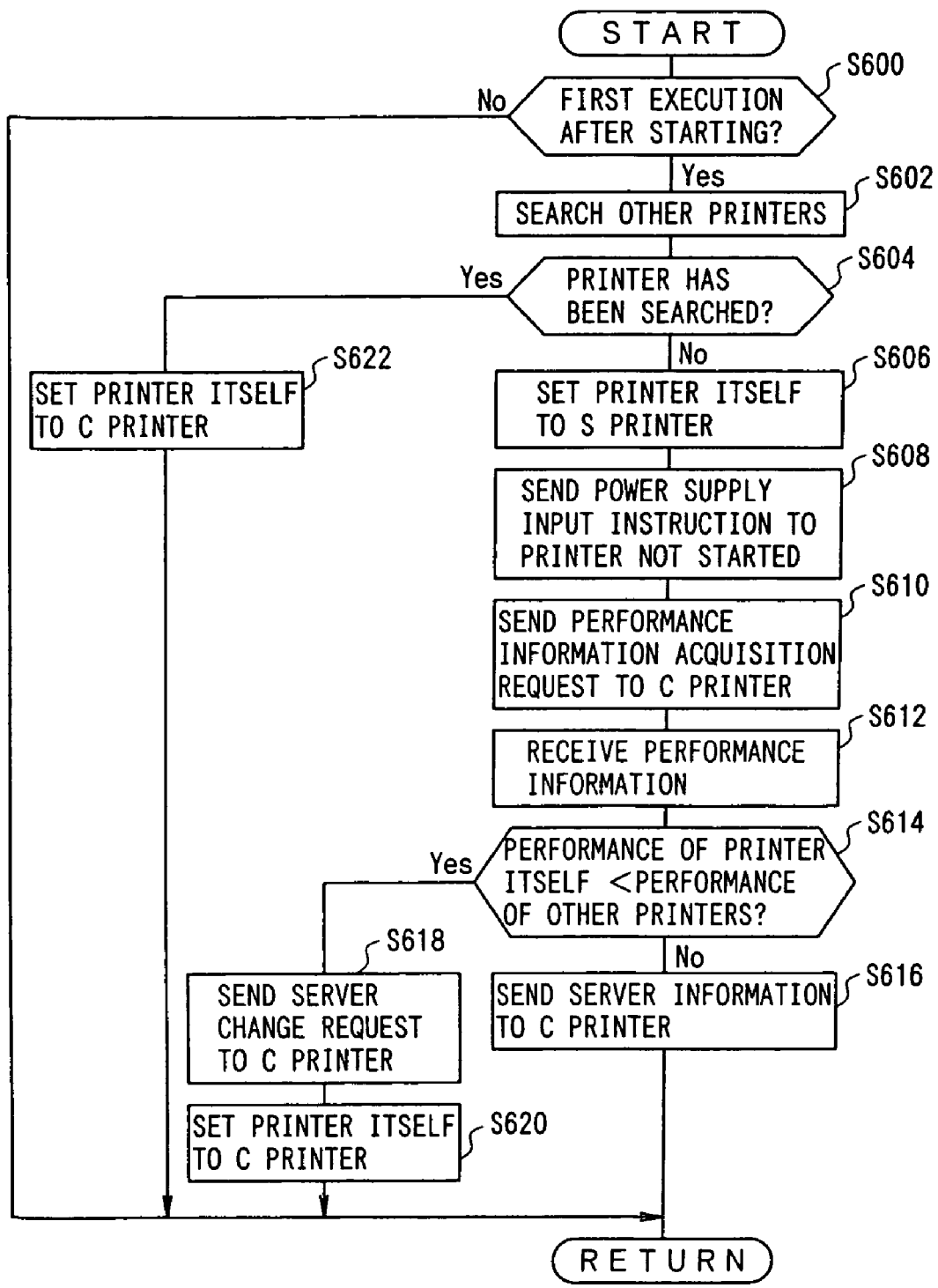
FIG. 20 is a flowchart showing server printer determination processing of step S502.

FIG. 20 is a flowchart showing the server printer determination processing of step S502.

The server printer determination processing is processing for determining the server printer 200. When the server printer determination processing is executed in step S502, as shown in FIG. 20, first, the network printer 200 shifts to step S600.

In step S600, the network printer 200 judges whether or not the server printer determination processing is executed for the first time after the starting. When it is judged that the server printer determination processing is executed for the first time after the starting (Yes), the network printer 200 shifts to step S602. When it is judged that the server printer determination processing is not executed for the first time after the starting (No), the network printer 200 ends the series of processing and returns the server printer determination processing to the original processing.

In step S602, the network printer 200 searches other network printers 200 out of the identical sub-network 198. Then, the network printer 200 shifts to step S604 to judge whether or not other network printers 200 have been found by the search. When it is judged that no other network printers 200 have been found (No), the network printer 200 shifts to step S606.

In step S606, the network printer 200 sets the network printer 200 itself as the server printer 200. The network printer 200 shifts to step S608 to send a power supply input instruction to the network printers 200 which have not been started up among the network printers 200 belonging to the identical sub-network 198, and shifts to step S610 to send a performance information acquisition request, which requests acquisition of the performance information 540, to the respective client printers 200. Then, the network printer 200 shifts to step S612.

In step S612, the network printer 200 receives the performance information 540 from the respective client printers 200. The network printer 200 shifts to step S614 to judge whether or not a performance of the client printer 200 is higher than a performance of the network printer 200 itself on the basis of the received performance information 540 and the performance information 540 in the storage 62. When it is judged that the performance of the network printer 200 itself is higher (No), the network printer 200 shifts to step S616 to send server information including an IP address of the network printer 200 itself to the respective client printers 200. Then, the network printer 200 ends the series of processing and returns the server printer determination processing to the original processing.

On the other hand, when it is judged in step S614 that the performance of the client printer 200 is higher than the performance of the network printer 200 itself (Yes), the network printer 200 shifts to step S618 to send a server substitution request, which requests substitute of the server printer 200, to the client printer 200 having the highest performance. The network printer 200 shifts to step S620 to set the network printer 200 itself as the client printer 200. Then, the network printer 200 ends the series of processing and returns the server printer determination processing to the original processing.

On the other hand, when it is judged in step S604 that other network printers 200 have been found by the search (Yes), the network printer 200 shifts to step S622 to set the network printer 200 itself as the client printer 200. Then, the network printer 200 ends the series of processing and returns the server printer determination processing to the original processing.

On the other hand, when it is judged in step S600 that the server printer determination processing is executed for the second time or more after the starting (No), the network printer 200 ends the series of processing and returns the server printer determination processing to the original processing.

Next, the print data processing of step S504 will be described in detail with reference to FIG. 21.

Figure 21:
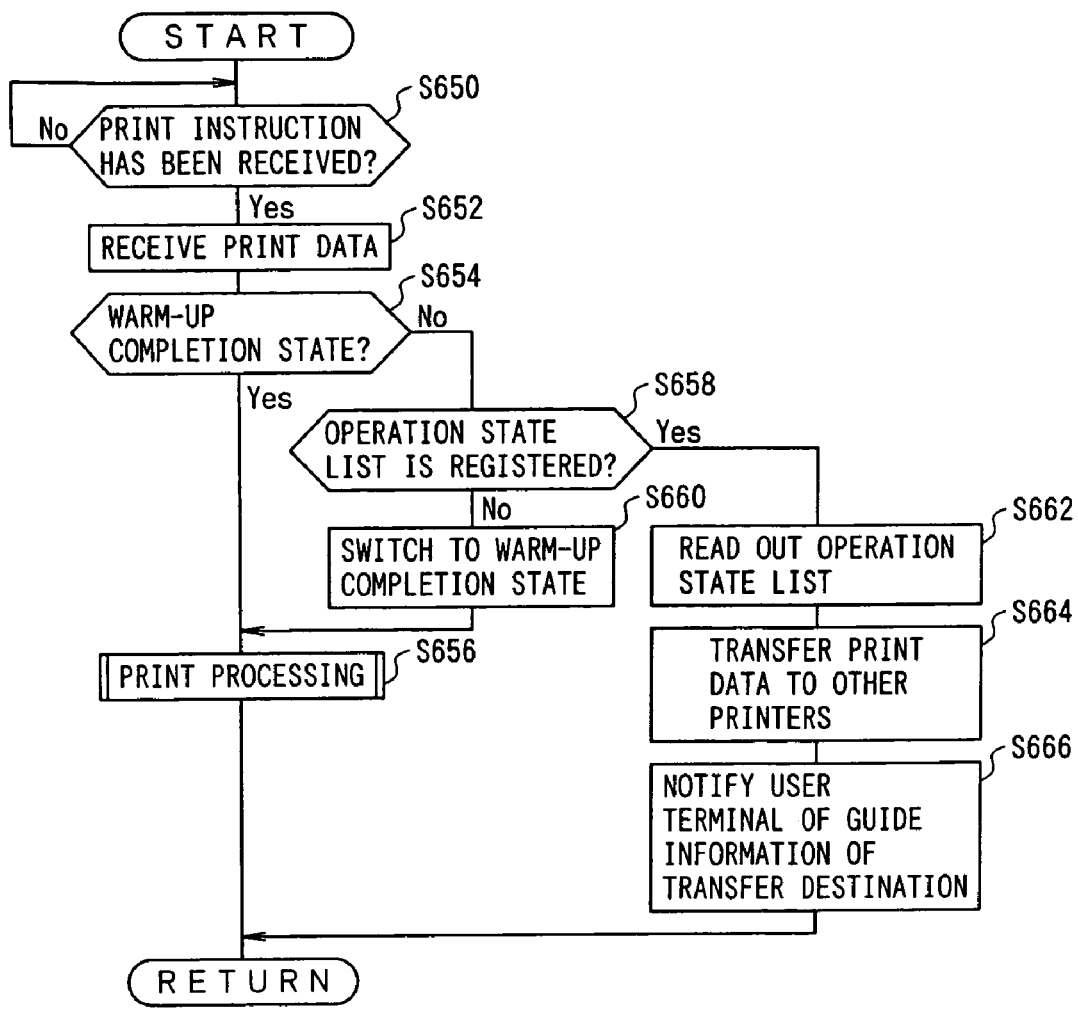
FIG. 21 is a flowchart showing print data processing of step S504.

FIG. 21 is a flowchart showing the print data processing of step S504.

The print data processing is processing for processing print data received from the user terminal or another network printer 200. When the print data processing is executed in step S504, as shown in FIG. 21, first, the network printer 200 shifts to step S650.

In step S650, the network printer 200 judges whether or not a print instruction has been received. When it is judged that the print instruction has been received (Yes), the network printer 200 shifts to step S652. When it is judged that the print instruction has not been received (No), the network printer 200 stands by in step S650 until the print instruction is received.

In step S652, the network printer receives print data. Then, the network printer shifts to step S654 to judge whether or not an operation state of the network printer 200 itself is a warm-up completion state. When it is judged that the operation state is the warm-up completion state (Yes), the network printer 200 shifts to step S656 to perform printing with the printing device 64 on the basis of the received print data. Then, the network printer ends the series of processing and returns the print data processing to the original processing.

On the other hand, when it is judged in step S654 that the operation state of the network printer 200 itself is not the warm-up completion state (No), the network printer 200 shifts to step S658 to judge whether or not the printer operation state list 512 is registered in the storage 62. When it is judged that the printer operation state list 512 is not registered (No), the network printer 200 shifts to step S660 to switch the operation state of the network printer 200 itself to the warm-up completion state. Then, the network printer 200 shifts to step S656.

On the other hand, when it is judged in step S658 that the printer operation state list 512 is registered in the storage 62 (Yes), the network printer 200 shifts to step S662 to read out the printer operation state list 512 from the storage 62. Then, the network printer 200 shifts to step S664.

In step S664, the network printer 200 transfers the print data to another network printer 200, which is in the warm-up completion state, on the basis of the read-out printer operation state list 512. The network printer 200 shifts to step S666 to notify the user terminal of a request source of guide information on the network printer 200 of a transfer destination. Then, the network printer 200 ends the series of processing and returns the print data processing to the original processing.

Next, the power supply isolation request input processing of step S506 will be described in detail with reference to FIG. 22.

Figure 22:
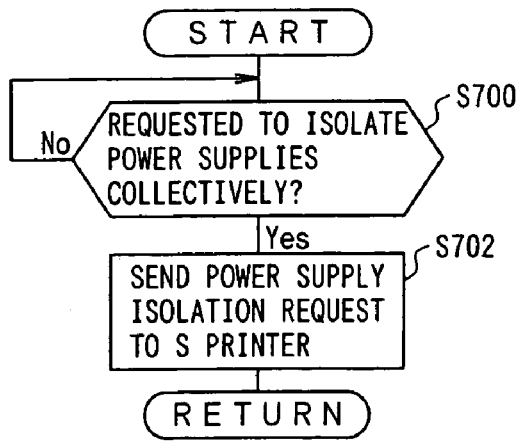
FIG. 22 is a flowchart showing power supply isolation request input processing of step S506.

FIG. 22 is a flowchart showing the power supply isolation request input processing of step S506.

The power supply isolation request input processing is processing for inputting a power supply isolation request from a user. When the power supply isolation request input processing is executed in step S506, as shown in FIG. 22, first, the network printer 200 shifts to step S700.

In step S700, the network printer 200 judges whether or not the user has inputted a request to isolate power supplies of all the network printers 200 of the identical sub-network 198 collectively from the operation panel 60. When it is judged that the power supply isolation request has been inputted (Yes), the network printer 200 shifts to step S702. When it is judged that the power supply isolation request has not been inputted (No), the network printer 200 stands by in step S700 until the power supply isolation request is inputted.

In step S702, the network printer 200 sends the power supply isolation request to the server printer 200. Then, the network printer 200 ends the series of processing and returns the power supply isolation request input processing to the original processing.

Next, the power supply isolation processing of step S508 will be described in detail with reference to FIG. 23.

Figure 23:
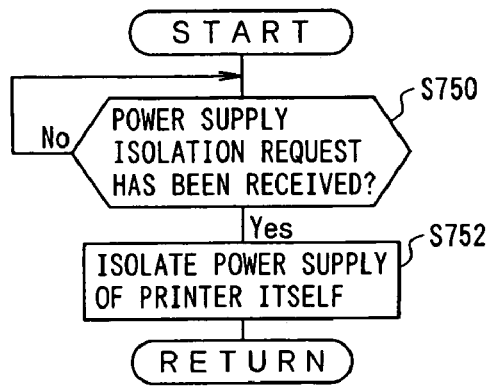
FIG. 23 is a flowchart showing power supply isolation processing of step S508.

FIG. 23 is a flowchart showing the power supply isolation processing of step S508.

The power supply isolation processing is processing for isolating the power supply of the network printer 200 itself in accordance with a power supply isolation instruction. When the power supply isolation processing is executed in step S508, as shown in FIG. 23, first, the network printer 200 shifts to step S750.

In step S750, the network printer 200 judges whether or not the power supply isolation instruction for isolating the power supply has been received. When it is judged that the power supply isolation instruction has been received (Yes), the network printer 200 shifts to step S752. When it is judged that the power supply isolation instruction has not been received (No), the network printer 200 stands by in step S750 until the power supply isolation instruction is received.

In step S752, the network printer 200 isolates the power supply of the network printer 200 itself. Then, the network printer 200 ends the series of processing and returns the power supply isolation processing to the original processing.

Next, the processing for a server printer of step S408 will be described in detail with reference to FIG. 24.

Figure 24:
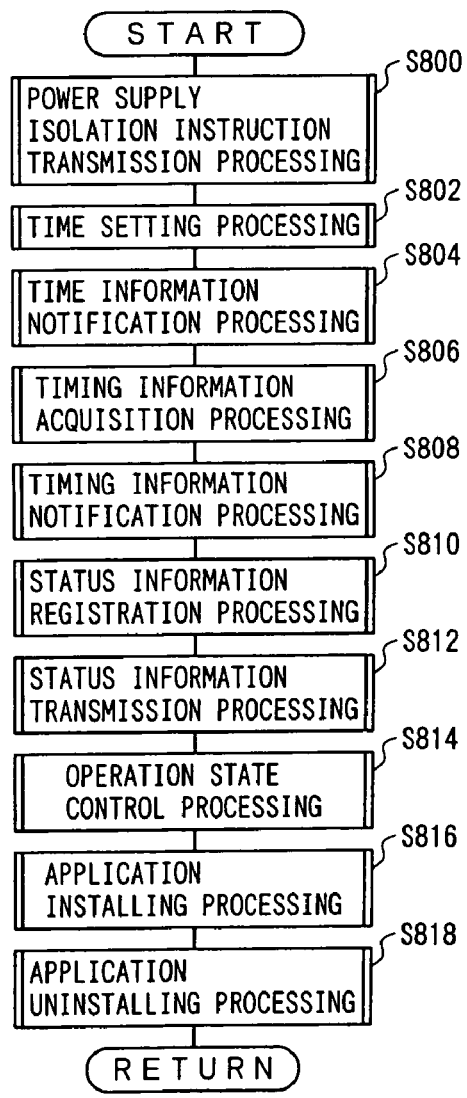
FIG. 24 is a flowchart showing processing for a server printer of step S408.

FIG. 24 is a flowchart showing the processing for a server printer of step S408.

The processing for a server printer is processing which is solely performed by the server printer 200. When the processing for the server printer is executed in step S408, as shown in FIG. 24, first, the network printer shifts to step S800.

In step S800, the network printer 200 executes power supply isolation instruction transmission processing for sending a power supply isolation instruction to the respective client printers 200. The network printer 200 shifts to step S802 to execute time setting processing for setting a time of the network printer 200 itself, and shifts to step S804 to execute time information notification processing for notifying the client printers 200 of time information. Then, the network printer 200 shifts to step S806.

In step S806, the network printer 200 executes timing information acquisition processing for acquiring timing information from the printer management server 100. The network printer 200 shifts to step S808 to execute timing information notification processing for notifying the client printers 200 of the timing information, and shifts to step S810 to execute status information registration processing for registering status information from the client printer 200 in the storage 62. Then, the network printer 200 shifts to step S812.

In step S812, the network printer 200 executes status information transmission processing for sending the status information to the printer management server 100. The network printer 200 shifts to step S814 to execute operation state control processing for controlling an operation state of the client printer 200. Then, the network printer 200 shifts to step S816.

In step S816, the network printer 200 installs an application received from the printer management server 100 and executes application installing processing for delivering the application to the respective client printers 200. The network printer 200 shifts to step S818. In step S818, the network printer 200 uninstalls an application, which the network printer 200 has instructed to uninstall by the printer management server 100, and executes application uninstalling processing for sending an uninstalling instruction of the application to the respective client printers 200. Then, the network printer 200 ends the series of processing and returns the processing for a server printer to the original processing.

Next, the power supply isolation instruction transmission processing of step S800 will be described in detail with reference to FIG. 25.

Figure 25:
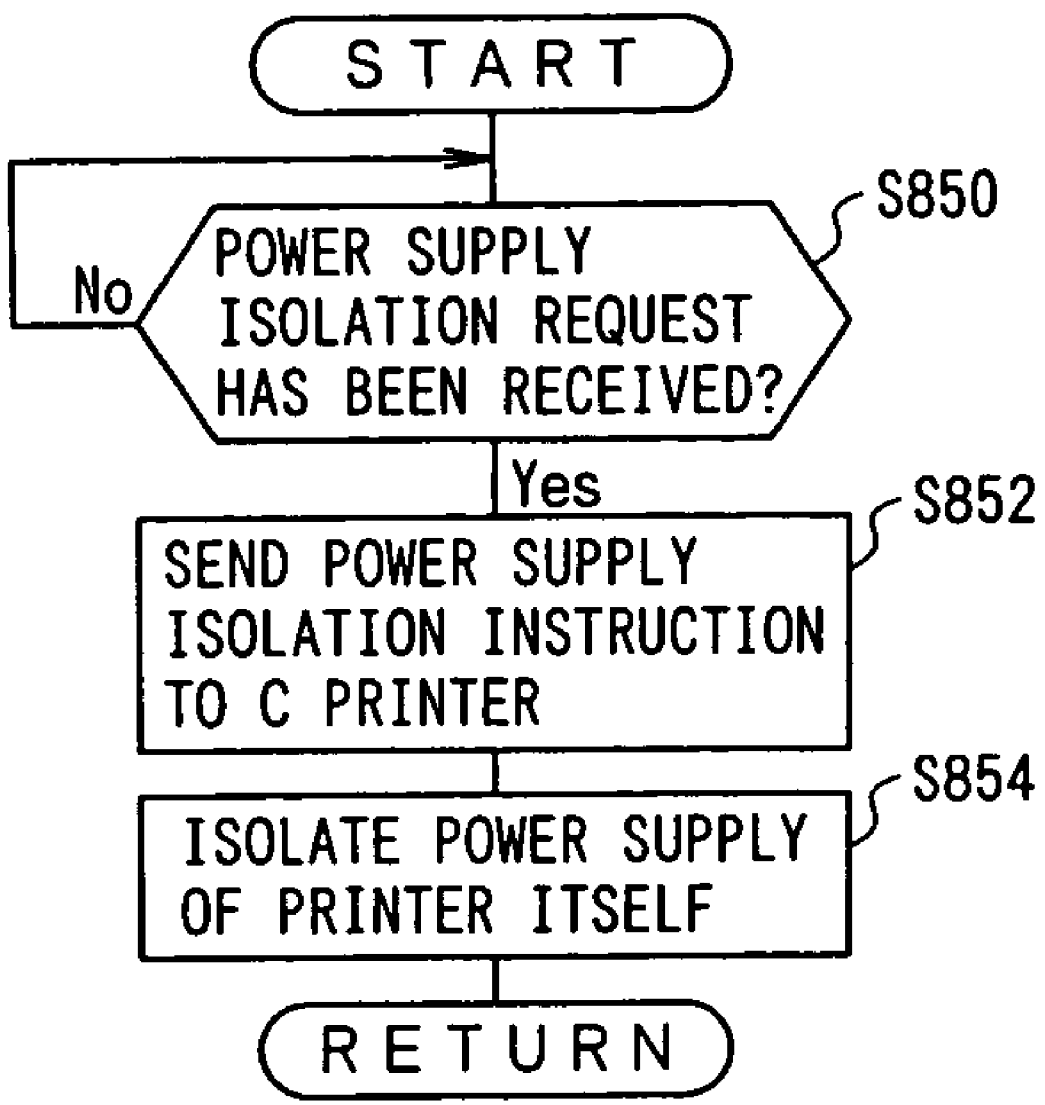
FIG. 25 is a flowchart showing power supply isolation instruction transmission processing of step S800.

FIG. 25 is a flowchart showing the power supply isolation instruction transmission processing of step S800.

The power supply isolation instruction transmission processing corresponds to the power supply isolation request input processing of FIG. 22 and the power supply isolation processing of FIG. 23 and is processing for sending a power supply isolation instruction to the respective client printers 200. When the power supply isolation instruction transmission processing is executed in step S800, as shown in FIG. 25, first, the network printer 200 shifts to step S850.

In step S850, the network printer 200 judges whether or not the power supply isolation request has been received. When it is judged that the power supply isolation request has been received (Yes), the network printer 200 shifts to step S852. When it is judged that the power supply isolation request has not been received (No), the network printer 200 stands by in step S850 until the power supply isolation request is received.

In step S852, the network printer 200 sends a power supply isolation instruction to the respective client printers 200. The network printer 200 shifts to step S854 to isolate the power supply of the network printer 200 itself. Then, the network printer 200 ends the series of processing and returns the power supply isolation instruction transmission processing to the original processing.

Next, the time setting processing of step S802 will be described in detail with reference to FIG. 26.

Figure 26:
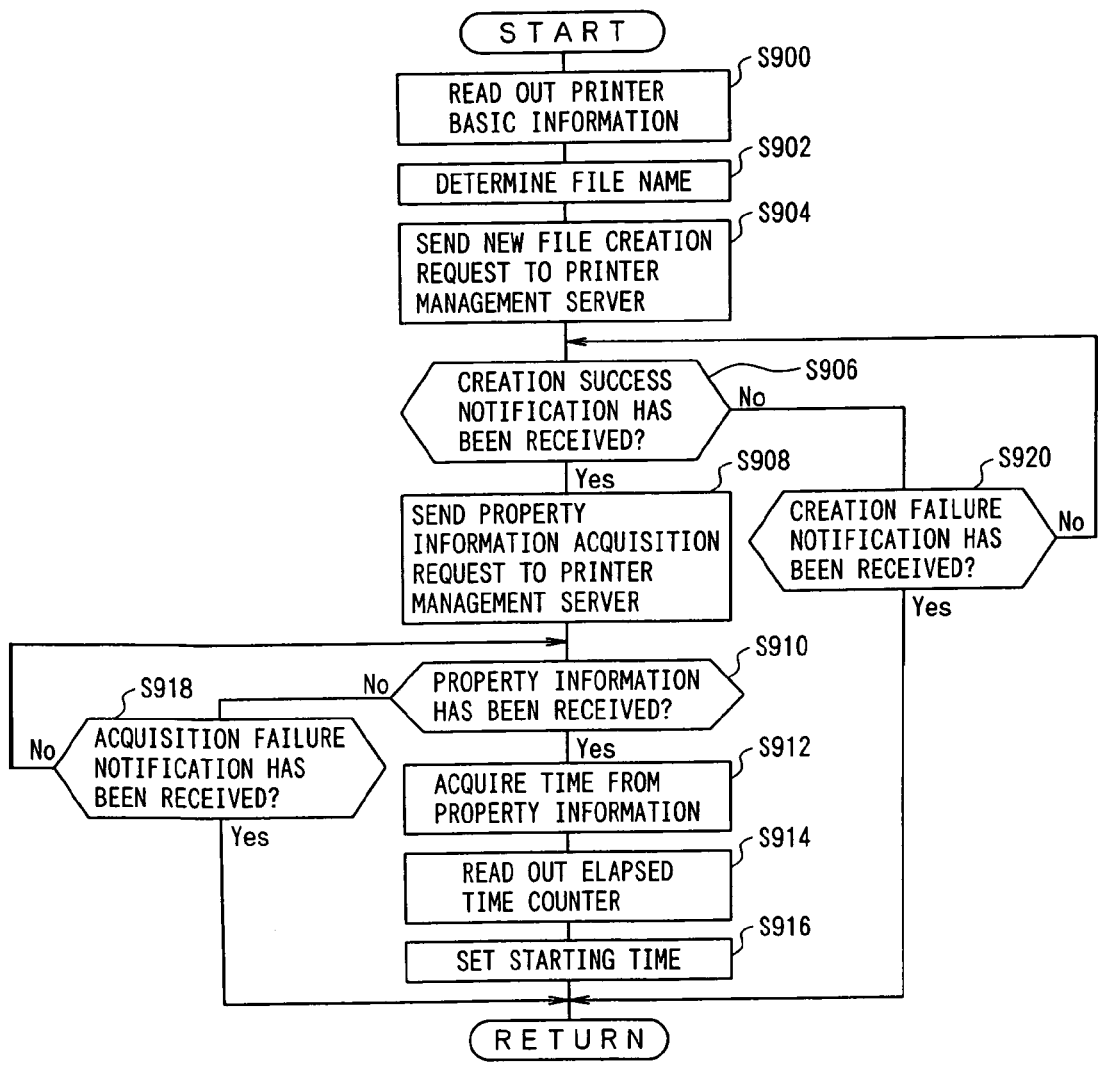
FIG. 26 is a flowchart showing time setting processing of step S802.

FIG. 26 is a flowchart showing the time setting processing of step S802.

The time setting processing corresponds to the file creation processing of FIG. 7 and the property information provision processing of FIG. 8 and is processing for setting a time of the network printer 200 itself. When the time setting processing is executed in step S802, as shown in FIG. 26, first, the network printer 200 shifts to step S900.

In step S900, the network printer 200 reads out the printer basic information from the storage 62. The network printer 200 shifts to step S902 to determine an arbitrary file name, and shifts to step S904 to send a file creation request to the printer management server 100 together with the determined file name on the basis of the read-out printer basic information. Then, the network printer 200 shifts to step S906. More specifically, the network printer 200 uses a server IP address, a protocol number, and a port number for an access to the printer management server 100 and, if authentication is requested, performs authentication using authentication information.

In step S906, the network printer 200 judges whether or not a creation success notification has been received. When it is judged that the creation success notification has been received (Yes), the network printer 200 shifts to step S908. In step S908, the network printer sends a property information acquisition request to the printer management sever 100 together with the file name determined in step S902 on the basis of the printer basic information read out in step S900. Then, the network printer 200 shifts to step S910.

In step S910, the network printer 200 judges whether or not property information has been received. When it is judged that the property information has been received (Yes), the network printer shifts to step S912 to acquire a creation time from the received property information. Then, the network printer 200 shifts to step S914 to read out the elapsed time counter from the RAM 54, and shifts to step S916.

In step S916, the network printer 200 calculates an elapsed time from the starting time on the basis of the read-out elapsed time counter, subtracts the elapsed time from the acquired creation time to calculate a starting time, and sets the calculated starting time by storing it in the RAM 54. Then, the network printer 200 ends the series of processing and returns the time setting processing to the original processing.

On the other hand, when it is judged in step S910 that the property information has not been received (No), the network printer 200 shifts to step S918 to judge whether or not an acquisition failure notification has been received. When it is judged that the acquisition failure notification has been received (Yes), the network printer 200 ends the series of processing and returns the time setting processing to the original processing.

On the other hand, when it is judged in step S918 that the acquisition failure notification has not been received (No), the network printer 200 shifts to step S910.

On the other hand, when it is judged in step S906 that the creation success notification has not been received (No), the network printer 200 shifts to step S920 to judge whether or not a creation failure notification has been received. When it is judged that the creation failure notification has been received (Yes), the network printer 200 ends the series of processing and returns the time setting processing to the original processing.

On the other hand, when it is judged in step S920 that the creation failure notification has not been received (No), the network printer 200 shifts to step S906.

Next, the time information notification processing of step S804 will be described in detail with reference to FIG. 27.

Figure 27:
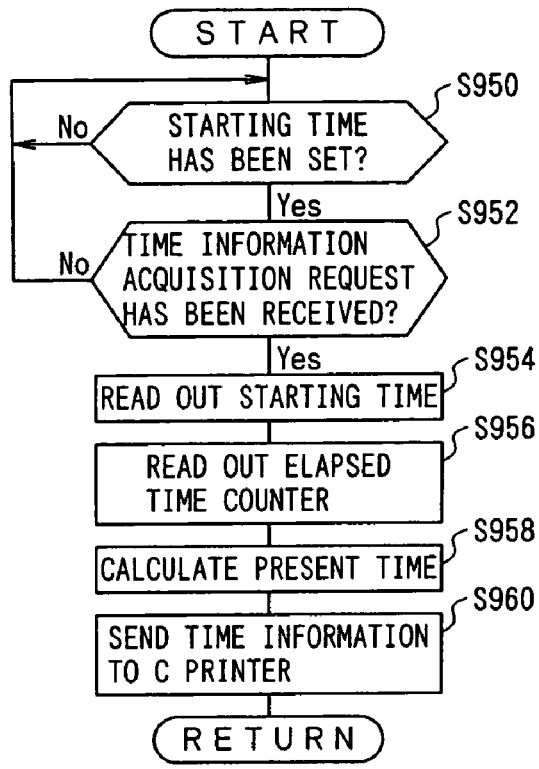
FIG. 27 is a flowchart showing time information notification processing of step S804.

FIG. 27 is a flowchart showing the time information notification processing of step S804.

The information notification processing is processing for notifying the client printer 200 of time information. When the time information notification processing is executed in step S804, as shown in FIG. 27, first, the network printer 200 shifts to step S950.

In step S950, the network printer judges whether or not a starting time of the network printer 200 itself has been set. When it is judged that the starting time has been set (Yes), the network printer 200 shifts to step S952. When it is judged that the starting time has not been set (No), the network printer 200 stands by in step S950 until the starting time is set.

In step S952, the network printer 200 judges whether or not a time information acquisition request requesting acquisition of time information has been received. When it is judged that the time information acquisition request has been received (Yes), the network printer 200 shifts to step S954. When it is judged that the time information acquisition request has not been received (No), the network printer 200 shifts to step S950.

In step S954, the network printer 200 reads out the starting time from the RAM 54. The network printer 200 shifts to step S956 to read out the elapsed time counter from the RAM 54. The network printer 200 shifts to step S958 to calculate an elapsed time from the starting time on the basis of the read-out elapsed time counter, and adds the elapsed time to the read-out starting time to calculate a present time. Then, the network printer 200 shifts to step S960.

In step S960, the network printer 200 sends time information including the calculated present time to the client printer 200 of a request source. Then, the network printer ends the series of processing and returns the time information notification processing to the original processing.

Next, the timing information acquisition processing of step S806 will be described in detail with reference to FIG. 28.

Figure 28:
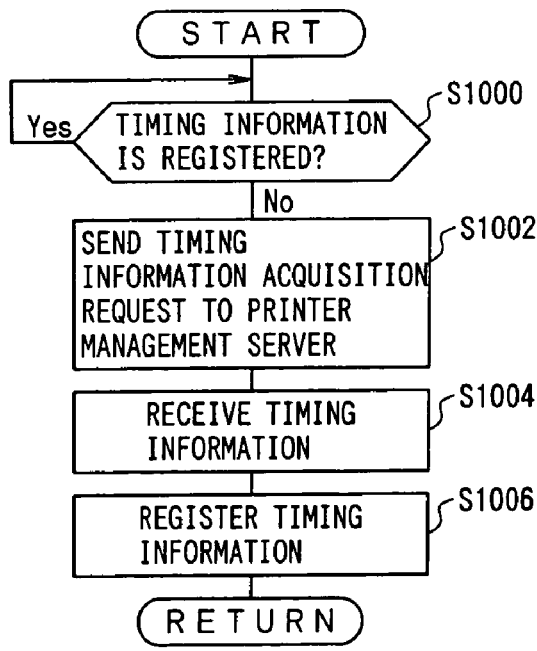
FIG. 28 is a flowchart showing timing information acquisition processing of step S806.

FIG. 28 is a flowchart showing timing information acquisition processing of step S806.

The timing information acquisition processing corresponds to the timing information notification processing of FIG. 6 and is a processing for acquiring timing information from the printer management server 100. When the timing information acquisition processing is executed in step S806, as shown in FIG. 28, first, the network printer 200 shifts to step S1000.

In step S1000, the network printer 200 judges whether or not timing information is stored in the storage 62. When it is judged that the timing information is not registered (No), the network printer 200 shifts to step S1002. When it is judged that the timing information is registered (Yes), the network printer stands by in step S1000.

In step S1002, the network printer 200 sends a timing information acquisition request to the printer management server 100. The network printer 200 shifts to step S1004 to receive the timing information, and shifts to step S1006 to register the timing information in storage 62. Then, the network printer 200 ends the series of processing and returns the timing information acquisition processing to the original processing.

Next, the timing information notification processing of step S808 will be described in detail with reference to FIG. 29.

Figure 29:
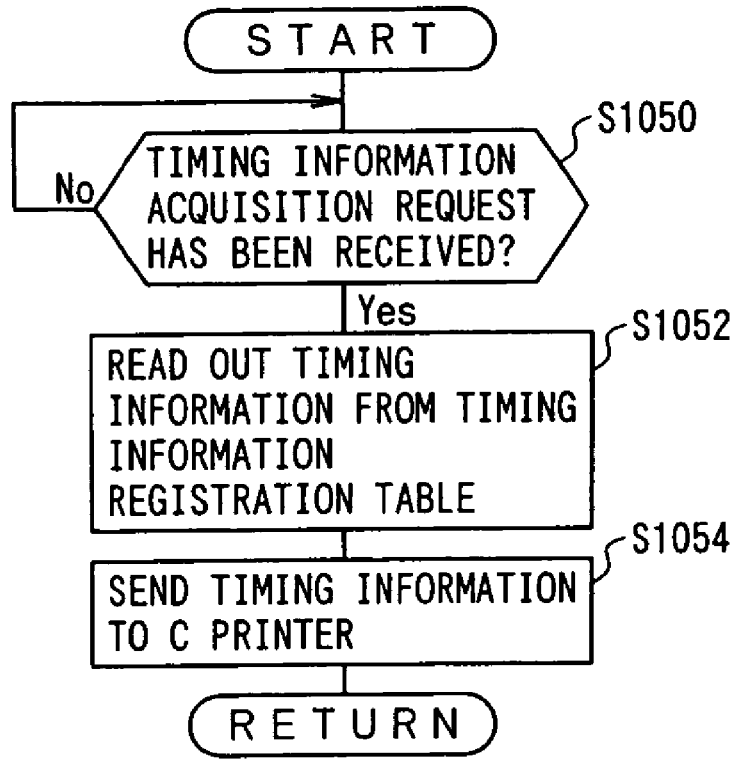
FIG. 29 is a flowchart showing timing information notification processing of step S808.

FIG. 29 is a flowchart showing the timing information notification processing of step S808.

The timing information notification processing is processing for notifying the client printer 200 of timing information. When the timing information notification processing is executed in step S808, as shown in FIG. 29, first, the network printer 200 shifts to step S1050.

In step S1050, the network printer 200 judges whether or not a timing information acquisition request has been received. When it is judged that the timing information acquisition request has been received (Yes), the network printer 200 shifts to step S1052. When it is judged that the timing information acquisition request has not been received (No), the network printer 200 stands by in step S1050 until the timing information acquisition request is received.

In step S1052, the network printer 200 reads out a notification date and time corresponding to the client printer 200 of a request source from the timing information registration table 550. Then, the network printer 200 shifts to step S1054 to send timing information including the read-out notification date and time to the client printer 200 of a request source. Then, the network printer 200 ends the series of processing and returns the timing information notification processing to the original processing.

Next, the status information registration processing of step S810 will be described in detail with reference to FIG. 30.

Figure 30:
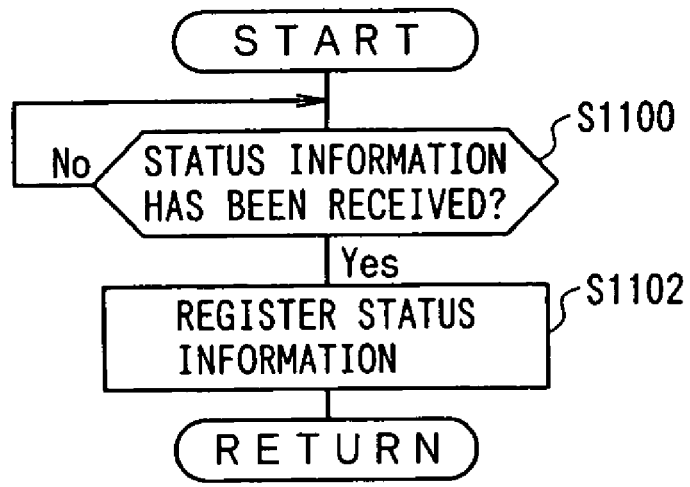
FIG. 30 is a flowchart showing status information registration processing of step S810.

FIG. 30 is a flowchart showing the status information registration processing of step S810.

The status information registration processing is processing for registering status information from the client printer 200 in the storage 62. When the status information registration processing is executed in step S810, as shown in FIG. 30, first, the network printer 200 shifts to step S1100.

In step S1100, the network printer 200 judges whether or not the status information has been received. When it is judged that the status information has been received (Yes), the network printer 200 shifts to step S1102. When it is judged that the status information has not been received (No), the network printer stands by in step S1100 until the status information is received.

In step S1102, the network printer 200 registers the received status information for each client printer 200 in a status information registration table for collection. Then, the network printer 200 ends the series of processing and returns the status information registration processing to the original processing.

Next, the status information transmission processing of step S812 will be described in detail with reference to FIG. 31.

Figure 31:
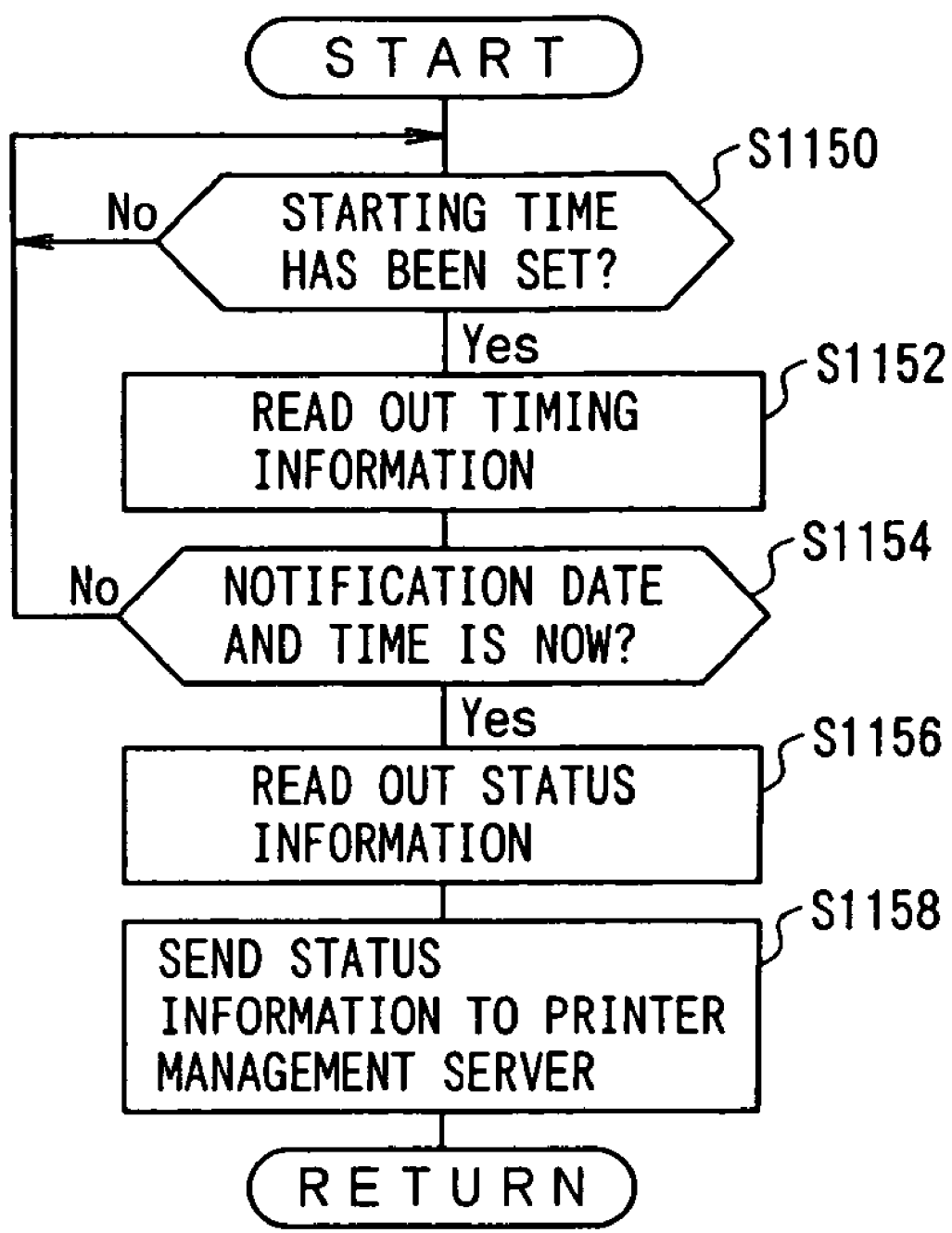
FIG. 31 is a flowchart showing status information transmission processing of step S812.

FIG. 31 is a flowchart showing the status information transmission processing of step S812.

The status information transmission processing corresponds to the status information registration processing of FIG. 9 and is processing for sending status information to the printer management server 100. When the status information transmission processing is executed in step S812, as shown in FIG. 31, first, the network printer 200 shifts to step S1150.

In step S1150, the network printer judges whether or not a starting time of the network printer 200 itself has been set. When it is judged that the starting time has been set (Yes), the network printer shifts to step S1152. When it is judged that the starting time has not been set (No), the network printer 200 stands by in step S1150 until the starting time is set.

In step S1152, the network printer 200 reads out the timing information from the storage 62. Then, the network printer 200 shifts to step S1154 and judges whether or not a notification date and time is now on the basis of the read-out timing information. When it is judged that the notification date and time is now (Yes), the network printer 200 shifts to step S1156. When it is judged that the notification date and time is not now (No), the network printer 200 shifts to step S1150.

In step S1156, the network printer 200 reads out the status information of the respective client printers 200 from the status information registration table for collection, reads out the status information of the network printer 200 itself from the status information registration table 560, and shifts to step S1158. In step S1158, the network printer 200 sends the read-out status information to the printer management server 100. Then, the network printer 200 ends the series of processing and returns the status information transmission processing to the original processing.

Next, the operation state control processing of step S814 will be described in detail with reference to FIG. 32.

Figure 32:
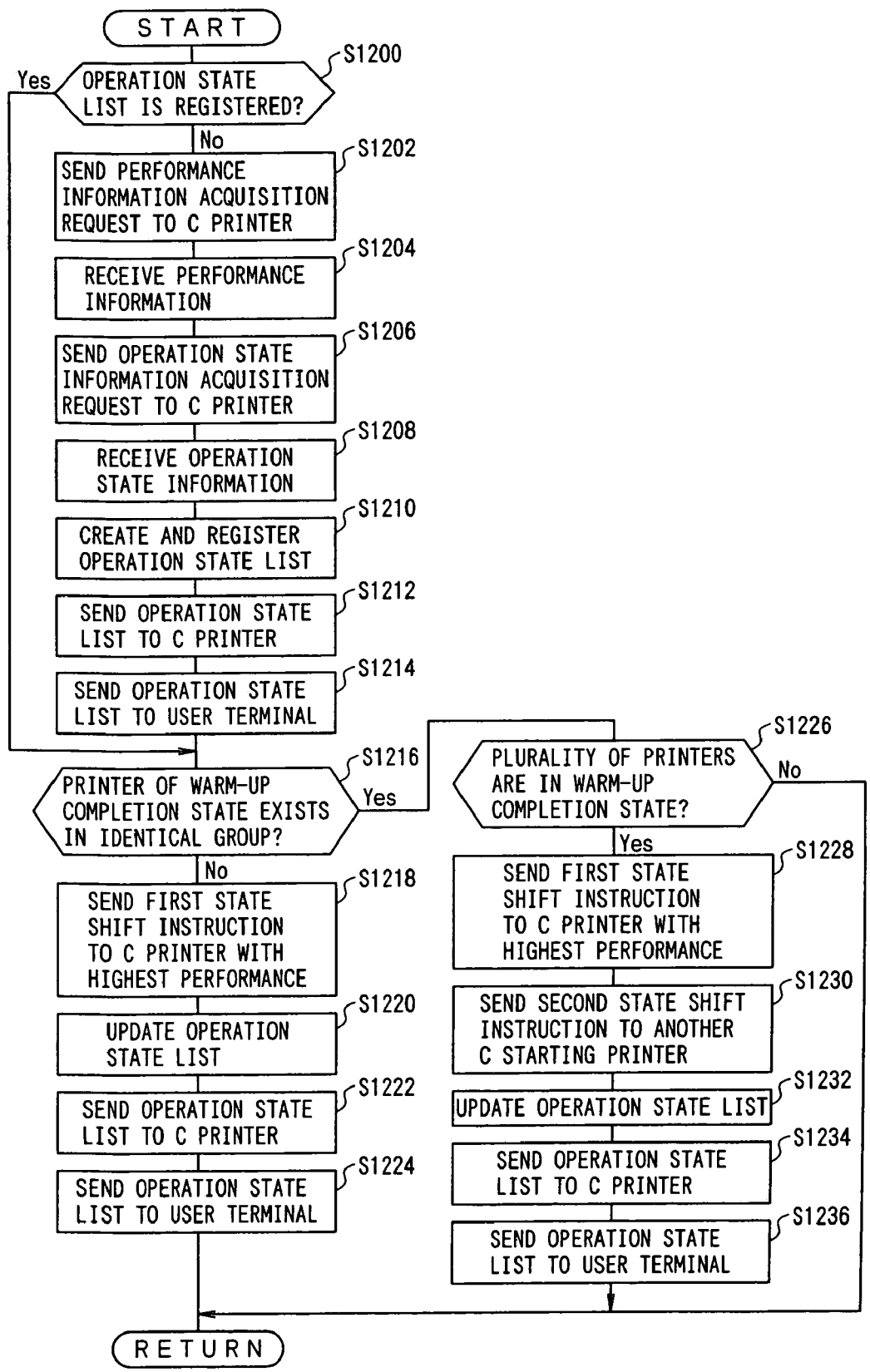
FIG. 32 is a flowchart showing operation state control processing of step S814.

FIG. 32 is a flowchart showing the operation state control processing of step S814.

The operation state control processing is processing for controlling an operation state of the client printer 200. When the operation state control processing is executed in step S814, as shown in FIG. 32, first, the network printer 200 shifts to step S1200.

In step S1200, the network printer 200 judges whether or not the printer operation state list 512 is registered in the storage 62. When it is judged that the printer operation state list 512 is not registered (No), the network printer 200 shifts to step S1202 and sends a performance information acquisition request to the respective client printers 200. The network printer shifts to step S1204 to receive the performance information 540 from the respective client printer 200. Then, the network printer 200 shifts to step S1206. More specifically, in step S1204, the network printer 200 creates a printer performance list, in which performances of the respective client printers 200 is registered, on the basis of the received performance information 540 and registers the created printer performance list in the storage 62. The printer performance list is used, for example, in the case in which the server printer 200 specifies the client printer 200 having the highest performance. Steps S1218, S1228, and S1230 are examples of the use.

In step S1206, the network printer 200 sends an operation state information acquisition request, which requests acquisition of operation state information indicating an operation state of the network printer 200, to the respective client printer 200. The network printer 200 shifts to step S1208 to receive the operation state information from the respective client printers 200, and shifts to step S1210 to create the printer operation state list 512 on the basis of the received operation state information and register the created printer operation state list 512 in the storage 62. Then, the network printer 200 shifts to step S1212.

In step S1212, the network printer 200 sends the created printer operation state list 512 to the respective client printers 200. Then, the network printer 200 shifts to step S1214 to send the created printer operation state list 512 to the respective user terminals, and shifts to step S1216.

In step S1216, the network printer 200 judges whether or not there is the client printer 200, which is in the warm-up completion state, among the client printers 200 belonging to the identical group (use). When it is judged that there is no client printer 200 which is in the warm-up completion state (No), the network printer 200 shifts to step S1218 to send a first state shift instruction for shift to the warm-up completion state to the client printer 200 with the highest performance among the client printers 200 belonging to the identical group. Then, the network printer 200 shifts to step S1220.

In step S1220, the network printer 200 updates the printer operation state list 512. The network printer 200 shifts to step S1222 to send the updated printer operation state list 512 to the respective client printer 200, and shifts to step S1224 to send the updated printer operation state list 512 to the respective user terminals. Then, the network printer 200 ends the series of processing and returns the operation state control processing to the original processing.

On the other hand, when it is judged in step S1216 that there is the client printer 200 which is in the warm-up completion state among the client printers 200 belonging to the identical group (Yes), the network printer 200 shifts to step S1226 to judge whether or not a plurality of client printers 200 among the client printers 200 belonging to the identical group is in the warm-up completion state. When it is judged that the plurality of client printers 200 are in the warm-up completion state (Yes), the network printer 200 shifts to step S1228.

In step S1228, the network printer 200 sends a first state shift instruction to the client printer 200 with the highest performance among the client printers 200 belonging to the identical group. Then, the network printer 200 shifts to step S1230 to send a second state shift instruction for shift to the sleep state to the client printers 200 with the second highest or lower order performances among the client printers 200 belonging to the identical group. Then, the network printer 200 shifts to step S1232.

In step S1232, the network printer 200 updates the printer operation state list 512. The network printer 200 shifts to step S1234 to send the updated printer operation state list 512 to the respective client printers 200, and shifts to step S1236 to send the updated printer operation state list 512 to the respective user terminals. Then, the network printer 200 ends the series of processing and returns the operation state control processing to the original processing.

On the other hand, when it is judged in step S1226 that a plurality of client printers 200 among the client printers 200 belonging to the identical group are not in the warm-up state (No), the network printer 200 ends the series of processing and returns the operation state control processing to the original processing.

On the other hand, when it is judged in step S1200 that the printer operation state list 512 is registered in the storage 62 (Yes), the network printer 200 shifts to step S1216.

Next, the application installing processing of step S816 will be described in detail with reference to FIG. 42.

Figure 42:
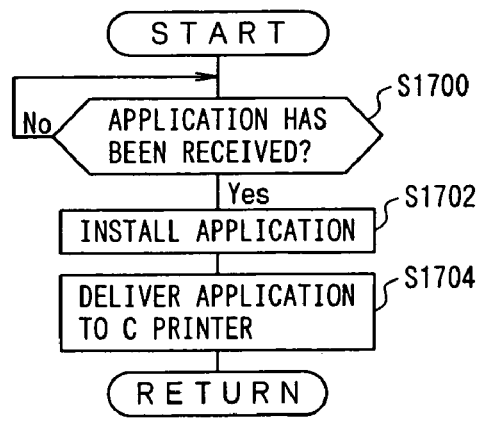
FIG. 42 is a flowchart showing application installing processing of step S816.

FIG. 42 is a flowchart showing the application installing processing of step S816.

The application installing processing is processing for installing an application received from the printer management server 100 and delivering the application to the respective client printer 200. When the application installing processing is executed in step S816, as shown in FIG. 42, first, the network printer 200 shifts to step S1700.

In step S1700, the network printer 200 judges whether or not the application has been received from the printer management server 100. When it is judged that the application has been received (Yes), the network printer 200 shifts to step S1702. When it is judged that the application has not been received (No), the network printer 200 stands by in step S1700 until the application is received.

In step S1702, the network printer 200 installs the received application, and shifts to step S1704 and delivers the installed application to the respective client printers 200. Then, the network printer 200 ends the series of processing and returns the application installing processing to the original processing.

Next, the application uninstalling processing of step S818 will be described in detail with reference to FIG. 43.

Figure 43:
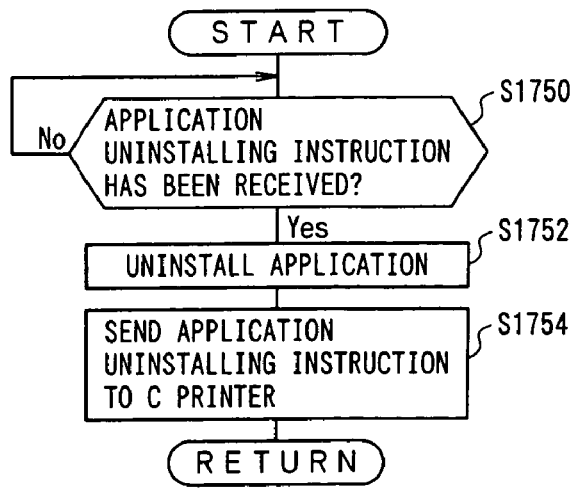
FIG. 43 is a flowchart showing application uninstalling processing of step S818.

FIG. 43 is a flowchart showing the application uninstalling processing of step S818.

The application uninstalling processing is processing for uninstalling an application, which the network printer 200 is instructed by the printer management server 100 to uninstall, and sending an uninstalling instruction of the application to the respective client printers 200. When the application uninstalling processing is executed in step S818, as shown in FIG. 43, first, the network printer 200 shifts to step S1750.

In step S1750, the network printer 200 judges whether or not the uninstalling instruction of the application has been received from the printer management server 100. When it is judged that the uninstalling instruction has been received (Yes), the network printer 200 shifts to step S1752. When it is judged that the uninstalling instruction has not been received (No), the network printer 200 stands by in step S1750 until the uninstalling instruction is received.

In step S1752, the network printer 200 uninstalls the application, which the network printer 200 is instructed to uninstall, on the basis of the received uninstalling instruction of the application, and shifts to step S1754 to send the uninstalling instruction of the uninstalled application to the respective client printer 200. Then, the network printer 200 ends the series of processing and returns the application uninstalling processing to the original processing.

Next, the processing for a client printer of step S412 will be described in detail with reference to FIG. 33.

Figure 33:
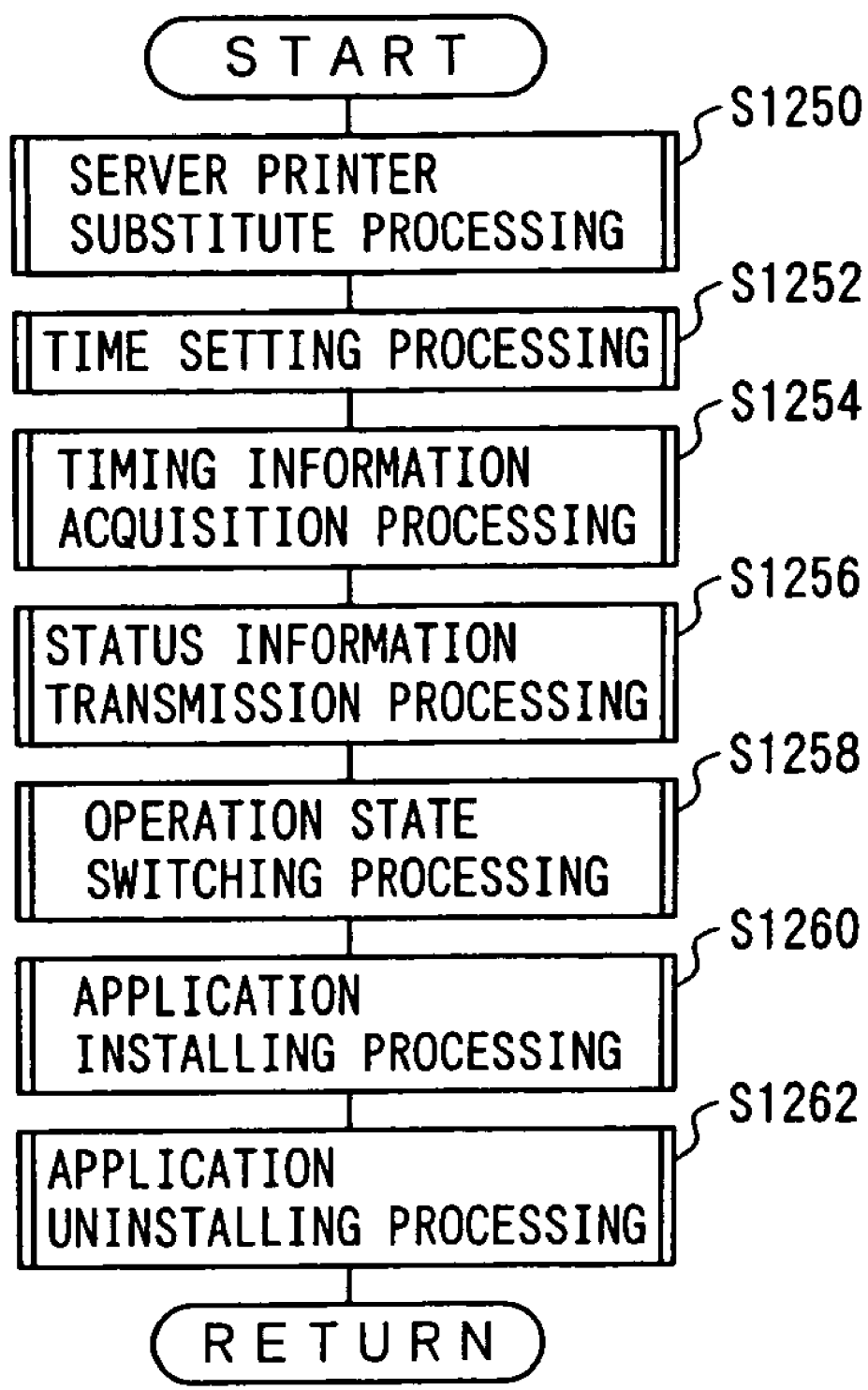
FIG. 33 is a flowchart showing processing for a client printer of step S412.

FIG. 33 is a flowchart showing the processing for a client printer of step S412.

The processing for a client printer is processing solely performed by the client printer 200. When the processing for a client printer is executed in step S412, as shown in FIG. 33, first, the network printer 200 shifts to step S1250.

In step S1250, the network printer 200 executes server printer substitute processing for substituting the server printer 200. The network printer 200 shifts to step S1252 to execute timing setting processing for setting a time of the network printer 200 itself, and shifts to step S1254 to execute timing information acquisition processing for acquiring timing information from the server printer 200. Then, the network printer shifts to step S1256.

In step S1256, the network printer 200 executes status information transmission processing for sending status information to the server printer 200, and shifts to step S1258 to execute operation state switching processing for switching an operation state of the network printer 200 itself. Then, the network printer 200 shifts to step S1260.

In step S1260, the network printer 200 executes application installing processing for installing the application received from the server printer 200, and shifts to step S1262 to execute application uninstalling processing for uninstalling an application, which the network printer 200 is instructed by the server printer 200 to uninstall. Then, the network printer 200 ends the series of processing and returns the processing for a client printer to the original processing.

Next, the server printer substitute processing of step S1250 will be described in detail with reference to FIG. 34.

Figure 34:
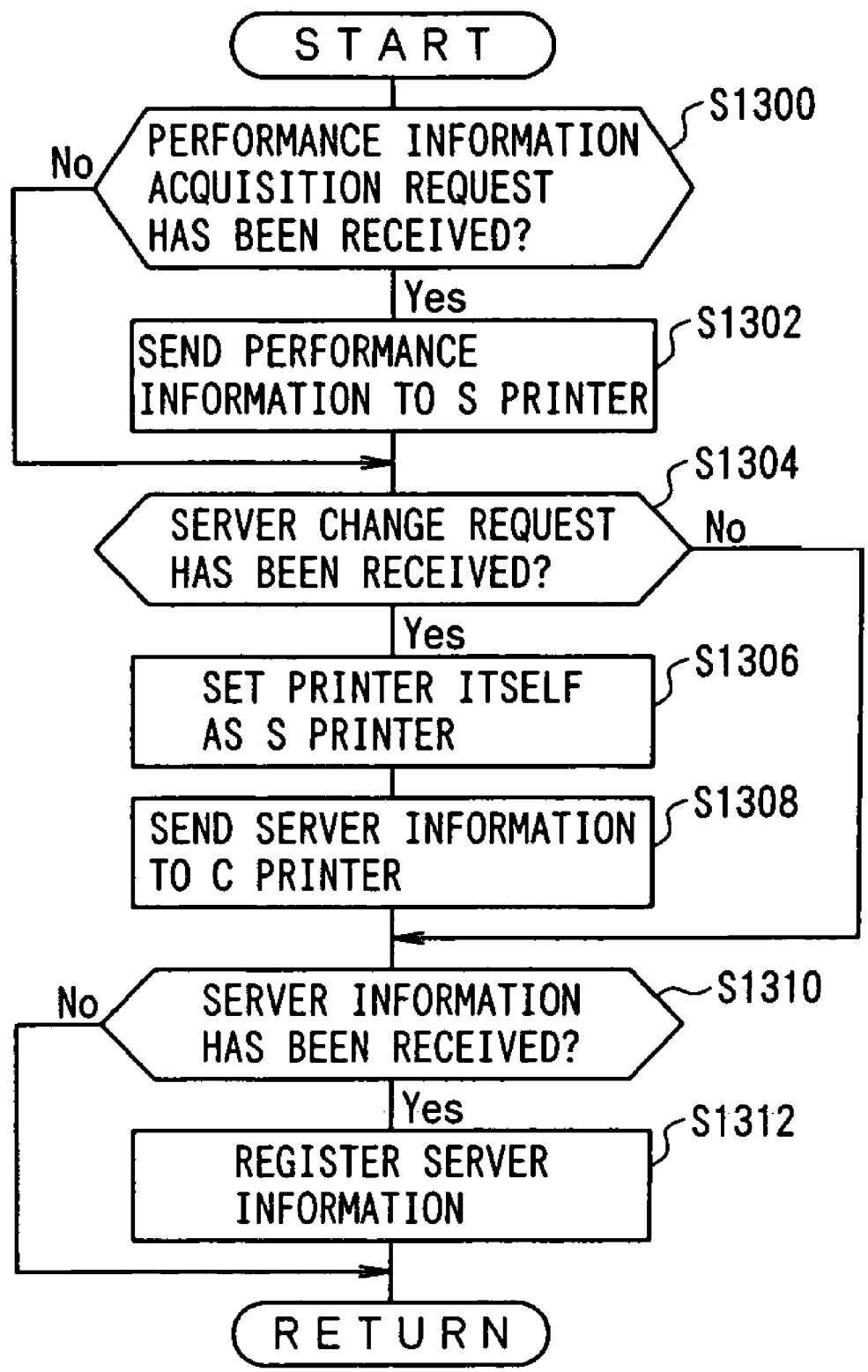
FIG. 34 is a flowchart showing server printer substitution processing of step S1250.

FIG. 34 is a flowchart showing the server printer substitute processing of step S1250.

The server printer substitute processing corresponds to the server printer determination processing of FIG. 20 and is processing for substituting the server printer 200. When the server printer substitute processing is executed in step S1250, as shown in FIG. 34, first, the network printer shifts to step S1300.

In step S1300, the network printer 200 judges whether or not a performance information acquisition request has been received. When it is judged that the performance information acquisition request has been received (Yes), the network printer 200 shifts to step S1302 to read out the performance information 540 from the storage 62 and send the read-out performance information 540 to the server printer 200. Then, the network printer 200 shifts to step S1304.

In step S1304, the network printer 200 judges whether or not the server substitution request has been received. When it is judged that the server substitution request has been received (Yes), the network printer 200 shifts to step S1306 to set the network printer 200 itself as the server printer 200, and shifts to step S1308 to send server information including an IP address of the network printer 200 itself to the respective client printers 200. Then, the network printer 200 shifts to step S1310.

In step S1310, the network printer 200 judges whether or not server information has been received. When it is judged that the server information has been received (Yes), the network printer 200 shifts to step S1312 to register the received server information in the storage 62. Then, the network printer 200 ends the series of processing and returns the server printer substitute processing to the original processing.

On the other hand, when it is judged in step S1310 that the server information has not been received (No), the network printer ends the series of processing and returns the server printer substitute processing to the original processing.

On the other hand, when it is judged in step S1304 that the server substitution request has not been received (No), the network printer 200 shifts to step S1310.

On the other hand, when it is judged in step S1300 that the performance information acquisition request has not been received (No), the network printer 200 shifts to step S1304.

Next, the time setting processing of step S1252 will be described in detail with reference to FIG. 35.

Figure 35:
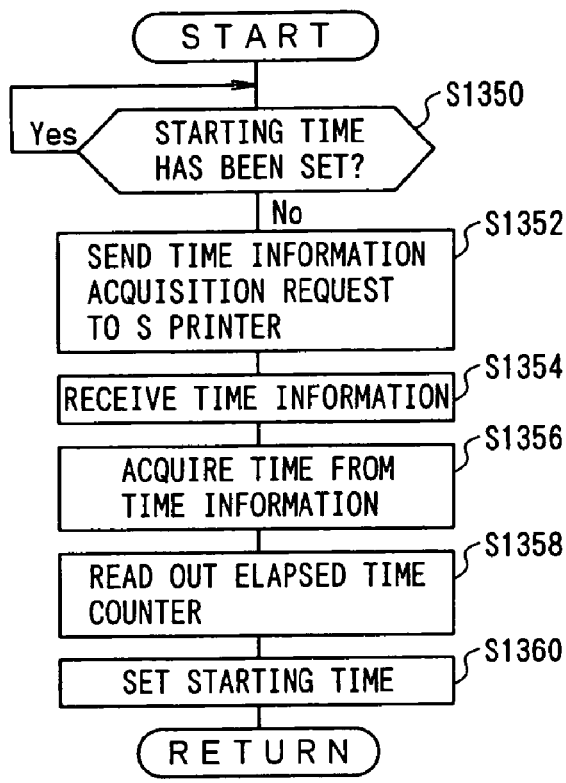
FIG. 35 is a flowchart showing time setting processing of step S1252.

FIG. 35 is a flowchart showing the time setting processing of step S1252.

The time setting processing corresponds to the time information notification processing of FIG. 27 and is processing for setting a time of the network printer 200 itself. When the time setting processing is executed in step S1252, as shown in FIG. 35, first, the network printer 200 shifts to step S1350.

In step S1350, the network printer 200 judges whether or not a starting time of the network printer 200 itself has been set. When it is judged that the starting time has not been set (No), the network printer 200 shifts to step S1352. When it is judged that the starting time has been set (Yes), the network printer 200 stands by in step S1350.

In step S1352, the network printer 200 sends a time information acquisition request to the server printer 200. Then, the network printer 200 shifts to step S1354 to receive time information, shifts to step S1356 to acquire a present time from the received time information, and shifts to step S1358 to read out the elapsed time counter from the RAM 54. Then, the network printer 200 shifts to step S1360.

In step S1360, the network printer 200 calculates an elapsed time from the starting time on the basis of the read-out elapsed time counter, subtracts the elapsed time from the acquired present time to calculate a starting time, and sets the calculated starting time by storing it in the RAM 54. Then, the network printer ends the series of processing and returns the time setting processing to the original processing.

Next, the timing information acquisition processing of step S1254 will be described in detail with reference to FIG. 36.

Figure 36:
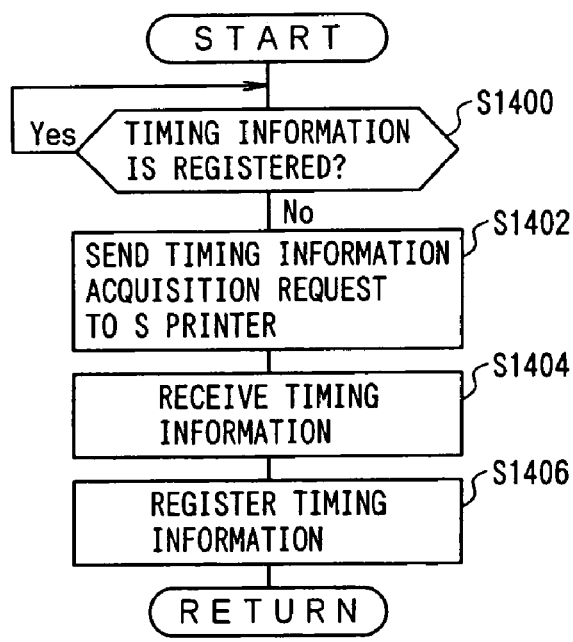
FIG. 36 is a flowchart showing timing information acquisition processing of step S1254.

FIG. 36 is a flowchart showing the timing information acquisition processing of step S1254.

The timing information acquisition processing corresponds to the timing information notification processing of FIG. 29 and is processing for acquiring timing information from the server printer 200. When the timing information acquisition processing is executed in step S1254, as shown in FIG. 36, first, the network printer 200 shifts to step S1400.

In step S1400, the network printer 200 judges whether or not the timing information is registered in the storage 62. When it is judged that the timing information is not registered (No), the network printer 200 shifts to step S1402. When it is judged that the timing information is registered (Yes), the network printer 200 stands by in step S1400.

In step S1402, the network printer 200 sends a timing information acquisition request to the server printer 200, shifts to step S1404 to receive timing information, and shifts to step S1406 to register the timing information in the storage 62. The network printer 200 ends the series of processing and returns the timing information acquisition processing to the original processing.

Next, the status information transmission processing of step S1256 will be described in detail with reference to FIG. 37.

Figure 37:
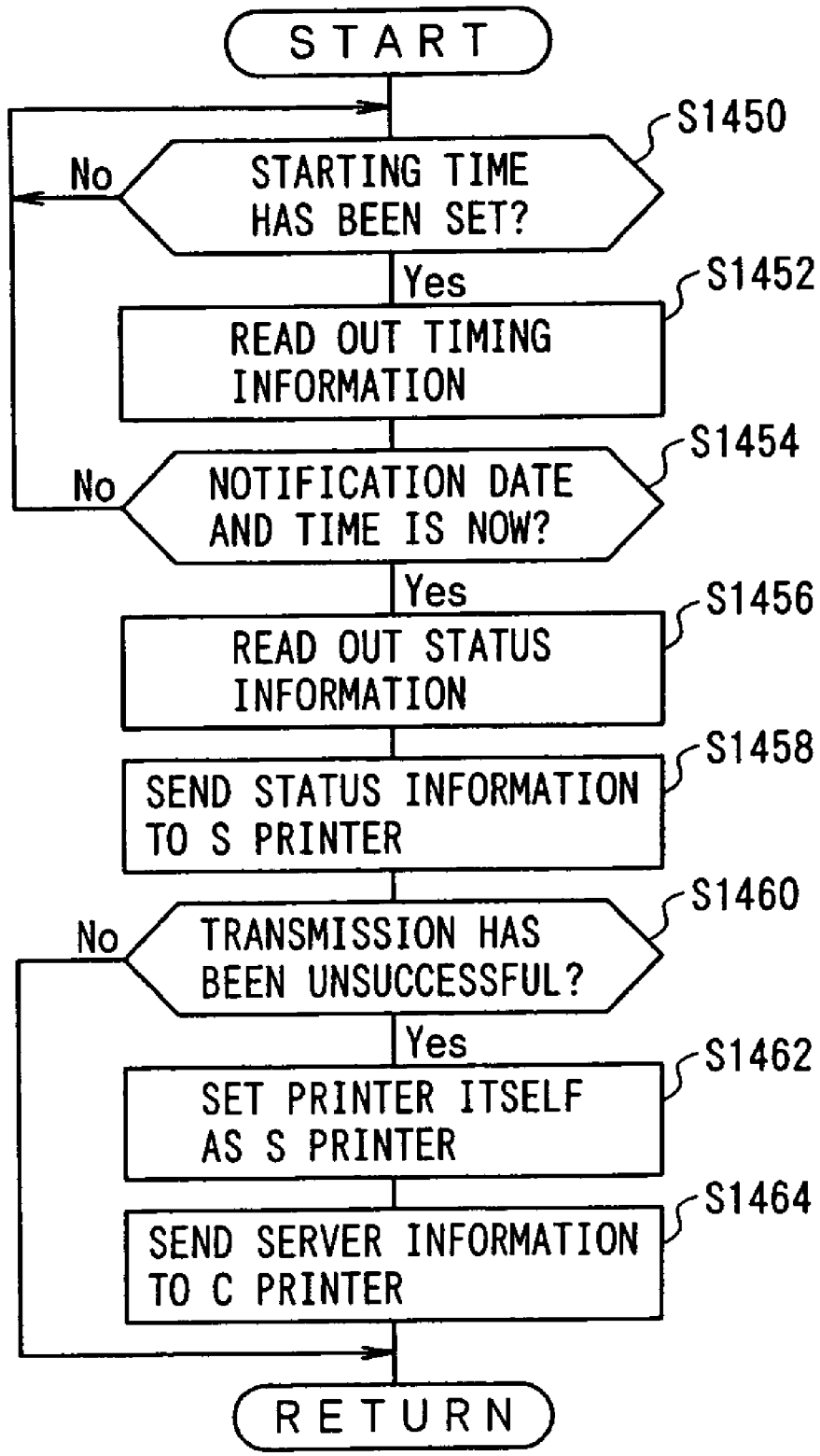
FIG. 37 is a flowchart showing status information transmission processing of step S1256.

FIG. 37 is a flowchart showing the status information transmission processing of step S1256.

The status information transmission processing corresponds to the status information registration processing of FIG. 30 and is processing for sending status information to the server printer 200. When the status information transmission processing is executed in step S1256, as shown in FIG. 37, first, the network printer 200 shifts to step S1450.

In step S1450, the network printer 200 judges whether or not a starting time of the network printer 200 itself has been set. When it is judged that the starting time has been set (Yes), the network printer 200 shifts to step S1452. When it is judged that the starting time has not been set (No), the network printer stands by in step S1450 until the starting time is set.

In step S1452, the network printer 200 reads out the timing information from the storage 62. Then, the network printer 200 shifts to step S1454 to judge whether or not a notification date and time is now on the basis of the read-out timing information. When it is judged that the notification date and time is now (Yes), the network printer shifts to step S1456. When it is judged that the notification date and time is not now (No), the network printer 200 shifts to step S1450.

In step S1456, the network printer 200 reads out the status information of the network printer 200 itself from the status information registration table 560, shifts to step S1458 to send the read-out status information to the server printer 200, and shifts to step S1460 to judge whether or not transmission of the status information has been unsuccessful. When it is judged that the transmission of the status information has been unsuccessful (Yes), the network printer 200 shifts to step S1462.

In step S1462, the network printer 200 sets the network printer 200 itself as the server printer 200. The network printer 200 shifts to step S1464 to send server information including the IP address of the network printer 200 itself to the respective client printers 200. Then, the network printer 200 ends the series of processing and returns the status information transmission processing to the original processing.

On the other hand, when it is judged in step S1460 that the transmission of the status information has been successful (No), the network printer 200 ends the series of processing and returns the status information transmission processing to the original processing.

Next, the operation state switching processing of step S1258 will be described in detail with reference to FIG. 38.

Figure 38:
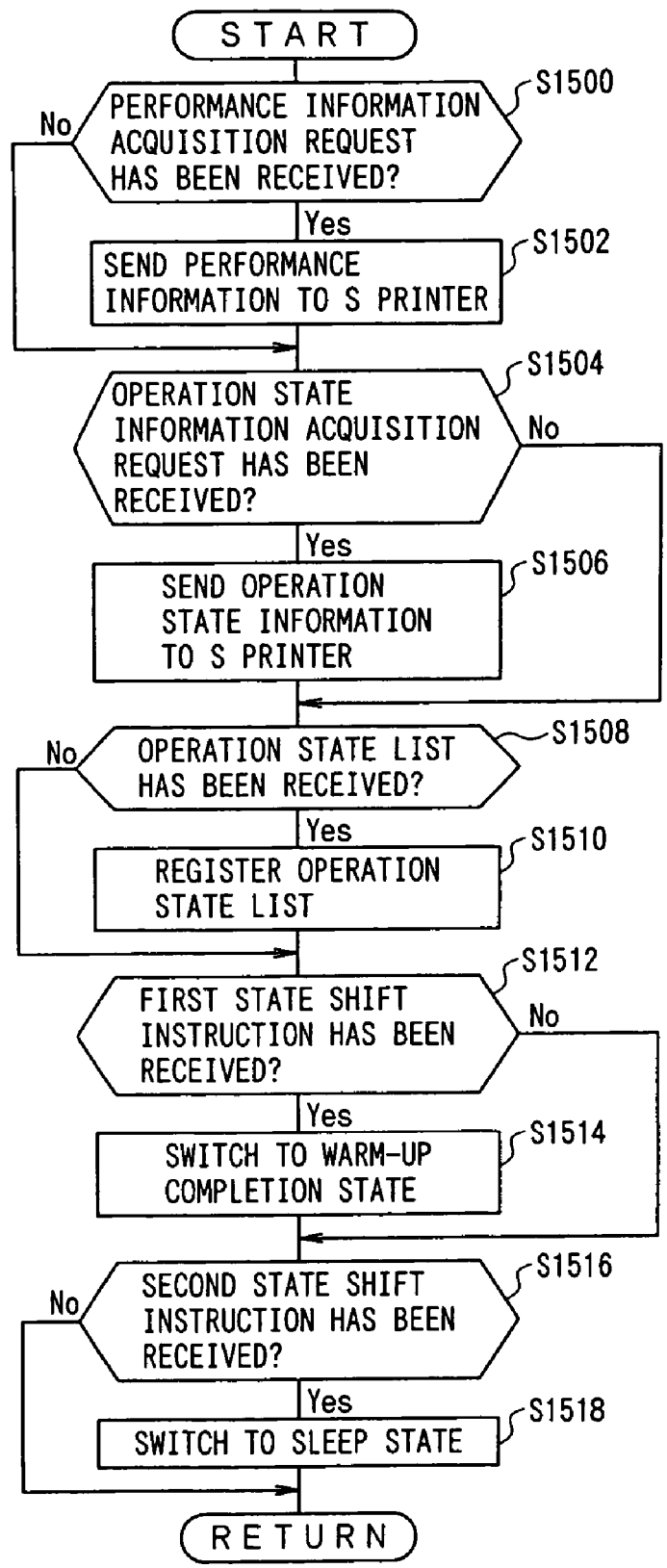
FIG. 38 is a flowchart showing operation state switching processing of step S1258.

FIG. 38 is a flowchart showing the operation state switching processing of step S1258.

The operation state switching processing corresponds to the operation state control processing of FIG. 32 and is processing for switching an operation state of the network printer 200 itself. When the operation state switching processing is executed in step S1258, as shown in FIG. 38, the network printer 200 shifts to step S1500.

In step S1500, the network printer 200 judges whether or not a performance information acquisition request has been received. When it is judged that the performance information acquisition request has been received (Yes), the network printer 200 shifts to step S1502 to read out the performance information 540 from the storage 62 and send the read-out performance information 540 to the server printer 200. Then, the network printer 200 shifts to step S1504.

In step S1504, the network printer 200 judges whether or not an operation state information acquisition request has been received. When it is judged that the operation state information acquisition request has been received (Yes), the network printer 200 shifts to step S1506 to generate operation state information indicating a present operation state of the network printer 200 itself and send the generated operation state information to the server printer 200. Then, the network printer 200 shifts to step S1508.

In step S1508, the network printer 200 judges whether or not the printer operation state list 512 has been received. When it is judged that the printer operation state list 512 has been received (Yes), the network printer 200 shifts to step S1510 to register the received printer operation state list 512 in the storage 62. Then, the network printer 200 shifts to step S1512.

In step S1512, the network printer 200 judges whether or not a first state shift instruction has been received. When it is judged that the first state shift instruction has been received (Yes), the network printer 200 shifts to step S1514 to switch an operation state of the network printer 200 itself to the warm-up completion state. Then, the network printer 200 shifts to step S1516.

In step S1516, the network printer 200 judges whether or not a second state shift instruction has been received. When it is judged that the second state shift instruction has been received (Yes), the network printer 200 shifts to step S1518 to switch the operation state of the network printer 200 itself to the sleep state. Then, the network printer 200 ends the series of processing and returns the operation state switching processing to the original processing.

On the other hand, when it is judged in step S1516 that the second state shift instruction has not been received (No), the network printer ends the series of processing and returns the operation state switching processing to the original processing.

On the other hand, when it is judged in step S1512 that the first state shift instruction has not been received (No), the network printer 200 shifts to step S1516.

On the other hand, when it is judged in step S1508 that the printer operation sate list 512 has not been received (No), the network printer 200 shifts to step S1512.

On the other hand, when it is judged in step S1504 that the operation state information acquisition request has not been received (No), the network printer 200 shifts to step S1508.

On the other hand, when it is judged in step S1500 that the performance information acquisition request has not been received (No), the network printer 200 shifts to step S1504.

Next, the application installing processing of step S1260 will be described in detail with reference to FIG. 44.

Figure 44:
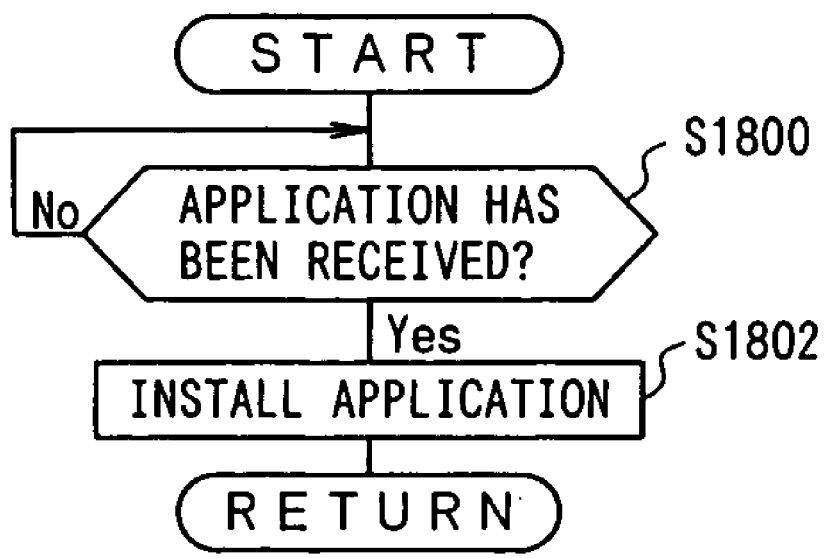
FIG. 44 is a flowchart showing application installing processing of step S1260.

FIG. 44 is a flowchart showing the application installing processing of step S1260.

The application installing processing is processing for installing an application received from the server printer 200. When the application installing processing is executed in step S1260, as shown in FIG. 44, first, the network printer 200 shifts to step S1800.

In step S1800, the network printer 200 judges whether or not the application has been received from the server printer 200. When it is judged that the application has been received (Yes), the network printer 200 shifts to step S1802. When it is judged that the application has not been received (No), the network printer 200 stands by in step S1800 until the application is received.

In step S1802, the network printer 200 installs the received application, and ends the series of processing and returns the application installing processing to the original processing.

Next, the application uninstalling processing of step S1262 will be described in detail with reference to FIG. 45.

Figure 45:
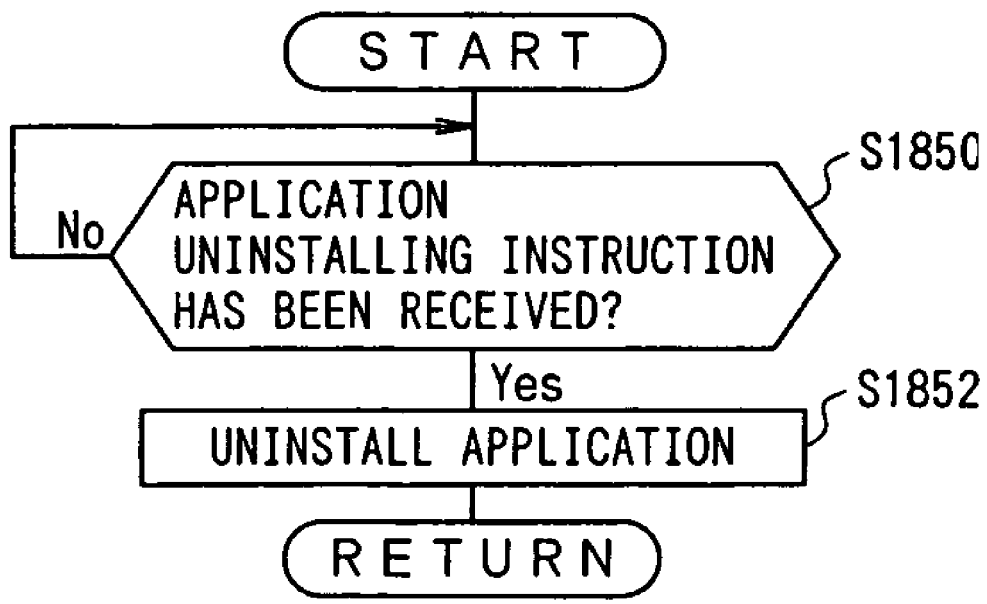
FIG. 45 is a flowchart showing application uninstalling processing of step S1262.

FIG. 45 is a flowchart showing the application uninstalling processing of step S1262.

The application uninstalling processing is processing for uninstalling an application, which the network printer 200 is instructed by the server printer 200 to uninstall. When the application uninstalling processing is executed in step S1262, as shown in FIG. 45, first, the network printer 200 shifts to step S1850.

In step S1850, the network printer 200 judges whether or not an uninstalling instruction of an application has been received from the server printer 200. When it is judged that the uninstalling instruction has been received (Yes), the network printer 200 shifts to step S1852. When it is judged that the uninstalling instruction has not been received (No), the network printer 200 stands by in step S1850 until the uninstalling instruction is received.

In step S1852, the network printer 200 uninstalls the application, which the network printer 200 is instructed to uninstall, on the basis of the received uninstalling instruction of the application. Then, the network printer 200 ends the series of processing and returns the application uninstalling processing to the original processing.

Next, operations of this embodiment will be described.

First, a case in which the server printer 200 is determined will be described.

In the network printer 200, when a power supply is inputted by a user, the other network printers 200 is searched out of the identical sub-network 198 through step S602. As a result, if no other network printer 200 is searched, the network printer 200 itself is set as the server printer 200 through steps S606 and S608, and a power supply input instruction is sent to the network printer, which has not been started, among the network printers 200 belonging to the identical sub-network 198.

In the network printer 200, which has not been started, when the power supply input instruction has been received, a power supply of the network printer 200 itself is inputted through step S452. Then, the other network printers 200 are searched out of the identical sub-network 198 through step S602. However, since the server printer 200 already exists, the network printer 200 itself is set as the client printer 200 through step S622.

Moreover, in the server printer 200, a performance information acquisition request is sent to the respective client printers 200 through step S610.

In the client printer 200, when the performance information acquisition request is received, the performance information 540 is read out from the storage 62 through step S1302, and the read-out performance information 540 is sent to the server printer 200.

In the server printer 200, when the performance information 540 is received from the respective client printers 200, it is judged whether or not a performance of the client printer 200 is higher than a performance of the network printer 200 itself through step S614 on the basis of the received performance information 540 and the performance information 540 of the storage 62. As a result, if it is judged that the performance of the client printer 200 is higher, through steps S618 and S620, a server substitution request is sent to the client printer 200 with the highest performance, and the network printer 200 itself is set as the client printer 200.

In the client printer 200, when the server substitution request is received, through steps S1306 and S1308, the network printer 200 itself is set as the server printer 200, and server information is sent to the respective client printers 200.

In the client printer 200, when the server information is received, the received server information is registered in the storage 62 through step S1312.

Note that, in the server printer 200, if it is judged that the performance of the network printer 200 itself is higher, the server information is sent to the respective client printers 200 through step S616.

In addition, in order to prevent the plurality of network printers 200 from being started almost simultaneously to be server printers 200, existence of the other server printers 200 in the network is monitored immediately after the network printer 200 itself has become the server printer 200 and thereafter periodically and, in the case in which the plurality of server printers 200 exist in the network, one of them with the highest performance becomes the server printer 200, and the other server printers 200 become the client printers 200.

In addition, in the case in which the performance of the network printer 200 itself and the client printer 200 are the same, for example, the network printers 200 hold a time when a power supply is inputted with an accuracy of 1/1000 seconds and, in the case in which performance information is identical, one with the earliest input time becomes the server printer 200. In addition, serial numbers of the network printers 200 are compared, and one with the smallest serial number becomes the server printer 200. Further, degrees of wear such as total numbers of printed sheets or total power supply input time are compared, and one with the smallest degree of wear becomes the representative server printer 200.

As described above, when a power supply is inputted to any one of the network devices 200, a power supply is inputted to all the network printers 200 belonging to the identical sub-network 198. Any one of the network printers 200 belonging to the identical sub-network 198 dynamically becomes the server printer 200 and the other network printers 200 become the client printers 200.

Next, a case in which a time of the network printer 200 is set will be described.

In the server printer 200, when a power supply is inputted, the elapsed time counter of the RAM 54 is initialized through step S552. Thereafter, steps S554 to S558 are repeated for each predetermined period (e.g., 100 [ms]), and the elapsed time counter is read out from the RAM 54 and the read-out elapsed time counter is stored in the RAM 54 after "1" is added thereto.

In the server printer 200, if a starting time is not set, through steps S900 to S904, printer basic information is read out from the storage 62, and an arbitrary file name is determined, and a file creation request is sent to the printer management server 100 together with the determined file name on the basis of the read-out printer basic information.

In the printer management server 100, when the file creation request is received, a file of the file name designated by the file creation request is created anew in the storage 42 through step S204. When the creation of the file is successful, a creation success notification is sent to the server printer 200 through step S208.

In the server printer 200, when the creation success notification is received, a property information acquisition request is sent to the printer management server 100 together with the determined file name on the basis of the read-out printer basic information through step S908.

In the printer management server 100, when the property information acquisition request is received, property information is created for a file with the file name designated by the property information acquisition request among the files of the storage 42 through step S254. When the creation of the property information is successful, the created property information is sent to the server printer 200 through step S258.

In the server printer 200, when the property information is received, through steps S912 and S914, a creation time is acquired from the received property information, and the elapsed time counter is read out from the RAM 54. Then, through step S916, an elapsed time from the starting time is calculated on the basis of the read-out elapsed time counter, the elapsed time is subtracted from the acquired creation time to calculate a starting time, and the calculated starting time is stored in the RAM 54. Consequently, the starting time is set in the server printer 200.

On the other hand, in the client printer 200, when the power supply is inputted, the elapsed time counter in the RAM 54 is initialized through step S552. Thereafter, steps S554 to S558 are repeated for each predetermined period (e.g., 100 [ms]), the elapsed time counter is read out from the RAM 54, and the read-out elapsed time counter is stored in the RAM 54 after "1" is added thereto.

In the client printer 200, if a starting time is not set, a time information acquisition request is sent to the server printer 200 through step S1352.

In the server printer 200, when the time information acquisition request is received, through steps S954 to S958, a starting time and the elapsed time counter are read out from the RAM 54, an elapsed time from the starting time is calculated on the basis of the read-out elapsed time counter, and the elapsed time is added to the read-out starting time to calculate a present time. Then, time information including the read-out present time is sent to the client printer 200 through step S960.

In the client printer 200, when the time information is received, a present time is acquired from the received time information through steps S1356 and S1358, and the elapsed time counter is read out from the RAM 54. Then, through step S1360, an elapsed time from the starting time is calculated on the basis of the read-out elapsed time counter, the elapsed time is subtracted from the acquired present time to calculate a starting time, and the calculated starting time is stored in the RAM 54. Consequently, the starting time is set in the client printer 200.

Next, a case in which access timing of the network printer 200 is set will be described.

In the server printer 200, if timing information is not registered, a timing information acquisition request is sent to the printer management server 100 through step S1002.

In the printer management server 100, when the timing information acquisition request is received, through steps S152 and S154, a notification date and time corresponding to the server printer 200 of a request source is read out from the timing information registration table 410, and timing information including the read-out notification date and time is sent to the server printer 200.

In the server printer 200, when the timing information is received, the timing information is registered in the storage 62 through step S1006.

Access timing for each server printer 200 is specified in the timing information registration table 410 such that accesses by the server printers 200 are dispersed. Thus, if the respective server printers 200 access the printer management server 100 on the basis of the timing information, accesses by the plurality of server printers 200 are dispersed.

On the other hand, in the client printer 200, if the timing information is not registered, a timing information acquisition request is sent to the server printer 200 through step S1402.

In the server printer 200, when the timing information acquisition request is received, through steps S1052 and S1054, a notification date and time corresponding to the client printer 200 of a request source is read out from the timing information registration table 550, and timing information including the read-out notification date and time is sent to the client printer 200.

In the client printer 200, when the timing information is received, the timing information is stored in the storage 62 through step S1406.

Access timing for each client printer 200 is specified in the timing information registration table 550 such that accesses by the client printers 200 is dispersed. Thus, if the respective client printers 200 access the server printer 200 on the basis of the timing information, accesses by the plurality of client printers 200 are dispersed.

Next, a case in which status information of the network printer 200 is collected will be described.

In the client printer 200, when a notification date and time specified by the timing information of the storage 62 has come, through steps S1456 and S1458, the status information of the network printer 200 itself is read out from the status information registration table 560, and the read-out status information is sent to the server printer 200.

In the server printer 200, when the status information is received, the received status information is registered for each client printer 200 in the status information registration table for collection through step S1102.

On the other hand, in the server printer 200, when a notification date and time specified by the timing information in the storage 62 has come, through steps S1156 and S1158, the status information of the respective client printers 200 is read out from the status information registration table for collection, the status information of the network printer 200 itself is read out from the status information registration table 560, and the read-out status information is sent to the printer management server 100.

In the printer management server 100, when the status information is received, the received status information is registered for each network printer 200 in the status information registration table for collection through step S302.

Next, a case in which a trouble has occurred in the server printer 200 will be described.

In the client printer 200, when a trouble has occurred in the server printer 200 and transmission of status information is unsuccessful, through steps S1462 and S1464, the network printer 200 itself is set as the server printer 200, and server information is sent to the respective client printers 200.

Next, a case in which an operation state of the network printer 200 is controlled will be described.

In the server printer 200, first, a performance information acquisition processing is sent to the respective client printers 200 through step S1202.

In the client printer 200, when the performance information acquisition request is received, through step S1502, the performance information 540 is read out from the storage 62, and the read-out performance information 540 is sent to the server printer 200.

In the server printer 200, when the performance information 540 is received from the respective client printers 200, through step S1206, a printer performance list is created on the basis of the received performance information 540, and the created printer performance list is registered in the storage 62. Then, an operation state information acquisition request is sent to the respective client printer 200 through step S1206.

In the client printer 200, when the operation state information acquisition request is received, through step S1506, operation state information indicating a present operation state of the network printer 200 itself is generated, and the generated operation state information is sent to the server printer 200.

In the server printer 200, when the operation state information is received from the respective client printers 200, through step S1210, the printer operation state list 512 is created on the basis of the received operation state information, and the created printer operation state list 512 is registered in the storage 62. Then, through steps S1212 and S1214, the created printer operation state list 512 is sent to the respective client printers 200 and the respective user terminals.

In the client printer 200, when the printer operation state list 512 is received, the received printer operation state list 512 is registered in the storage 62 through step S1510.

As described above, the printer operation state list 512, which is necessary for controlling an operation state of the network printer 200, is created.

In the server printer 200, when the printer operation state list 512 is created, through step S1216, it is judged whether or not there is the client printer 200, which is in the warm-up state, among the client printers 200 belonging to the identical group. As a result, when it is judged that there is no client printer 200 which is in the warm-up state, a first state shift instruction is sent to the client printer 200 with the highest performance among the client printers 200 belonging to the identical group through step S1218.

In the client printer 200, when the first state shift instruction is received, an operation state of the network printer 200 itself is switched to the warm-up completion state through step S1514.

On the other hand, in the server printer 200, when it is judged that there is the client printer 200 which is in the warm-up completion state, through step S1226, it is judged whether or not the plurality of client printers 200 among the client printer 200 belonging to the identical group is in the warm-up completion state. As a result, when it is judged that the plurality of client printers 200 are in the warm-up completion state, through steps S1228 and S1230, a first state shift instruction is sent to the client printer 200 with the highest performance among the client printers 200 belonging to the identical group, and a second state shift instruction is sent to the client printers 200 with the second highest or lower order performances among the client printers 200 belonging to the identical group.

In the client printer 200, when the first state shift instruction is received, the operation state of the network printer 200 itself is switched to the warm-up completion state through step S1514.

In the client printer 200, when the second state shift instruction is received, the operation state of the network printer 200 itself is switched to the sleep state through step S1518.

Next, a case in which printing is performed with any one of the network printers 200 in a user terminal will be described.

In the case in which printing is performed in any one of the network printers 200, a user inputs a print request and designates the network printer 200 in the user terminal.

Figure 39:
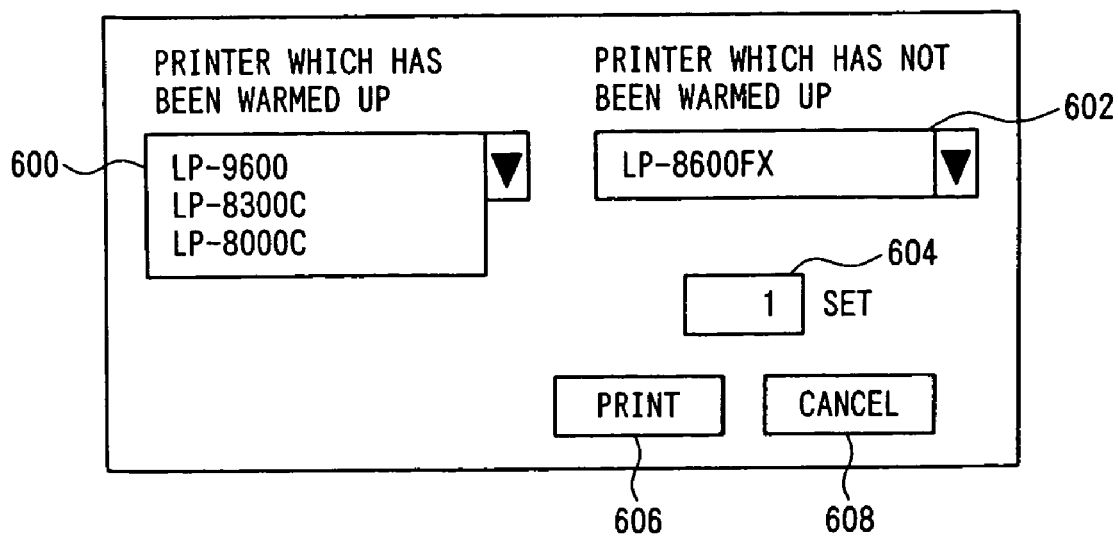
FIG. 39 is a GUI showing a print request screen in a user terminal.

FIG. 39 is a GUI showing a print request screen in the user terminal.

In the user terminal, when the print request is inputted, a print request screen as shown in FIG. 39 is displayed. In the user terminal, since transmission of the printer operation state list 512 is received from the server printer 200, the network printers 200 in the warm-up completion state and the network printers 200 in the sleep state can be grasped. In the print request screen of FIG. 39, there are provided a list box 600 in which a list of the network printers 200 in the warm-up completion state is displayed, a list box 602 in which a list of the network printers 200 in the sleep state is displayed, a text box 604 in which the number of printed sheets is inputted, a print button 606 which instructs execution of printing, and cancel button 608 which instructs stop of printing.

Here, for example, when the user designates the network printer 200 in the warm-up completion state to execute printing, a print instruction and print data are sent to the network printer 200 in the warm-up completion state.

In the network printer 200, when the print instruction and the print data are received, since the operation state of the network printer 200 itself is the warm-up completion state, printing is performed by the printing device 64 on the basis of the received print data through step S656.

In addition, for example, when the user designates the network printer 200 in the sleep state to execute printing, a print instruction and print data are sent to the network printer 200 in the sleep state.

In the network printer 200, when the print instruction and the print data are received, since the operation state of the network printer 200 itself is the warm-up completion state, the printer operation state list 512 is read out from the storage 62 through step S662. The print data is transferred to the other network printers 200 in the warm-up state on the basis of the read-out printer operation state list 512. Then, guide information on the network printers 200 of transfer destinations is notified to the user terminal through step S666.

In the other network printers 200, when the print data is received, since the operation state of the network printer 200 itself is the warm-up completion state, printing is performed by the printing device 64 on the basis of the received print data through step S656.

In addition, in the user terminal, when the guide information is received, the received guide information is displayed on a display or the like. Consequently, the user can grasp names, locations, and the like of the network printers 200 of transfer destinations.

Next, a case in which the power supply of the network printer 200 is isolated will be described.

In the case in which power supplies are isolated collectively, the user inputs a power supply isolation request from the operation panel 60 in any one of the network printers 200.

In the network printer 200, when the power supply isolation request is inputted, the power supply isolation request is sent to the server printer 200 through step S702.

In the server printer 200, when the power supply isolation request is received, through steps S852 and S854, a power supply isolation instruction is sent to the respective client printers 200, and the power supply of the network printer 200 itself is isolated.

In the client printer 200, when the power supply isolation instruction is received, the power supply of the network printer 200 itself is isolated through step S752.

As described above, when the power supply isolation request is inputted in any one of the network devices 200, power supplies of all the network printers 200 belonging to the identical sub-network 198 are isolated.

Next, a case in which an application is installed in the network printer 200 will be described.

In the printer management server 100, when collective delivery of an application is requested, the application is delivered to the server printer 200 through step S1602.

In the server printer 200, when the application is received, the application is installed through step S1702, and the application is delivered to the client printer 200 through step S1704.

In the client printer 200, when the application is received, the application is installed through step S1802.

As described above, when the application is received in the server printer 200, the application is delivered to all the client printers 200, and the application is installed in the server printer 200 and all the client printers 200.

Next, a case in which an application installed in the network printer 200 is uninstalled will be described.

In the printer management server 100, when uninstall of the application is requested, an uninstalling instruction for the application is sent to the server printer 200 through step S1652.

In the server printer 200, when the uninstalling instruction of the application is received, the application is uninstalled through step S1752, and the uninstalling instruction for the application is sent to the client printer 200 through step S1754.

In the client printer 200, when the uninstalling instruction for the application is received, the application is uninstalled through step S1852.

As described above, when the uninstalling instruction for the application is received in the server printer 200, the uninstalling instruction for the application is sent to all the client printers 200, and the application installed in the server printer 200 and all the client printers 200 is uninstalled.

In this way, in this embodiment, it is possible to set the network printer 200 as the server printer 200 or the client printer 200. When the network printer 200 itself is the client printer 200, the network printer 200 sends status information in the status information registration table 560 to the server printer 200. In the case in which the network printer 200 itself is the server printer 200, when status information is received, the network printer 200 registers the received status information in the status information registration table for collection.

Consequently, a printer management server does not have to be provided for each sub-network 198. Thus, cost and time required for introduction and maintenance of the system can be reduced compared with the conventional system.

In addition, an arbitrary network printer among the plurality of network printers 200 can play a role of a server. Thus, even if a trouble has occurred in a specific network printer 200, it is less likely that a service offered by the network printer 200 stops. Therefore, reliability for coping with a trouble can be improved compared with the conventional system.

In this embodiment, when the network printer 200 itself is the server printer 200, the network printer 200 sends the status information in the status information registration table for collection to the printer management server 100.

Consequently, the server printer 200 sends status information of the respective network printers 200 collectively to the printer management server 100. Thus, processing load of the printer management server 100 can be reduced compared with a constitution in which the network printers 200 send status information, respectively.

Moreover, in this embodiment, when the network printer 200 itself is the client printer 200, the network printer 200 sends the status information in the status information registration table 560 voluntarily to the server printer 200.

Consequently, processing load of the server printer 200 and communication traffic on a network can be reduced compared with a constitution in which the server printer 200 polls the client printer 200 at a predetermined period to acquire status information.

For example, when a system in which the server printer 200 accesses the client printer 200 to collect status information is adopted, communication for information collection from the server printer 200 to the client printer 200 is generated periodically. In this case, since the communication is generated even if there is no change in the status information of the client printer 200, useless communication has occurred.

In this embodiment, in order to eliminate the uselessness, the client printer 200 accesses the server printer 200 voluntarily only in the case in which there is a change in status information of its own. Thus, there is an effect that communication can be generated only when it is necessary, and communication traffic on the network can be saved.

Therefore, for example, if a function for the client printer 200 to send status information voluntarily is removed in order to avoid this embodiment, it is not possible to obtain the effect that communication traffic on the network can be saved.

In this embodiment, when it is judged that there is no network printer 200 in operation other than the network printer 200 itself in the identical sub-network 198, the network printer 200 sets the network printer 200 itself as the server printer 200.

Consequently, since it is unnecessary to set the network printer 200 to be the server printer 200 in advance, time required for setting a system can be reduced.

In this embodiment, in the case in which the network printer 200 itself is the server printer 200, when a performance of the network printer 200 itself and a performance of the client printer 200 are compared and it is judged that the performance of the client printer 200 is higher, the network printer 200 sends a server substitution request to the pertinent client printer 200 and sets the network printer 200 itself as the client printer 200. When the server substitution request is received, the network printer 200 sets the network printer 200 itself as the server printer 200.

Consequently, since the network printer 200 with a relatively high performance in the identical sub-network 198 becomes the server printer 200, collection of status information can be performed efficiently.

In this embodiment, when the server printer 200 has become inoperative, the network printer 200 selects the client printer 200 with the highest performance out of the client printers 200 and switches the selected client printer 200 to the server printer 200.

Consequently, even if a trouble or the like has occurred in the server printer 200 and the server printer 200 has become inoperative, another network printer 200 in operation becomes the server printer 200. Thus, the likelihood that the service offered by the network printer 200 stops can be further reduced. Therefore, the reliability for coping with a trouble can be further improved.

In addition, since the network printer 200 with the highest performance among the plurality of network printers 200 becomes the server printer 200, even if a trouble or the like has occurred in the server printer 200 and the server printer 200 has become inoperative, collection of status information can be continued efficiently.

In this embodiment, when a file creation request is received, the printer management server 100 creates a file relating to the file creation request and records the created file in the storage 42 together with a creation time thereof. When a property information acquisition request is received, the printer management server 100 creates property information for a file relating to the property information acquisition request among the files in the storage 42 and sends the created property information to the server printer 200. When the network printer 200 itself is the server printer 200, the network printer 200 sends a file creation request and a property information acquisition request to the printer management server 100. When property information is received, the network printer 200 sets a time on the basis of a creation time included in the property information.

Consequently, a time of the server printer 200 can be set utilizing a function for performing recording of a file together with recording of a creation time thereof and a function for providing the server printer 200 with the creation time of the file as a file management function held by the printer management server 100. In other words, time setting can be performed utilizing a function which a WWW server or the like normally has. Thus, time setting of the server printer 200 can be performed relatively easily without changing the printer management server 100.

In this embodiment, when a power supply input instruction is received, the network printer 200 inputs the power supply of the network printer 200 itself. When the network printer 200 itself has become the server printer 200, the network printer 200 sends the power supply input instruction to the client printers 200, which have not been started, among the client printers 200.

Consequently, whereas power supplies for respective network printers 200 have been conventionally inputted one by one, a power supply is inputted to all the client printers 200 simply by changing one network printer 200 to the server printer 200. Thus, power supply input work becomes relatively easy.

In this embodiment, when a power supply isolation instruction is received, the network printer 200 isolates the power supply of the network printer 200 itself. In the case in which the network printer 200 itself is the server printer 200, when the power supply isolation request is received, the network printer 200 sends the power supply isolation instruction to the client printers 200, to which the power supply has been inputted, among the client printers 200.

Consequently, whereas power supplies of the respective network printers 200 have been conventionally isolated one by one, power supplies of all the client printers 200 are isolated simply by inputting the power supply isolation request in any one of the network printers 200. Thus, isolation work for the power supplies becomes relatively easy.

In this embodiment, the printer management server 100 notifies the server printer 200 of timing information indicating access timing corresponding to the server printer 200 with reference to the timing information registration table 410. When the network printer 200 itself is the server printer 200, the network printer 200 receives the timing information and sends the status information in the status information registration table for collection to the printer management server 100 on the basis of the received timing information.

Consequently, since accesses by the plurality of server printers 200 are less likely to concentrate on the printer management server 100, an increase in communication traffic can be suppressed, and the likelihood of giving excessive processing load to the printer management server 100 can be reduced.

In this embodiment, when the network printer 200 itself is the server printer 200, the network printer 200 notifies the client printer 200 of timing information indicating access timing corresponding to the client printer 200 with reference to the timing information registration table 550. When the network printer 200 itself is the client printer 200, the network printer 200 receives the timing information and sends the status information in the status information registration table 560 to the server printer 200 on the basis of the received timing information.

Consequently, since accesses of the plurality of client printers 200 is less likely to concentrate on the server printer 200, an increase in communication traffic can be suppressed, and the likelihood of giving excessive processing load to the server printer 200 can be reduced.

In this embodiment, the timing information registration table 410 specifies a notification date and time for starting an access to the printer management sever 100 for each server printer 200 as access timing such that access periods of the respective server printers 200 do not overlap each other.

Consequently, accesses by the plurality of server printers 200 are dispersed effectively, and accesses to the printer management server 100 becomes less likely to concentrate. Thus, the increase in communication traffic can be further suppressed, and the likelihood of giving excessive processing load to the printer management server 100 can be further reduced.

In this embodiment the timing information registration table 550 specifies a notification date and time for starting an access to the server printer 200 for each client printer 200 as access timing such that access periods of the respective client printers 200 do not overlap each other.

Consequently, accesses by the plurality of client printers 200 are dispersed effectively, and accesses to the server printer 200 becomes less likely to concentrate. Thus, the increase in communication traffic can be further suppressed, and the likelihood of giving excessive processing load to the server printer 200 can be further reduced.

In this embodiment, an operation state of the network printer 200 can be switched to the warm-up completion state and the sleep state. When the network printer 200 itself is the server printer 200, operation states of the respective network printers 200 can be switched to the warm-up completion state or the sleep state such that any one of the plurality of network printers 200 comes into the warm-up completion state.

Consequently, even if a sudden print request is sent to the network printer 200, the network printer 200 which is in the warm-up state can be used. Thus, a time during which the network printer 200 changes from the sleep state to the warm-up state is not required until completion of printing. In addition, since the network printers 200 except one among the plurality of network printers 200 come into the sleep state, power saving of the entire network is not damaged so much. Therefore, a relatively quick response to the sudden print request can be realized while power saving of the entire network is realized.

In this embodiment, the client printers 200 are classified into groups for each use. When the network printer 200 itself is the server printer 200, the network printer 200 sends a first state shift instruction or a second state shift instruction to the respective client printers 200 such that any one of the client printers 200 belonging to the identical group comes into the warm-up completion state.

Consequently, even if a sudden print request is generated for each use, the network printer 200 in the warm-up completion state can be used. Thus, a time is not required for the network printer 200 to change from the sleep state to the warm-up completion state until completion of printing. Therefore, even if a sudden print request is generated for each use, a relatively quick response for the print requests can be realized.

In this embodiment, when the network printer 200 itself is the server printer 200, the network printer 200 notifies the other client printer 200 of the printer operation state list 512 for the client printer 200 in the warm-up completion state.

Consequently, in the other client printers 200, when the printer operation state list 512 is received, the client printer 200 in the warm-up completion state can be grasped according to the received printer operation state list 512. Thus, for example, a name, a location, and the like of the client printer 200 in the warm-up completion state can be notified to a user, or print data can be transferred to the client printer 200 in the warm-up completion state.

In this embodiment, when the network printer 200 itself is not in the warm-up completion state, the network printer 200 transfers the received print data to the client printer 200 in the warm-up completion state. When the network printer 200 itself is in the warm-up completion state, the network printer 200 performs printing on the basis of the received print data.

Consequently, when the user requests an arbitrary network printer 200 to perform printing, printing can be performed in the client printer 200 in the warm-up completion state. Therefore, a relatively quick response can be realized while power saving of the entire network is realized.

In this embodiment, when print data is transferred, the network printer 200 notifies a user terminal of guide information on the client printer 200 of a transfer destination.

Consequently, in the user terminal, when the guide information is received, the name, the location, and the like of the client printer 200 in the warm-up completion state according to the received guide information.

In this embodiment, when the network printer 200 itself is the server printer 200, the network printer 200 notifies the user terminal of the printer operation state list 512 for the client printer 200 in the warm-up completion state.

Consequently, in the user terminal, when the printer operation state list 512 is received, the client printer 200 in the warm-up completion state can be grasped according to the received printer operation state list 512. Thus, for example, the name, the location, and the like of the client printer 200 in the warm-up completion state can be notified to the user, or print data can be sent to the client printer 200 in the warm-up completion state preferentially.

Note that, in the above-described embodiment, in the timing information notification processing of step S100, the printer management server 100 notifies the server printer 200 of timing information in response to a timing information acquisition request from the server printer 200. However, the present invention is not limited to this. The printer management server 100 may notify the server printer 200 of the timing information voluntarily.

In the above-described embodiment, a program for executing the processing shown in the flowcharts of FIGS. 16 to 38 is incorporated in the network printer 200 in advance. However, the present invention is not limited to this. It is also possible to register programs for executing the processing shown in the flowcharts of FIGS. 16 to 38 in a printer program management server on the Internet 199 in advance and, when the network printer 200 is connected to the sub-network 198, download the programs from the printer program management server and dynamically incorporate the programs in the network printer 200.

In the above-described embodiment, in the case in which the network printer 200 itself is the server printer 200, the network printer 200 compares a performance of the network printer 200 itself and a performance of the client printer 200 and, when it is judged that the performance of the client printer 200 is higher, sends a server substitution request to the pertinent client printer 200 and sets the network printer 200 itself as the client printer 200, and when the server substitution request is received, the network printer 200 sets the network printer 200 itself as the server printer 200. However, the client printer 200 may send the server substitution request. In other words, in the case in which the network printer 200 itself is the client printer 200, the network printer 200 compares the performance of the network printer 200 itself and the performance of the server printer 200 and, when it is judged that the performance of the network printer 200 itself is higher, sends the server substitution request to the server printer 200 and sets the network printer 200 itself as the server printer 200, and when the server substitution request is received, sets the network printer 200 itself as the client printer 200.

In the above-described embodiment, the server printer 200 sends server information only to the client printer 200. However, the present invention is not limited to this, and the server printer 200 may send the server information to the printer management server 100 as well. When the server information is received, the printer management server 100 updates the printer information registration table 400 on the basis of the received server information.

In the above-described embodiment, a case in which the printer management server 100 updates the timing information registration table 410 is not specifically described. However, in the case in which the number of server printers 200 is increased, it is also possible to specify a notification date and time for starting an access to the printer management server 100 as access timing again for each server printer 200 such that access periods of the respective server printers 200 do not overlap each other, and update the timing information registration table 410.

In the above-described embodiment, a case in which the server printer 200 updates the timing information registration table 550 is not specifically described. However, in the case in which the number of client printers 200 is increased, it is also possible to specify a notification date and time for starting an access to the server printer 200 as access timing again for each client printer 200 such that access periods of the respective client printers 200 do not overlap each other, and update the timing information registration table 550.

In the above-described embodiment, an operation state is controlled such that only one of the network printers 200 is brought into the warm-up completion state in the identical sub-network 198. However, the present invention is not limited to this. For example, in the case in which there are a large number of network printers 200 in the identical sub-network 198, it is also possible to control the operation state such that a predetermined number of network printers 200 are brought into the warm-up completion state.

In the above-described embodiment, a protocol, which is used for communication of the printer management server 100 and the server printer 200, is not specifically described. However, for example, a protocol such as HTTP (HyperText Transfer Protocol), FTP (File Transfer Protocol), a mail protocol (SMTP (Simple Mail Transfer Protocol)), or POP3 (Post Office Protocol version 3)) can be used. In the case in which the mail protocol is used, the printer management server 100 is a mail server, and the server printer 200 sends a mail to its own mail address and sets a time on the basis of a time stamp of the mail received from the mail server. With such a constitution, the time setting of the server printer 200 can also be performed relatively easily without changing the mail server.

In the above-described embodiment, status information is collected from the network printer 200. However, the present invention is not limited to this. Status information or other management information may be collected from, other than the network printer 200, for example, a projector, a scanner, a digital camera, a digital video camera, a personal computer, a PDA (Personal Digital Assistant), a network storage, an audio apparatus, a cellular phone, a PHS (registered trademark) (Personal Handyphone System), a watch type PDA, an STB (Set Top Box), a POS (Point Of Sale) terminal, a copying machine, a facsimile machine, a telephone (including an IP telephone, etc.), a switchboard, an NCU (Network Control Unit), a router, a hub, a bridge, and the like which are applicable to a network.

In addition, in the above-described embodiment, the server printer 200 does not handle management information of the network printer 200 itself. However, the present invention is not limited to this. The server printer 200 can collect management information of all the printers 200 on the network by sending the management information of the network printer 200 itself to the server printer 200 and uploading the management information of the network printer 200 itself in addition to the management information of the respective client printers 200 to the printer management server 100.

Further, in the above-described embodiment, the network printer 200 can switch the mode in which the network printer 200 becomes the server printer 200 and the mode in which the network printer 200 becomes the client printer 200. However, there are other patterns for switching modes.

FIGS. 46A to 46F are diagrams for explaining switching of modes.

Figure 46A:
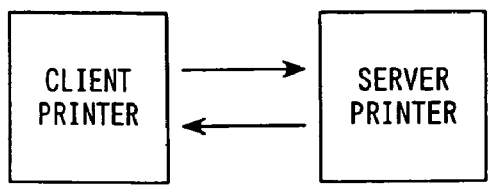
FIGS. 46A to 46F are diagrams for explaining switching of modes.
Figure 46B:
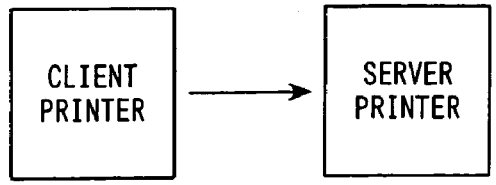

As shown in FIG. 46A, in the above-described embodiment, the network printer 200 is the client printer 200 in a default state thereof. The network printer 200 can switch the mode in which the network printer 200 is the server printer 200 and the mode in which the network printer 200 is the client printer 200 such that, first, when a power supply is inputted, the network printer 200 is switched to the server printer 200 from the client printer 200, then, when the network printer 200 with a higher performance exists on the network, the network printer 200, which has already become the server printer 200, is switched to the client printer 200, and the network printer 200 with the higher performance is switched to the server printer 200. However, as shown in FIG. 46B, the network printer 200 may perform only switching from the mode in which the network printer 200 becomes the client printer 200 to the mode in which the network printer 200 is the server printer 200.

In other words, the network printer 200 is the client printer 200 in the default state thereof. The network printer 200, to which the power supply is inputted first, is switched from the client printer 200 to the server printer 200. The client printer 200 once switched to the server printer 200 continues to be the server printer 200 until its power supply is isolated. However, when the server printer 200 does not exist on the network due to occurrence of a trouble, isolation of the power supply, or the like, the network printer 200 which is the client printer 200 with the highest performance is switched to the server printer 200. In addition, the network printer 200, which has been the server printer 200, becomes the client printer 200 in the initial state when the power supply is inputted next time.

Figure 46C:
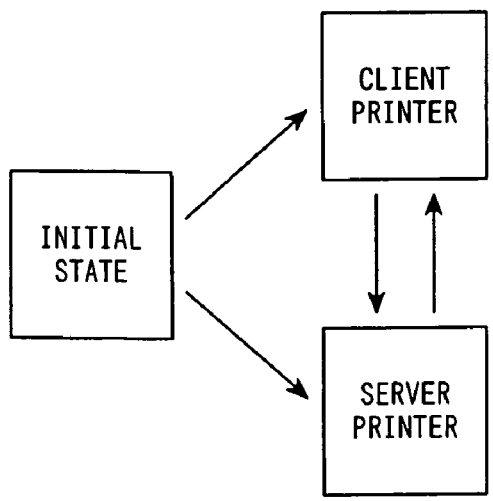

As shown in FIG. 46C, it is also possible that the network printer 200 is neither the server printer 200 nor the client printer 200 in an initial state thereof, and alternately switches the mode in which the network printer 200 becomes the server printer 200 and the mode in which the network printer 200 becomes the client printer 200. In other words, in the initial state, the network printer 200 is neither the server printer 200 nor the client printer 200. The network printer 200, to which the power supply is inputted first, is switched from the initial state to the server printer 200, and the network printer 200, to which the power supply is inputted in the state in which the server printer 200 exists on the network, is switched from the initial state to the client printer 200. Moreover, when the network printer 200 with a higher performance exists on the network, the network printer 200, which has already been the server printer 200, is switched to the client printer 200, and the network printer 200 with the higher performance is switched to the server printer 200.

Figure 46D:
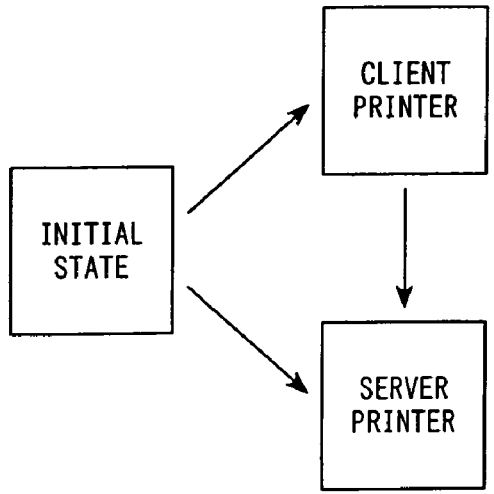

As shown in FIG. 46D, it is also possible that the network printer 200 is neither the server printer 200 nor the client printer 200 in an initial state thereof, and switches only from the mode in which the network printer 200 becomes the client printer 200 to the mode in which the network printer 200 becomes the server printer 200. In other words, in the initial state, the network printer 200 is neither the server printer 200 nor the client printer 200. The network printer 200, to which the power supply is inputted first, is switched from the initial state to the server printer 200, the network printer 200, to which the power supply is inputted in the state in which the server printer 200 exists on the network, is switched from the initial state to the client printer 200, and the client printer 200 once switched to the server printer 200 continues to be the server printer 200 until its power supply is isolated. However, when the server printer 200 does not exist on the network due to occurrence of a trouble, isolation of the power supply, or the like, the network printer 200 which is the client printer 200 with the highest performance is switched to the server printer 200. In addition, the network printer 200, which has been the server printer 200, becomes the client printer 200 in the initial state when the power supply is inputted next time.

Figure 46E:
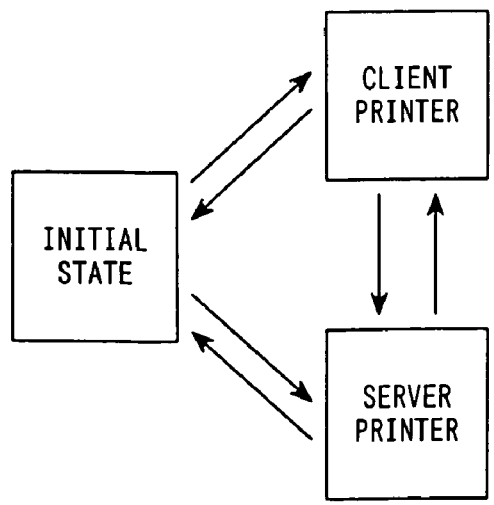

As shown in FIG. 46E, it is also possible that the network printer 200 alternately switches a mode in which the network printer 200 is neither the server printer 200 nor the client printer 200, the mode in which the network printer 200 becomes the server printer 200, and the mode in which the network printer 200 becomes the client printer 200. In other words, in the initial state, the network printer 200 is neither the server printer 200 nor the client printer 200. The network printer 200, to which the power supply is inputted first, is switched from the initial state to the server printer 200, and the network printer 200, to which the power supply is inputted in the state in which the server printer 200 exists on the network, is switched from the initial state to the client printer 200. Moreover, when the network printer 200 with a higher performance exists on the network, the network printer 200, which has already been the server printer 200, is switched to the client printer 200, and the network printer 200 with the higher performance is switched to the server printer 200. In addition, it is also possible that the network printer 200 is switched form the client printer 200 to the initial state or from the server printer 200 to the initial state to remove the network printer 200 from objects of management.

Figure 46F:
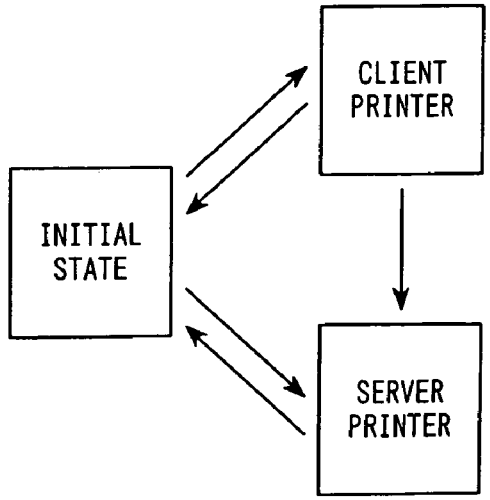
Figure 47:
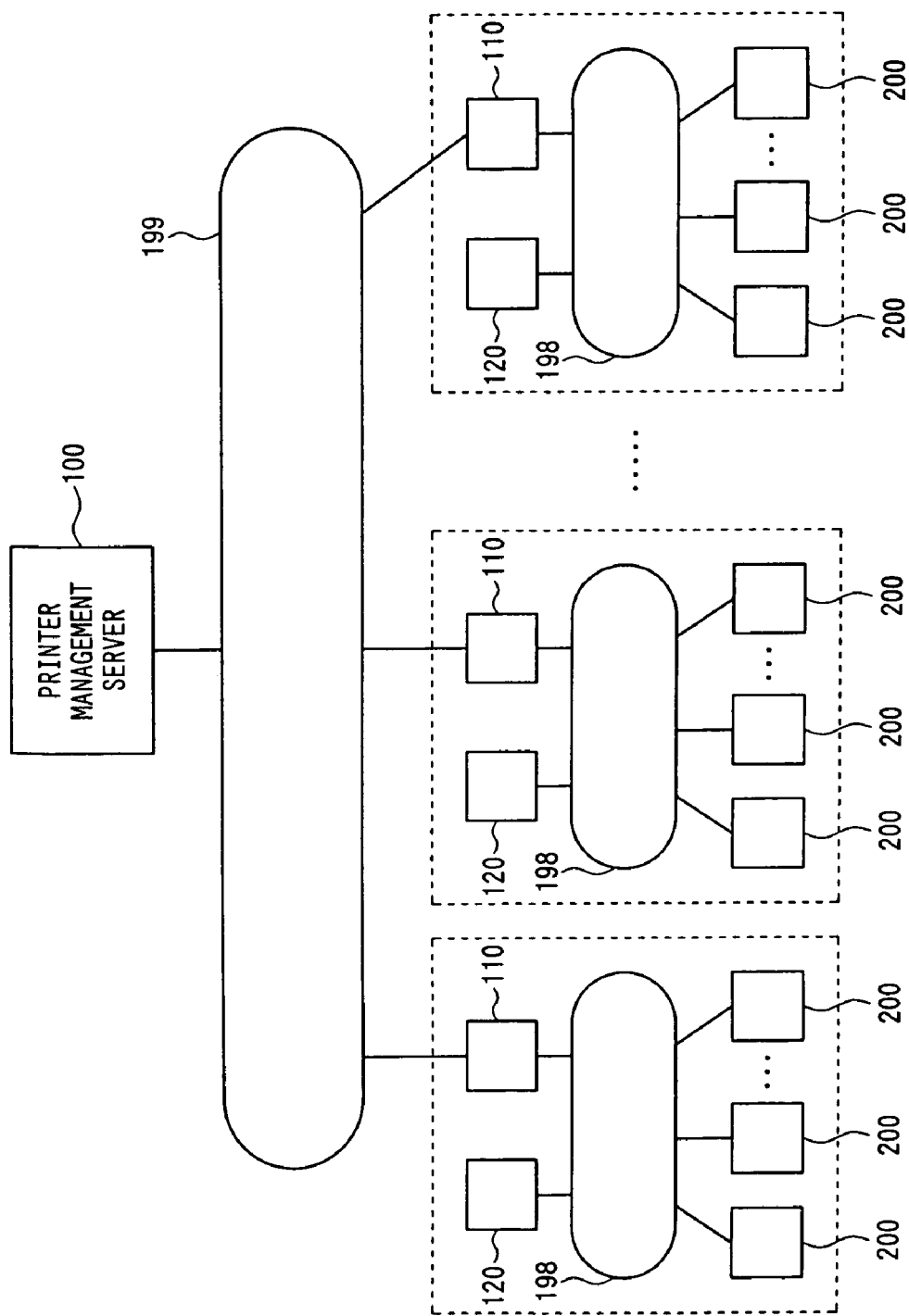
FIG. 47 is a block diagram showing a structure of a conventional printer management system.

In addition, as shown in FIG. 46F, it is also possible that the network printer 200 alternately switches the mode in which the network printer 200 is neither the server printer 200 nor the client printer 200, the mode in which the network printer 200 becomes the server printer 200, and the mode in which the network printer 200 becomes the client printer 200. However, the network printer 200 cannot switch the mode in which the network printer 200 becomes the server printer 200 to the mode in which the network printer 200 becomes the client printer 200. In the initial state, the network printer 200 is neither the server printer 200 nor the client printer 200. The network printer 200, to which the power supply is inputted first, is switched from the initial state to the server printer 200, the network printer 200, to which the power supply is inputted in the state in which the server printer 200 exists on the network, is switched from the initial state to the client printer 200, and the client printer 200 once switched to the server printer 200 continues to be the server printer 200 until its power supply is isolated. However, when the server printer 200 does not exist on the network due to occurrence of a trouble, isolation of the power supply, or the like, the network printer 200 which is the client printer 200 with the highest performance is switched to the server printer 200. In addition, the network printer 200, which has been the server printer 200, becomes the client printer 200 in the initial state when the power supply is inputted next time. Further, it is also possible that the network printer 200 is switched from the client printer 200 to the initial state or from the server printer 200 to the initial state to remove the network printer 200 from objects of management.

In the above-described embodiment, the structure of the device associative management system in accordance with the present invention is described. However, as an environment which can be implemented in a short period and with a small amount of money and minimum labor, the network printer 200 is required to be provided with at least hardware and software which can perform a function for communication with the printer management server 100 and execution of an arbitrary program, and the printer management server 100 is required to be provided with at least a database saving management information of the network printer 200.

In the above-described embodiment, there is described the case in which the control program, which is stored in the ROM 32 in advance, is executed in executing the processing shown in any one of the flowcharts of FIGS. 5 to 9. However, the present invention is not limited to this, and it is also possible to read a program, which indicates procedures for the processing, in the RAM 34 from a storage medium having the program stored therein.

In the above-described embodiment, there is described the case in which the control program, which is stored in the ROM 52 in advance, is executed in executing the processing shown in any one of the flowcharts of FIGS. 16 to 38. However, the present invention is not limited to this, and it is also possible to read a program, which indicates procedures for the processing, in the RAM 54 from a storage having the program stored therein.

Here, the storage medium is a semiconductor storage medium such as a RAM or a ROM, a magnetic storage medium such as an FD or an HD, an optical reading storage medium such as a CD, a CDV, an LD, or a DVD, or a magnetic storing/optical reading storage medium such as an MO. Regardless of a reading method such as electronic, magnetic, or optical, the storage medium includes any storage medium as long as it is a storage medium which can be read by a computer.

In addition, in the above-described embodiment, there is described the case in which the device associative management system, the network device, and the program for a device, as well as the device associative management method in accordance with the present invention are applied to the network system consisting of the Internet 199. However, the present invention is not limited to this and, for example, these may be applied to a so-called intranet in which communication is performed with the system identical with the Internet 199. It goes without saying that the these may be applied not only to a network in which communication is performed with the system identical with the Internet 199 but also to an ordinary network.

Further, in the above-described embodiment, the device associative management system, the network device, and the program for a device, as well as the device associative management method in accordance with the present invention are applied to the case in which status information is collected from the plurality of network printers 200 as shown in FIG. 1. However, the present invention is not limited to this, and these may be applied to other cases within a range not departing from the spirit of the present invention.

Japanese Patent Application Nos. 2002-377,294 filed Dec. 26, 2002 and 2003-388,844 filed Nov. 19, 2003 are hereby incorporated by reference.

What is claimed is:

1. A device associative management system for networks in which a plurality of network devices are connected so as to be capable of communicating with each other, and wherein any one of said plurality of network devices can become a representative network device, said device associative management system comprising a management information storage section for storing management information, and wherein each of said network devices comprises:

a mode switching section which switches said network device to a mode in which said network device becomes said representative network device and a mode in which said network device becomes a dependent network device other than said representative network device among said plurality of network devices;

a management information transmission section which sends management information of said network device itself to said representative network device;

a management information reception section which receives the management information; and a management information registration section which registers the management information received by said management information reception section in said management information storage section, wherein, when said network device itself is said representative network device, said network device validates operations of said management information reception section and said management information registration section, and wherein, when said network device itself is said dependent network device, said network device validates operations of said management information transmission section.

2. A device associative management system for networks in which a plurality of network devices are connected so as to be capable of communicating with each other, and any one of said plurality of network devices can become a representative network device, said device associative management system comprising a management information storage section for storing management information, and wherein each of the network devices comprises:

a mode switching section which switches said network device to a mode in which said network device becomes said representative network device and a mode in which said network device becomes a dependent network device other than said representative network device among said plurality of network devices;

a management information section of said network device itself;

a management information transmission section which sends management information of said network device itself to said representative network device;

a management information reception section which receives the management information; and a management information registration section which registers the management information received by said management information reception section in said management information storage section, wherein said network device when in said mode of the representative network device validates operations of said management information reception section and said management information registration section, and wherein said network device when in said mode of the dependent network device validates operations of said management information transmission section.

3. A device associative management system for networks in which a plurality of network devices are connected so as to be capable of communicating with each other and any one of said plurality of network devices can become a representative network device, wherein each of the network devices comprises:

a mode switching section which switches said network device to a mode in which said network device becomes said representative network device and a mode in which said network device becomes a dependent network device other than said representative network device among said plurality of network devices;

a first management information storage section for storing management information of said network device itself;

a second management information storage section for storing management information of said representative network device and said dependent network device;

a management information transmission section which sends management information in said first management information storage section to said representative network device;

a management information reception section which receives the management information; and a management information registration section which registers the management information received by said management information reception section in said second management information storage section, wherein, when the network device is in said mode of the representative network device, said network device validates operations of said management information reception section and said management information registration section, and wherein, said network device when in said mode of the dependent network device validates operations of said management information transmission section.

4. A device associative management system for networks in which a plurality of network devices are connected so as to be capable of communicating with each other and any one of said plurality of network devices can become a representative network device, wherein each of the network devices comprises:

a mode switching section which switches said network device to a mode in which said network device becomes said representative network device and a mode in which said network device becomes a dependent network device other than said representative network device among said plurality of network devices;

a first management information storage section for storing management information of said network device itself;

a second management information storage section for storing management information of said representative network device and said dependent network device;

a management information transmission section which sends management information in said first management information storage section to said representative network device;

a management information reception section which receives the management information; and a management information registration section which registers the management information received by said management information reception section in said second management information storage section, wherein, when said network device itself is said representative network device, said network device validates operations of said management information reception section and said management information registration section, and wherein, when the network device itself is the dependent network device, said network device validates operations of said management information transmission section.

5. The device associative management system according to claim 4, wherein a device management terminal managing said network devices are connected so as to be capable of communicating with each other, wherein said network device comprises second management information transmission section which sends the management information in said second management information storage section to said device management terminal, and wherein, when said network device itself is said representative network device, said network device validates operations of said second management information transmission section.

6. The device associative management system according to claim 5, wherein said device management terminal comprises a storage section for storing a file and, when a file creation request for creation of a file is received, creates a file relating to the received file creation request, records the created file in said storage section together with a creation time thereof, and when detail information acquisition request for acquisition of file detail information including the creation time is received, creates the file detail information for a file relating to the received detail information acquisition request among files in said storage section, and sends the created file detail information to a request source, and wherein said network device comprises:

a file detail information acquisition section which acquires the file detail information from said device management terminal;

a file detail information transmission section which sends the file detail information acquired by said file detail information acquisition section to said dependent network devices;

a file detail information reception section which receives the file detail information; and a time setting section which sets a time on the basis of the file detail information received by said file detail information reception section, wherein, when said network device itself is said representative network device, said network device validates operations of said file detail information acquisition section, said file detail information transmission section, and said time setting section, wherein, when said network device itself is said dependent network device, said network device validates operations of said file detail information reception section and said time setting section, and wherein said file detail information acquisition section sends the file creation request to said device management terminal, sends the detailed information acquisition request to said device management terminal, and receives the file detail information.

7. The device associative management system according to claim 5, wherein said network device comprises:

a power supply input section which inputs a power supply of said network device itself when a power supply input instruction for input of the power supply is received; and a power supply input instruction transmission section which sends the power supply input instruction to said dependent network devices, wherein, when said network device itself is said representative network device, said network device validates operations of said power supply input instruction transmission section, and wherein, when said network device itself has become said representative network device, said power supply input instruction transmission section sends the power supply input instruction to said dependent network devices.

8. The device associative management system according to claim 5, wherein said network device comprises power a supply isolation section which isolates a power supply of said network device itself when said network device receives a power supply isolation instruction for isolation of the power supply;

a power supply isolation instruction transmission section which sends the power supply isolation instruction to said dependent network devices;

a power supply isolation request input section which inputs a power supply isolation request; and a power supply isolation request notification section which, when the power supply isolation request is inputted by said power supply isolation request input section, notifies said representative network device to that effect, wherein, when said network device itself is said representative network device, said network device validates operations of said power supply isolation instruction transmission section, and wherein, when the power supply isolation request is notified, said power supply isolation instruction transmission section sends the power supply isolation instruction to said dependent network devices.

9. The device associative management system according to claim 5, wherein said network device comprises:

an application reception section which receives an application from said device management terminal;

an application installing section which installs the received application; and an application delivery section which delivers the application to said dependent network devices, wherein, when said network device itself is said representative network device, said network device validates said application delivery section; and wherein, when said network device itself has become said representative network device, said application delivery section delivers the received application to said dependent network devices.

10. The device associative management system according to claim 5, wherein said network device comprises:

an application uninstalling instruction reception section which receives an instruction to uninstall an application;

an application uninstalling section which uninstalls the application; and an application uninstalling instruction transmission section which sends an uninstalling instruction to said dependent network devices, wherein, when said network device itself is said representative network device, said network device validates operations of said application uninstalling instruction transmission section, and wherein, when said network device itself has become said representative network device, said application uninstalling instruction transmission section sends the received application uninstalling instruction to said dependent network devices.

11. The device associative management system according to claim 4, wherein said management information transmission section voluntarily sends the management information in said first management information storage section to said representative network device.

12. The device associative management system according to claim 4, wherein, when it is judged that there is no operative network device other than said network device itself among the plurality of network devices, said mode switching section switches said network device itself to the mode in which said network device becomes said representative network device.

13. The device associative management system according to claim 4, wherein, in the case in which said network device itself is said representative network device, when a performance of said network device itself and a performance of said dependent network device are compared and it is judged that the performance of said dependent network device is higher, the mode switching section of said network device itself sends a substitution request for substitution of said representative network device to said dependent network device and switches said network device itself to the mode in which said network device becomes said dependent network device, and said dependent network device that received the substitution request switches said dependent network device to the mode in which said dependent network device becomes said representative network device.

14. The device associative management system according to claim 4, wherein, when said representative network device has become inoperative, said mode switching section selects a dependent network device having the highest performance out of said dependent network devices and switches said selected dependent network device to said representative network device.

15. A device which is connected to other network devices so as to be capable of communicating with each other, said network device comprising:

a mode switching section which switches said network device to a mode in which said network device becomes said representative network device and a mode in which said network device becomes a dependent network device other than said representative network device among said plurality of network devices;

a management information transmission section which sends management information of said network device itself to said representative network device;

a management information reception section which receives the management information; and a management information registration section which registers the management information received by said management information reception section in said management information storage section, wherein, when said network device itself is said representative network device, said network device validates operations of said management information reception section and said management information registration section, and wherein, when said network device itself is said dependent network device, said network device validates operations of said management information transmission section.

16. A computer having a program stored therein for operating a network device comprising:

a mode switching section which switches said network device to a mode in which said network device becomes a representative network device and a mode in which said network device becomes a dependent network device other than said representative network device among said plurality of network devices;

a management information transmission section which sends management information of said network device itself to said representative network device;

a management information reception section which receives the management information; and a management information registration section which registers the management information received by said management information reception section in said management information storage section, and wherein, when said network device itself is said representative network device, the computer performs validating operations of said management information reception section and said management information registration section, and wherein, when said network device itself is said dependent network device, said computer performs validating operations of said management information transmission section.

17. A method with which a plurality of network devices are connected so as to be capable of communicating with each other and any one of said plurality of network devices becomes a representative network device to collect management information of said plurality of network devices including said representative network device itself, wherein said method comprises:

a step of switching modes of said respective network devices such that any one of said plurality of network devices becomes said representative network device and said network devices other than said representative network device become dependent network devices, with respect to said dependent network devices, a management information transmission step of sending management information of said network device itself to said representative network device, and with respect to said representative network device, a management information reception step of receiving the management information, and a management information registration step of storing the management information received in said management information reception step and management information of said network device itself in a management information storage section.

* * * * *